United States Patent [19]
Langlois et al.

[11] Patent Number: 6,018,571
[45] Date of Patent: Jan. 25, 2000

[54] SYSTEM FOR INTERACTIVE CONTROL OF A COMPUTER AND TELEPHONE

[75] Inventors: Michael Langlois, Calgary; Richard Loen, Ottawa; Duncan Smith, Kanata, all of Canada; Michael Lahrkamp, Phoenix, Ariz.; Paul Chehowski, Manotick; Peter Couse, Ottawa, both of Canada

[73] Assignee: Mitel Corporation, Ontario, Canada

[21] Appl. No.: 08/940,246

[22] Filed: Sep. 30, 1997

[51] Int. Cl.⁷ ..................................................... H04M 3/42
[52] U.S. Cl. ......................................... 379/207; 379/93.17
[58] Field of Search ................................. 379/396, 90.01, 379/387, 93.05, 93.06, 93.23, 110.01, 201, 202, 96, 93.17; 455/557, 418, 419, 420, 566

[56] References Cited

U.S. PATENT DOCUMENTS

| | | | |
|---|---|---|---|
| 4,547,860 | 10/1985 | Lapeyre | 364/709.16 |
| 4,776,005 | 10/1988 | Petriccione et al. | |
| 4,860,339 | 8/1989 | D'Agosto, III et al. | 379/88.11 |
| 4,860,342 | 8/1989 | Danner | 379/93.28 |
| 5,008,930 | 4/1991 | Gawrys et al. | 379/210 |
| 5,471,522 | 11/1995 | Sells et al. | 379/93.11 |
| 5,533,102 | 7/1996 | Robinson et al. | 379/88.25 |
| 5,537,608 | 7/1996 | Beatty et al. | 379/158 |
| 5,546,447 | 8/1996 | Skarbo et al. | 379/142 |
| 5,572,572 | 11/1996 | Kawan et al. | 379/93.28 |
| 5,631,954 | 5/1997 | Evans et al. | 379/201 |
| 5,642,410 | 6/1997 | Walsh et al. | 379/201 |
| 5,727,047 | 3/1998 | Bentley et al. | 379/93.05 |
| 5,754,636 | 5/1998 | Bayless et al. | 379/142 |
| 5,771,281 | 6/1998 | Batten, Jr. | 379/93.23 |
| 5,790,652 | 8/1998 | Gulley et al. | 379/368 |
| 5,884,190 | 3/1999 | Lintula et al. | 455/557 |

FOREIGN PATENT DOCUMENTS

| | | |
|---|---|---|
| 0 144 042 | 6/1985 | European Pat. Off. . |
| 2214754 | 9/1989 | United Kingdom . |
| 2 276 520 | 9/1994 | United Kingdom . |
| 2284126 | 5/1995 | United Kingdom . |
| 2305331 | 4/1997 | United Kingdom . |
| WO 88/02206 | 3/1988 | WIPO . |
| WO 95/22183 | 8/1995 | WIPO . |
| WO 96/02049 | 1/1996 | WIPO .............................. G09G 5/00 |

*Primary Examiner*—Reinhard J. Eisenzopf
*Assistant Examiner*—Charles Appiah
*Attorney, Agent, or Firm*—Knobbe, Martens, Olson & Bear, LLP

[57] ABSTRACT

An interactive system include a software application and a telephone which function cooperatively to implement a multiplicity of user-invoked features. The telephone set is connected to a computer on which a telephony application program interface application is executed. The telephone set includes a plurality of user-definable function keys in addition to the standard keypad, handset, speaker phone and other standard components. The user-definable function keys are programmable via the computer to implement telephony features or to launch applications on the computer.

21 Claims, 46 Drawing Sheets

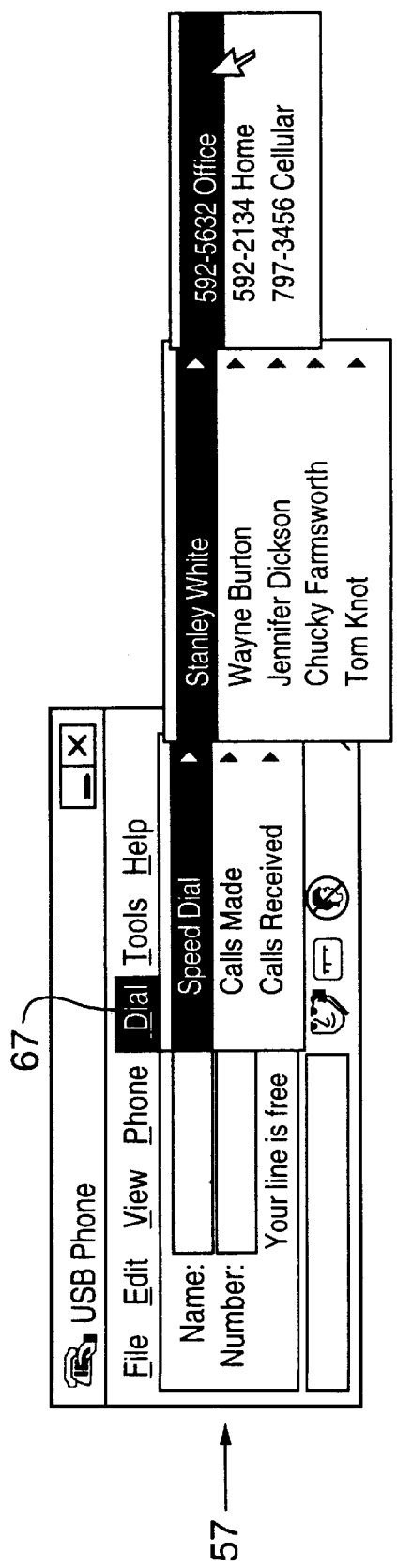
FIG. 18B
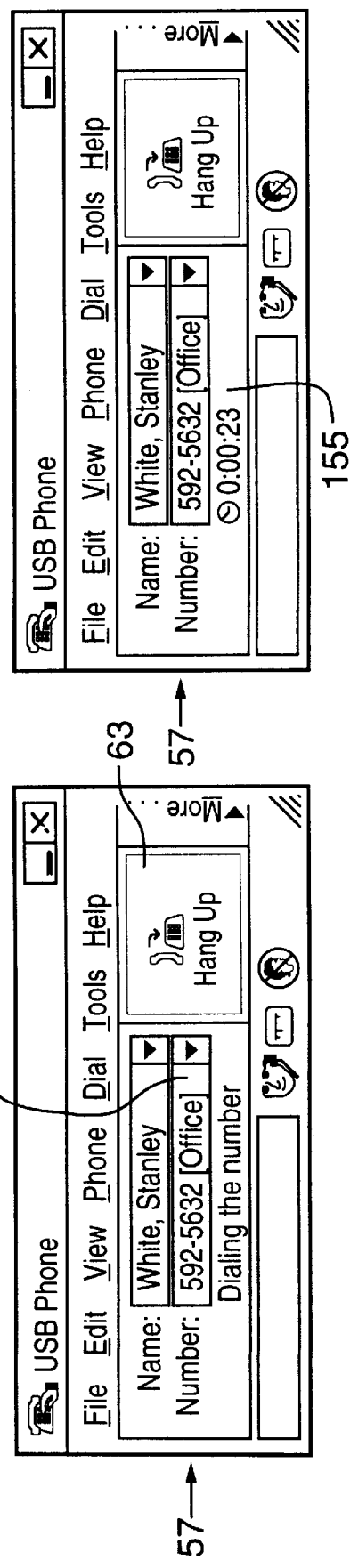
FIG. 18D
FIG. 18C

SYSTEM FOR INTERACTIVE CONTROL OF A COMPUTER AND TELEPHONE

FIELD OF THE INVENTION

This invention relates in general to personal computers and telephony, and more particularly to an interactive system by which a computer and telephone function cooperatively to implement a multiplicity of functions invoked by a user.

BACKGROUND OF THE INVENTION

Software applications are known in the art for implementing telephony features using a personal computer. According to existing First Party Call Control architectures, a physical connection is provided between the telephone and personal computer for providing Computer Telephony Integration (CTI). Such prior art CTI architectures have suffered from extreme limitations in functionality and ease of use. For example, in order to place a phone call, a user typically must first close or minimize whatever application he or she is currently running (eg. Microsoft Word®), open the CTI application, enter the digits to be dialled via point-and-click numbers, and then click an accept or dial button. Alternatively, according to some CTI architectures, the user is able to navigate or browse a telephone directory in order to identify the party to be called and then, once located, highlight the party's name and click a dial button.

Understandably, the awkwardness of using such systems and the limited features provided thereby have led some consumers to abandon prior art CTI systems in favour of more functional telephone sets or even "plain old telephone sets" (POTS) with enhanced features being provided by the central office.

One of the reasons for the awkwardness and limited functionality of prior art CTI architectures is that there is no seamless integration of functions activated by the telephone and functions activated directly or indirectly by the computer.

Recent developments in the standardization of computer interfaces have led to increased development of software applications which are adapted to integrate functionality of a personal computer with various and diverse external devices. For example, the recently established standard for USB (Universal Serial Bus-a 12 Mbit/s serial interface running over a four wire bus, with an associated software stack supporting peripheral connectivity to a personal computer) is expected to yield a raft of software applications which interact cooperatively with external devices ranging from video games to faxes and data modems.

An object of the present invention is to provide an interactive telephone and PC-based software application which will overcome the limitations of prior art CTI architectures and be compatible with emerging standardized interfaces such as USB.

SUMMARY OF THE INVENTION

According to the present invention, an interactive system is provided by which a computer and telephone function cooperatively to implement a multiplicity of user-invoked features. Physically, the system comprises a telephone set which is connected to a personal computer on which a novel TAPI (Telephony Application Program Interface) application is executed. The telephone set includes a plurality of user-definable function keys in addition to the keypad, handset, speaker phone and other standard components. The user-definable function keys are programmable via the computer to implement specific telephony features or to launch applications on the computer. The TAPI application permits shared and interactive functionality between the computer and telephone set including, but not limited to, call management, call logging, call recording, phonebook database creation and editing, and dialling. The telephone set is connected to a single central office line, and can be connected to the computer via either a USB or a standard RS-232 serial line.

The TAPI application according to the present invention comprises a plurality of user interface components for user display and printing, and a plurality of engine components for call processing, data storage and manipulation, application configuration management and audio recording and playback. The engine components are located in one or more Dynamic Link Libraries (DLLs) to provide the necessary information for display or printing by the user interface components. The user interface components are contained in a main executable file and are isolated from the non-user or engine components to allow for flexibility in future interface developments.

The user interface components of the present invention provide a graphical user interface (GUI) characterized by a number of useful features. According to one aspect of the GUI, a "flyout" control bar may be activated by the user to display various context sensitive call features. According to another aspect, where caller line identification data (CLID) is sent to the user's system, the caller's picture is displayed on-screen as a bit map, along with the user's name and telephone number. According to an additional aspect, the user can program a plurality of custom diallers which operate in a manner somewhat similar to speed diallers except that the diallers are logically sequenced by the user for navigating automated attendants and other comparable call answering systems.

BRIEF DESCRIPTION OF THE DRAWINGS

A detailed description of the preferred embodiment is provided herein below with reference to the following drawings, in which:

FIGS. 5a though 5c show the main window display according to an alternative embodiment of the present invention, wherein FIG. 5a shows the main window display with toolbar showing.

FIGS. 10 shows the main window display of the first embodiment in the event of an incoming call (FIG. 10a), with the control bar in the open position (FIG. 10b), and with the Phone menu open (FIG. 10c), whereas

FIG. 25 shows various window displays indicating operation of a user customizable dialler feature according to the first embodiment, wherein

FIGS. 27a through 27f show a configuration window having multiple user selectable tabs for configuring the telephone and application, wherein FIG. 27a shows a Sounds tab, FIG. 27b shows an Incoming Calls tab, FIG. 27c shows an Audio Devices tab, and FIG. 27d shows a Function Buttons tab, FIG. 27e shows a Voicemail tab, and FIG. 27f shows a Miscellaneous tab.

DETAILED DESCRIPTION OF THE PREFERRED EMBODIMENT

Figure 1:
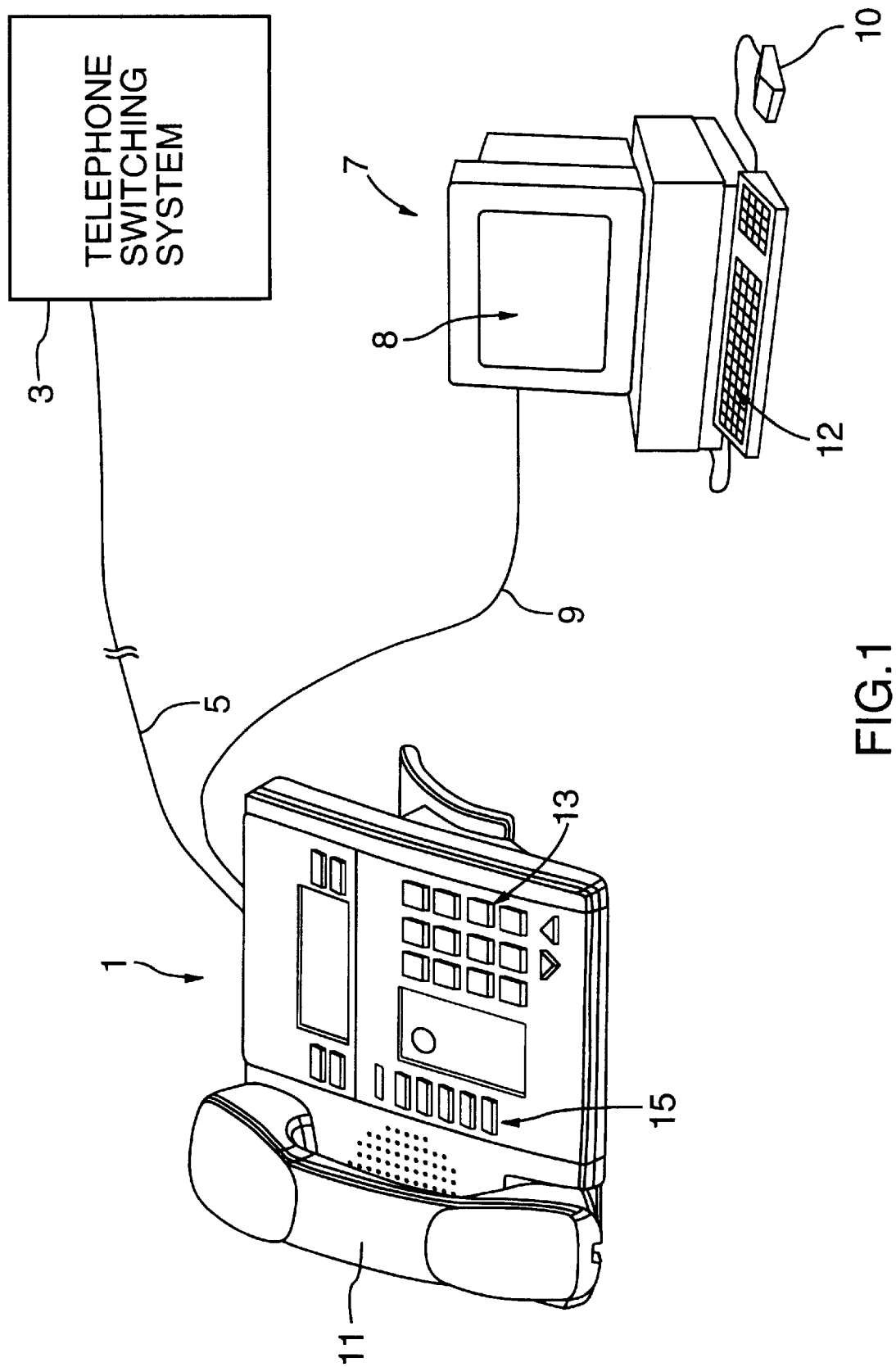
FIG. 1 is a schematic illustration of the computer-based telephony system according to a general aspect of the present invention.

Turning to FIG. 1, the computer-based telephony system of the present invention is shown in its broadest aspect comprising a telephone set 1 connected to a telephone switching system 3 (e.g. central office) via a telephone line 5. The telephone set 1 is also connected to a personal computer 7 via a serial link 9. The personal computer 7 includes a monitor or display 8 as well as a mouse pointer 10 and keyboard 12, in a well known manner. According to the preferred embodiment, the serial link is one of either a USB or RS-232 line, although other suitable data communication links are possible. The computer 7 executes a TAPI compliant software application for communicating with the telephone set 1 to implement various telephony functions, as discussed in greater detail below.

The telephone set 1 includes a handset 11 and keypad 13, and in addition includes a plurality of programmable function keys 15. As discussed in greater detail below, respective ones of the function keys may be programmed via the software application executed on computer 7 to activate predetermined telephony functions or software functions on the computer. For example, in one scenario a function key may be programmed to automatically activate a "Do Not Disturb" feature while in another scenario the function key may be programmed to launch a software application such as Microsoft Word®. The set 1 also includes a message waiting lamp 16 which is activated by the software application to notify the caller of an incoming message, which can be a voicemail message, a fax, Internet email or other multimedia message.

Figure 2A:
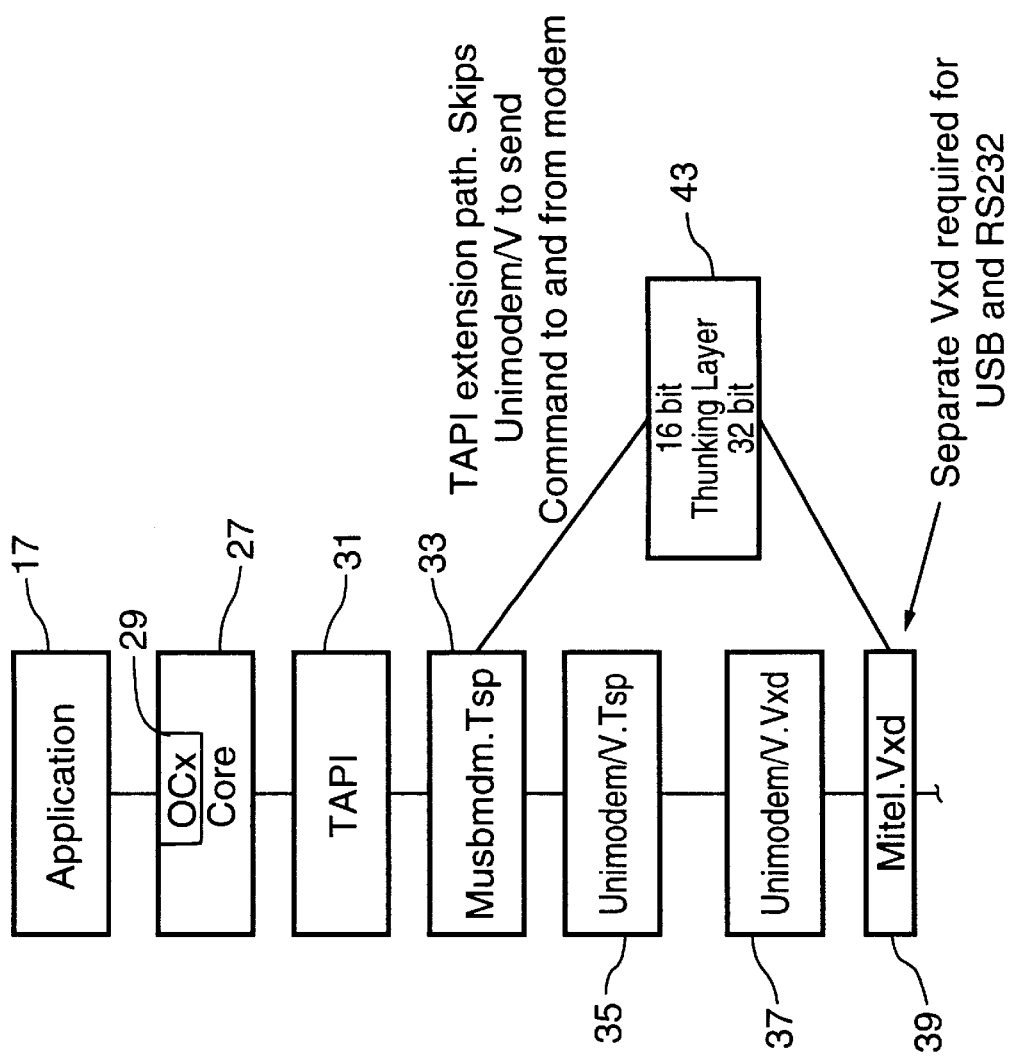
FIG. 2 is a block diagram showing software modules which form the protocol stack governing communication between the telephone set and computer of the telephony system according to the present invention.
Figure 2B:
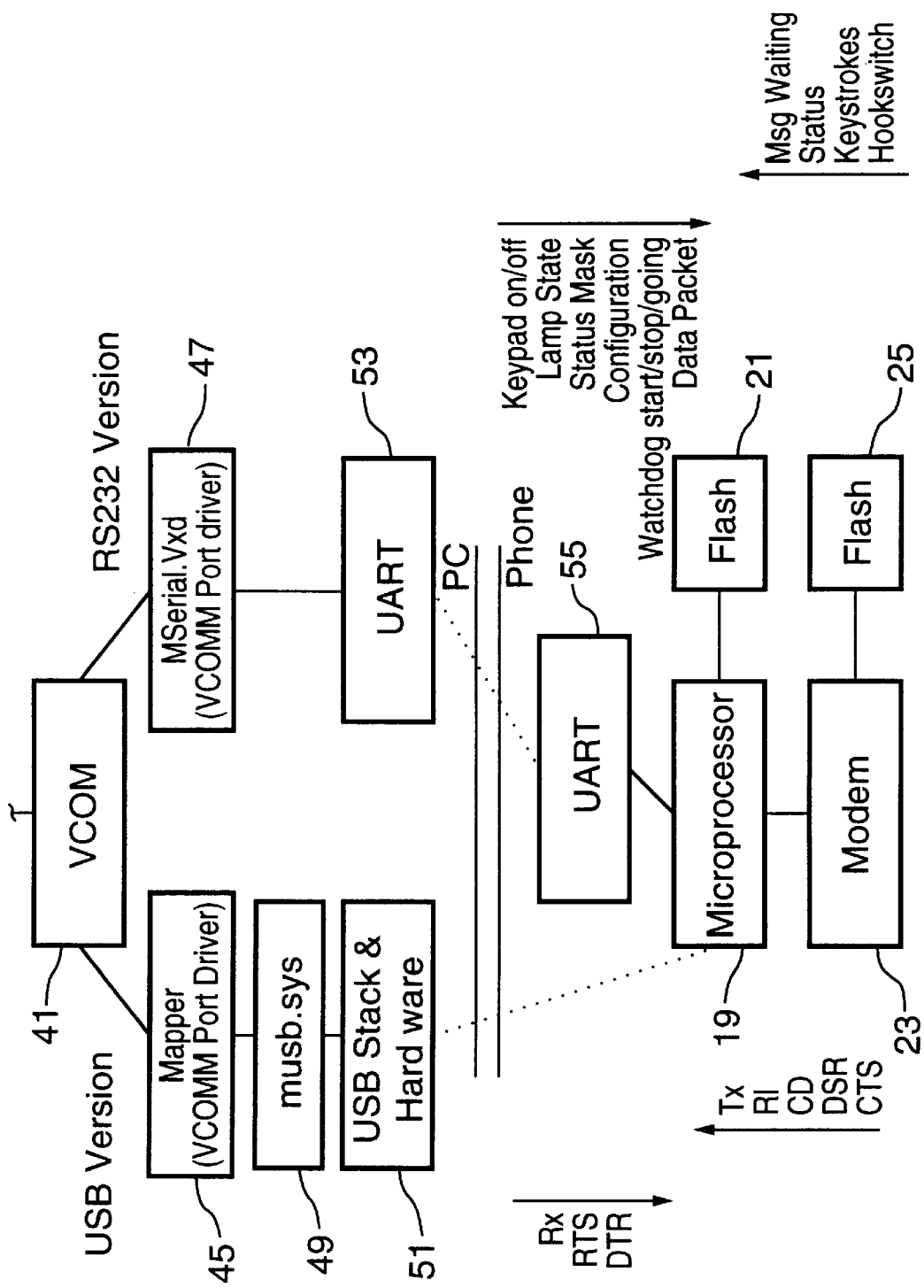

As indicated above, the software application running on computer 7 communicates with telephone set 1 via serial link 9. As shown in FIG. 2, in order for this communication to take place, data must pass through a plurality of modules which form a protocol stack between the application 17 and telephone set 1. The telephone set 1 incorporates a microprocessor 19 (e.g. Intel 80930) with Flash EPROM memory 21. A modem 23 is connected to microprocessor 19 and is also provided with a Flash memory 25. The microprocessor 19 and modem 23 together control implementation of standard telephony functions such as incoming call, outgoing call, call waiting, speaker phone conversation, hold, etc., in a well known manner. However, in accordance with the principles of the present invention, the software application 17 is able to interact with the telephone set 1 to cooperatively implement a multiplicity of user-invoked features.

Although the software modules comprising the protocol stack do not form part of the present invention, a brief description is provided herein for completeness. The highest level in the stack is represented by the software application 17 which comprises a plurality of user interface components for display and printing functionality, as discussed in greater detail below with reference to FIG. 9. Immediately below the application 17 is a core 27 comprising a plurality of engine components for providing all of the support which the user interface components require to display and print data. This support includes call processing, data storage and manipulation, application configuration management and audio recording and playback. The engine components are located in one or more DLLs with "C" language interfaces to them, as discussed in greater detail below.

According to the preferred embodiment as of the filing date of this application, the application 17 is coded in VisualBasic whereas the core 27 of engine components is coded in C++. To facilitate access from VisualBasic to the DLLs, an OCX layer 29 is provided. The OCX layer 29 is also coded in C++.

Below the OCX layer is TAPI layer 31, which is a Microsoft device independent communication library created by Microsoft for use by programmers writing telephony applications (including data, fax and voice modem) for Microsoft operating systems.

Below TAPI layer 31 is a TAPI service provider referred to as "Musmdm.Tsp" layer 33. This layer communicates with Microsoft's "Unimodeni/V.Tsp" and "UnimodemlV-.Vxd" layers 35 and 37, respectively, which form the standard Windows 95® low-level software architecture for supporting telephony applications utilizing voice/data/fax modems.

The "Unimodem/V.Vxd" layer 37 communicates with a Mitel.Vxd layer 39 which provides an interface to the standard VCOM layer 41. VCOM layer 41 is a static VxD which is loaded when booting Windows 95, and which functions as a device driver interface to the devices connected to serial link 9 (ie. USB or RS-232 port drivers).

Since the UniModem V architecture does not support a number of essential telephony signals, such as keypad, hookswitch, hold, etc., a 16 bit/32 bit "thunking layer" 43 is provided for circumventing the UniModem V layers for these signals.

At the lowest levels of the protocol stack, VCOM layer 41 communicates with one of either with a VCOM mapper 45 for the USB version of this invention or a VCOM port driver referred to as MSerial.Vxd 47.

For the USB version, VCOM mapper 45 communicates with a USB device driver "musb.sys" 49 for causing the USB to "appear" as a serial port. The "musb.sys" driver 49 communicates the standard Microsoft USB stack and associated hardware 51 for transmitting and receiving serial data via the USB.

For the RS-232 version, the MSerial.Vxd driver 47 communicates with a UART 53 (Universal Asynchronous Receiver Transmitter) in a well known manner.

At the telephone set 1, the USB hardware 51 communicates directly with microprocessor 19 via associated USB hardware incorporated into the microprocessor, whereas for the RS-232 version UART 53 communicates with a further UART 55 connected to the microprocessor 19.

As indicated above, the user interface components of application 17 are responsible for implementing a Graphical User Interface (GUI) which allows the user to access various software and telephony features. The principal user interface to these features is provided by the main window 57 which is depicted via display 8 of computer 7. Two embodiments of the GUI are discussed herein. A first embodiment is initially shown in FIG. 3 while an alternative embodiment is initially shown in FIG. 5. The basic user functionality provided by the two embodiments is similar. A detailed description of the functionality is described herein in detail with reference to the first embodiment, and supplemented where appropriate with reference to the alternative embodiment. As of the date of initial filing of this application, the second embodiment constitutes the best mode, the operation of which will be understood by a person of ordinary skill in the art having reference to the detailed description of the first embodiment supplemented by reference to the second embodiment disclosed herein.

The main window display according to the first embodiment (FIG. 3), includes a title bar 59 with document control menu icon as well as minimize and close buttons, a customizable toolbar 60 with volume, speaker, microphone, voicemail. profile, phonebook, call log and help buttons showing, a display area 61 with name field, number field and call state information, a context sensitive default button 63 which has focus and responds to the "Enter" key from the keyboard of computer 7 (unless the focus is changed by the user), a control bar actuator 65, a menu bar 67, resize control 69, and a status line 71 with indicators including receptionist icon 73, voicemail icon 75 and "Do Not Disturb" icon 77.

Figure 4:
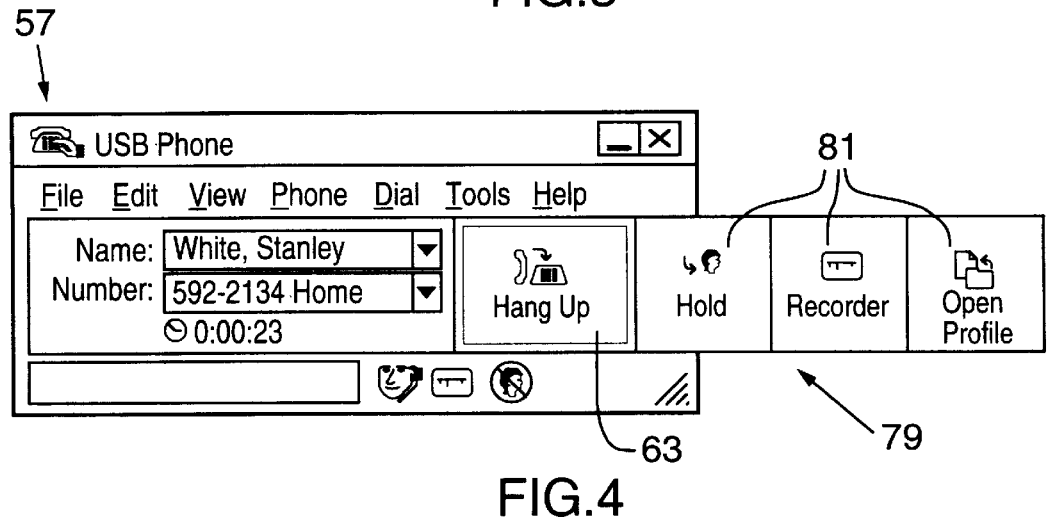
FIG. 4 shows the main window display of FIG. 3 with a flyout control bar thereof in the open position.

A horizontal control bar 79 can be opened from the main window display 57, as shown in FIG. 4. The control bar 79 opens when the screen pointer of mouse 10 passes over the control bar actuator 65 (similar to the auto hide/show feature of the Windows 95® task bar), and can be programed to open automatically in the event of an incoming call at telephone 1. According to one embodiment of the invention a time delay is provided (e.g. 0.2 secs) after positioning the mouse pointer over the actuator 65, in order to prevent accidental inadvertent opening of the control bar 79. The control bar 79 remains open as long as mouse pointer 10 is positioned over any one of the function buttons 81. Preferably, a time delay is provided (e.g. 0.5 secs.) after the mouse pointer 10 has moved from the control bar 79 before the control bar is closed. The control bar 79 may also be opened using a keyboard sequence (such as Alt+m).

In the event that the user drags the main window display 57 to the right side of display 8 so that there is no longer sufficient room for the control bar 79 to open to the right, the control bar and associated default button 63 swap positions with the display area 61 and the control bar opens to the left of the main window display 57. This feature of the invention is shown in FIG. 5b and 5c, which show the main window display 57 according to the alternative embodiment.

The control bar 79 provides a normally hidden menu of function buttons 81 to the user. The buttons 81 are preferably labelled with icons and text By keeping the 10 control bar 79 closed during normal operation, considerable screen real estate is saved. Opening of the control bar 79 provides the user with immediate access to call handling features without having to scroll through a multitude of menus or buttons, waiting for tool tips to pop-up, etc., as is common with prior art CTI applications. Furthermore, according to an important aspect of the invention, the default button 63 and buttons 81 of the control bar 79 are context sensitive so as to provide functionality derived from all parts of the software application 17, but only function options which are appropriate to the state of the telephone call (e.g. when a call is in progress, as shown in FIG. 4, the options are Hang Up, Hold, Recorder and Open File).

Figure 3:
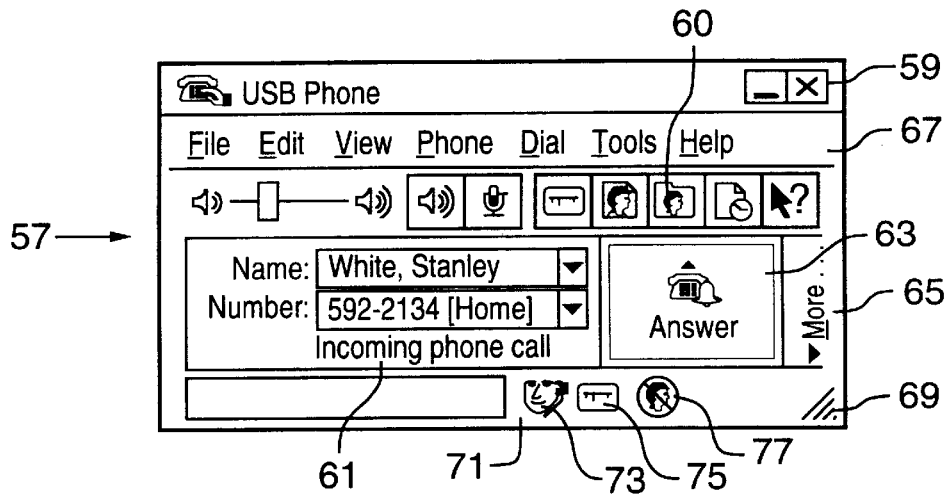
FIG. 3 shows a main window display generated by the software application according to a first embodiment of the present invention.

According to the embodiment shown in FIG. 3, the options of menu bar 67 include:

1) a File menu for providing access to Import and Export functions (e.g. links to contact lists from other PIMs, etc.), and an Exit command which quits the application 17;

ii) an Edit menu which provides access to well known cut, copy, paste and delete commands, which may be used to modify both the name and number fields of display are 61;

iii) a View menu which allows the user to hide or show the toolbar 60 within main window 57;

iv) a Phone menu for presenting various telephony function options to the user for call handling - as with the default button 63 and function buttons 81 discussed above, the telephony function options presented in the Phone menu are made context sensitive by dimming commands which are not appropriate to the telephone call state;

v) a Dial menu which presents the user with a list of user definable important or frequently dialled numbers as well as a Calls Made list and Calls Received list -the Dial menu including:
  a Speed Dial sub-menu defined by the user in the phonebook such that for each person in the list, all relevant phone numbers are displayed. Upon selection of a phone number, the name and number are dropped in display area 61, the telephone 1 goes off-hook and digits are immediately out-pulsed;
  a Calls Made sub-menu for providing the user with a list of the last 20 people who were called, sorted by date and time, with the last person called appearing at the top of the list;
  a Calls Received sub-menu for providing the user with a list of the last 20 people who called, sorted by date and time.

vi) a Tools menu 74 (see FIG. 25a) for providing the user with access to advanced features of the application 17, such as:
  a Phonebook sub-menu for providing the user with access to various phonebook functions and directories;
  a Messages sub-menu for providing the user with access to messaging functions, greetings as well as voicemail messages left for the user in the Call Log (discussed below);
  a Call Log sub-menu which opens the user's call log, (discussed below);
  a Call Screening menu the call screening function on or off (i.e. sending incoming calls, except those in the Call Screen folder of the phonebook, to voicemail without disturbing the user;
  a Recorder menu item for opening the Recorder window for recording a conversation;
  a Diallers sub-menu for providing a list of user defined buttons which can be used for speed-dialling or navigation (discussed in greater detail below).

The options of Menu bar 67 according to the embodiment of FIG. 5 are similar, except that there are no View and Dial menu items.

Figure 6A:
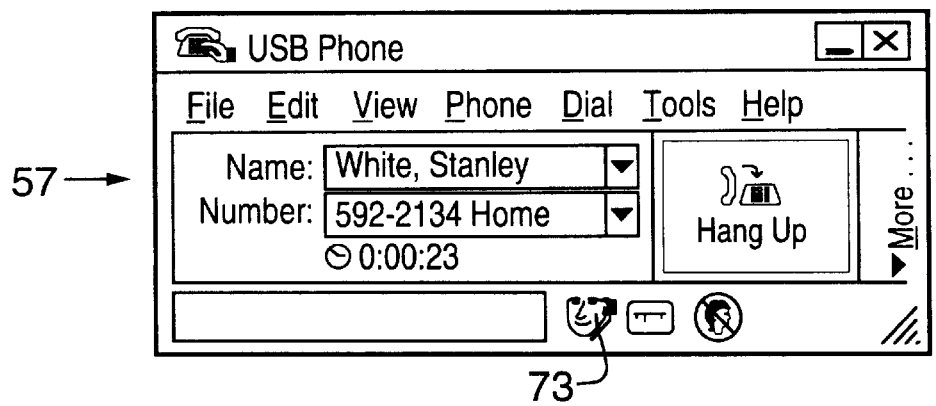
FIGS. 6a though 6c show a receptionist icon or indicator of a status line of the main window according to the first embodiment.
Figure 6B:
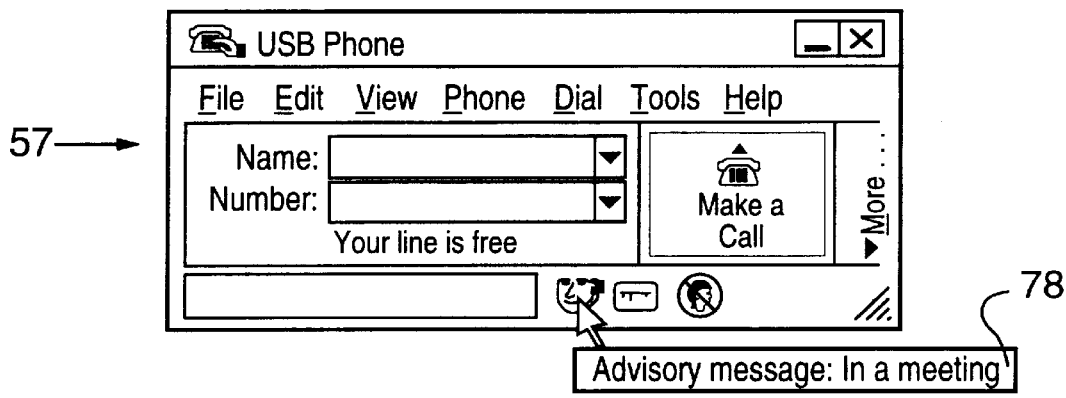
Figure 6C:
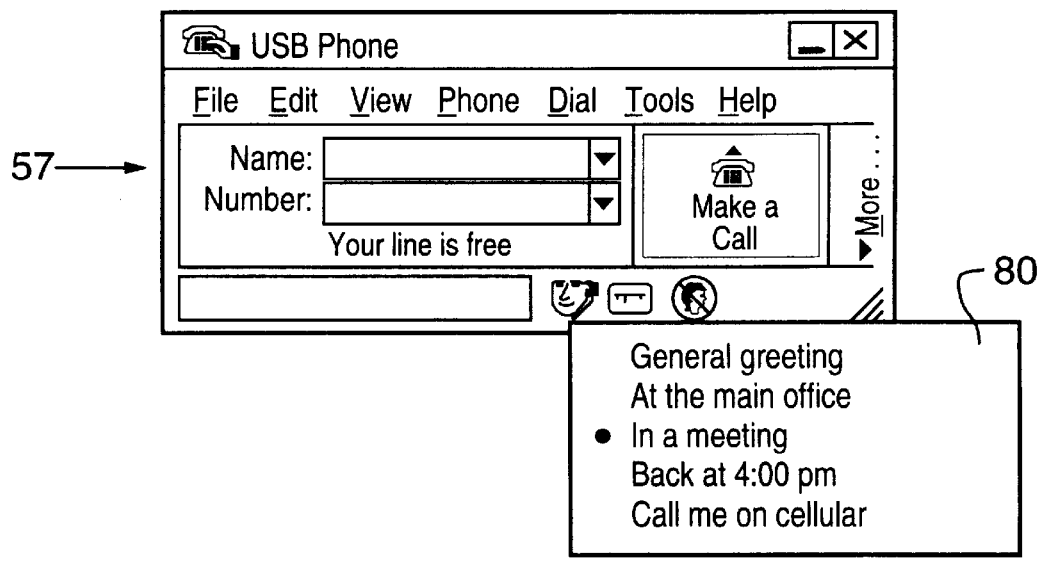

As indicated above, and as shown in FIGS. 6a to 6c, the status line 71 includes a receptionist icon 73 for indicating that the receptionist function is active, meaning that advisory messages and personal messages are automatically played for specific callers based on CLID. As shown in FIG. 6b, when the mouse pointer 10 enters the bounding box of receptionist icon 73, a tool tip box 78 opens displaying the current message to be played for incoming callers who are sent to voicemail. A right mouse button click when the mouse pointer 10 is over the receptionist icon 73 opens a shortcut menu 80 for selecting advisory messages, as shown in FIG. 6c.

In the alternative embodiment shown in FIGS. 5a through 5c, the receptionist icon 73 appears as a button for implementing predetermined features such as call screening, call blocking, greetings and personal messages, all of which are discussed in greater detail below.

Figure 7A:
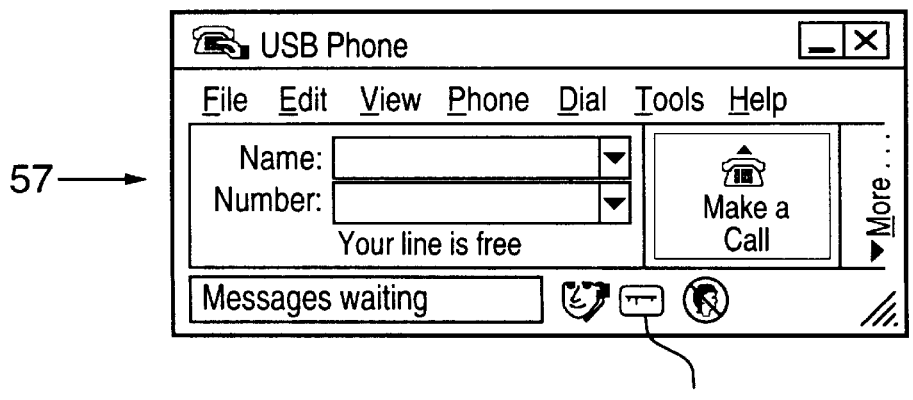
FIGS. 7a though 7c show a voicemail icon or indicator of the status line of the main window according to the first embodiment.
Figure 7B:
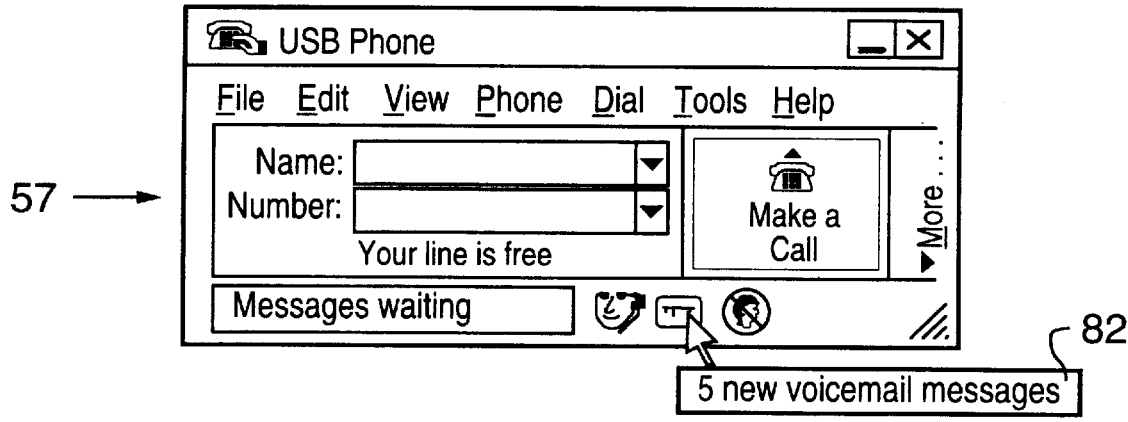
Figure 7C:
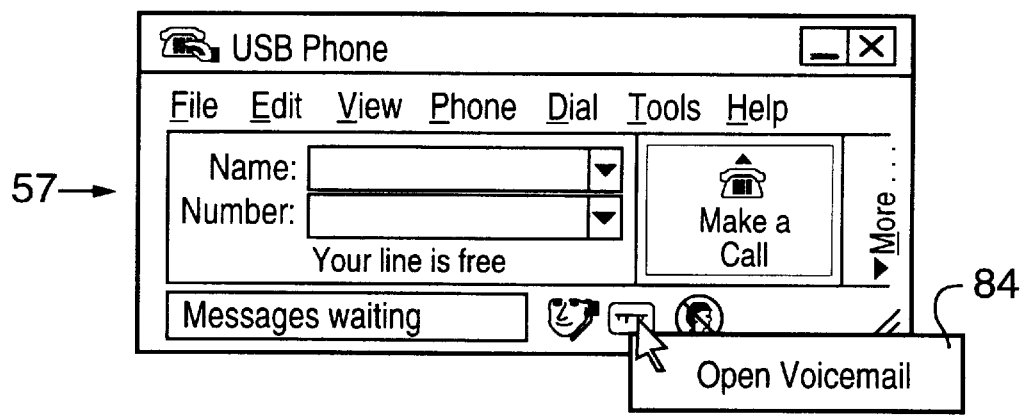

The status line 71 also includes a voicemail icon 75 which functions as a messages indicator to alert the user to any new voicemail messages. As shown in FIGS. 7a to 7c, when messages are waiting the icon flashes (FIG. 7a). As shown in FIG. 7b, when the mouse pointer 10 enters the bounding box of voicemail icon 75, a tool tip box 82 opens displaying the number of new messages. A right mouse button click when the mouse pointer 10 is over the voicemail icon 73 opens a shortcut menu 84 for accessing voicemail messages, as shown in FIG. 7c. A double click opens the voicemail folder of the Call Log, as discussed in greater detail below.

Figure 8A:
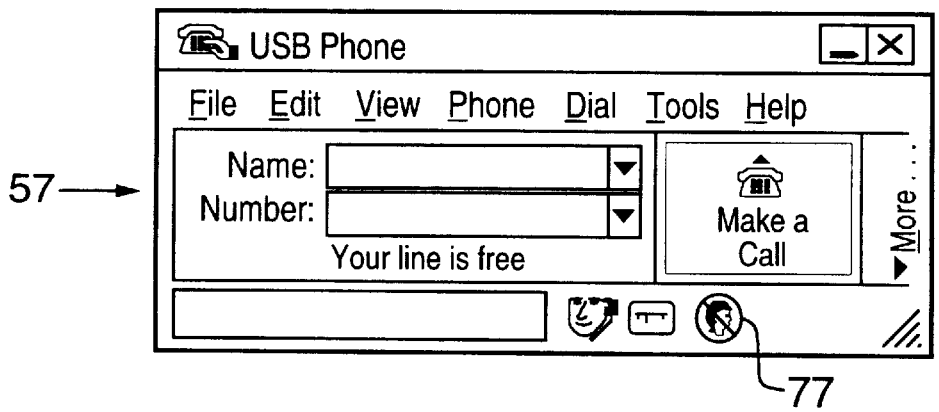
FIGS. 8a though 8d show a "Do Not Disturb" icon or indicator of the status line of the main window according to the first embodiment.
Figure 8B:
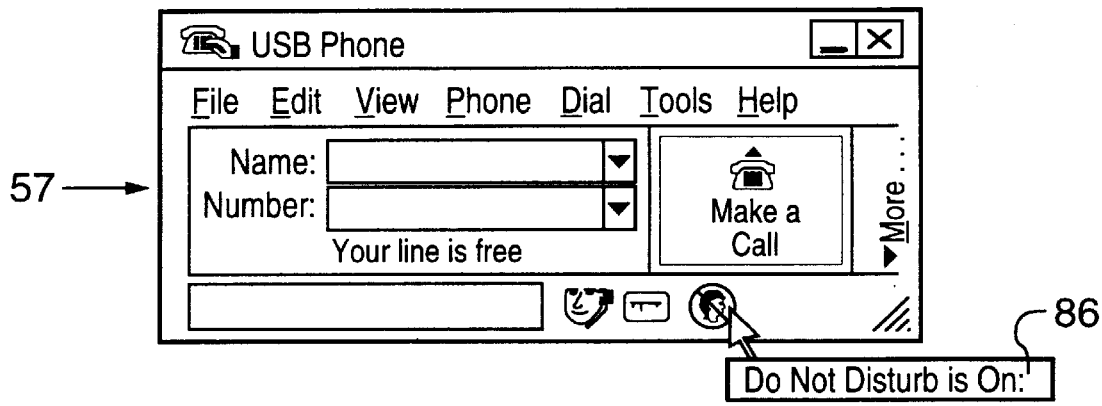
Figure 8C:
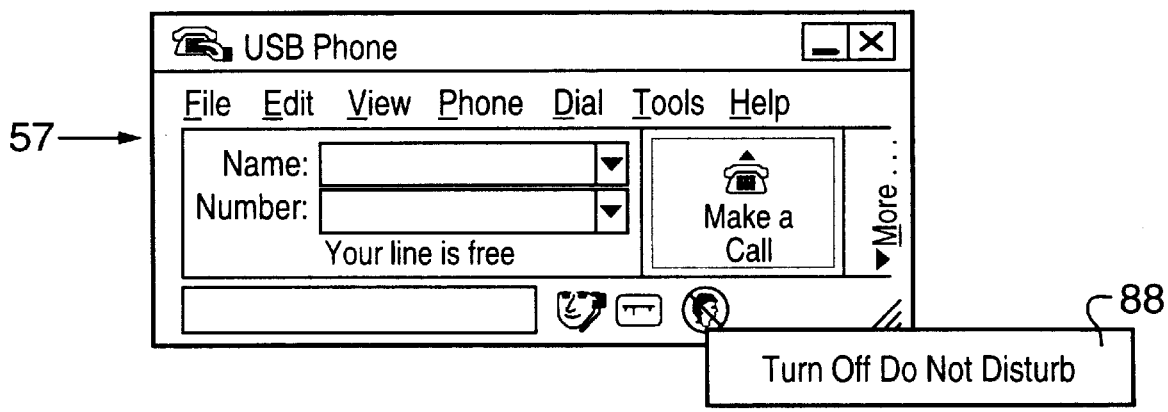
Figure 8D:
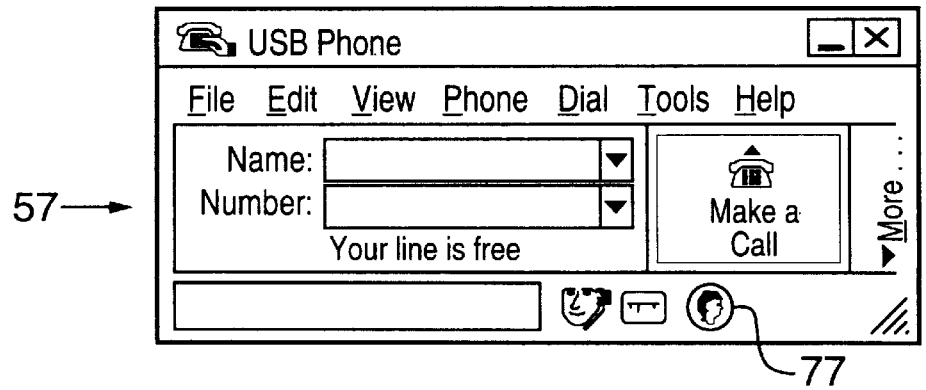

A "Do Not Disturb" icon 77 is included in the status line 71, as shown in greater detail with reference to FIGS. 8a to 8d. The "Do Not Disturb" icon 77 alerts the user that some or all callers are being prevented from calling in (see FIG. 8a). As shown in FIG. 8b, when the mouse pointer 10 enters the bounding box of "Do Not Disturb" icon 77, a tool tip box 86 opens displaying the status of Call Screen. A right mouse button click when the mouse pointer 10 is over the voicemail icon 73 opens a shortcut menu 88 for turning the Call Screen function on or off, as shown in FIG. 8c, while a double click toggles between the on/off states. FIG. 8d shows the icon 77 indicating that Call Screen is off.

In the alternative embodiment of FIG. 5, a bell icon 72 is provided for opening a sound manager window for creating or changing sounds and assigning predetermined sounds to different functions, as discussed in greater detail below.

Figure 9A:
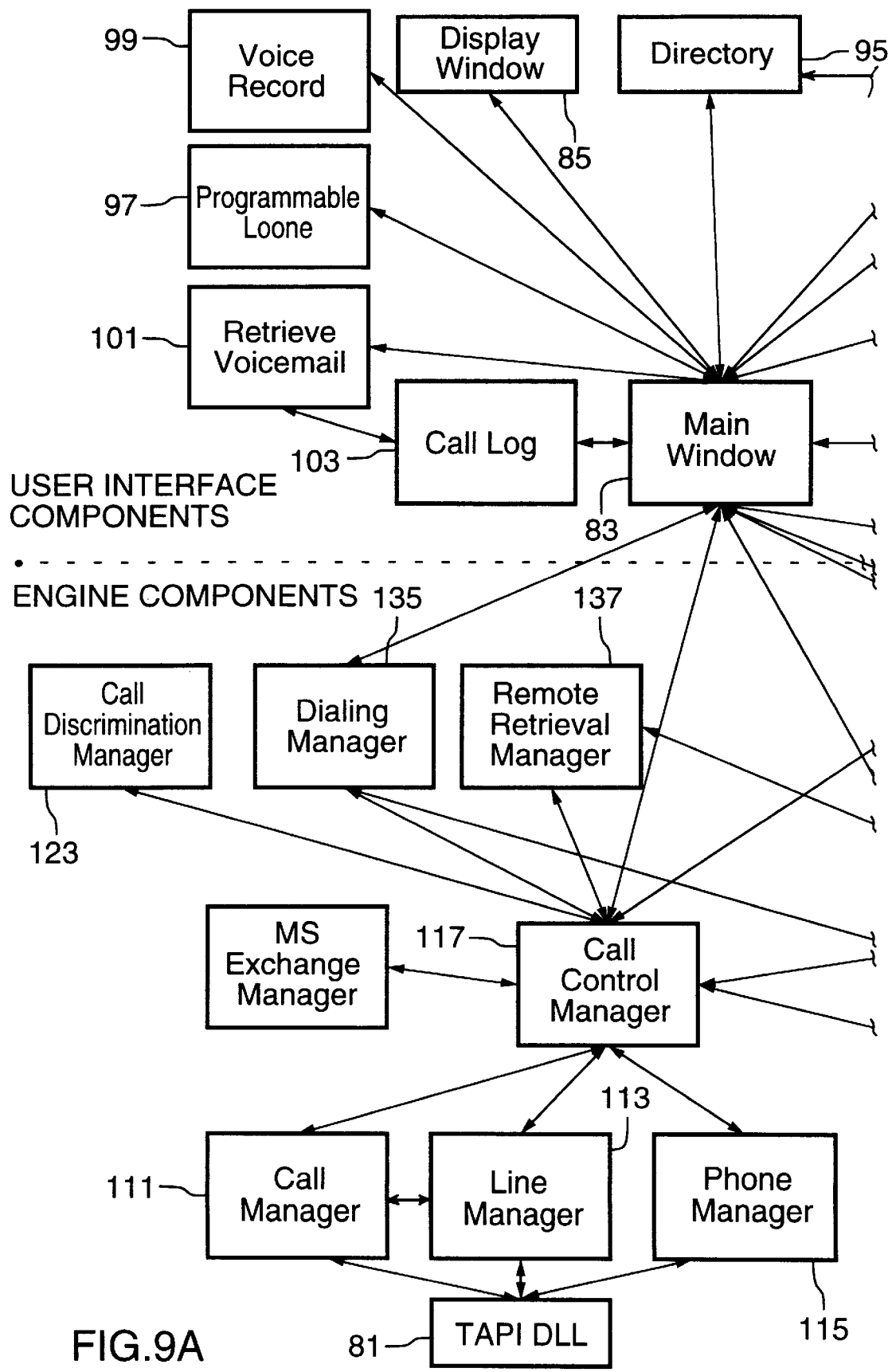
FIG. 9 is a block diagram showing user interface components of the software application and engine components of the core software module executed by the computer according to the present invention.
Figure 9B:
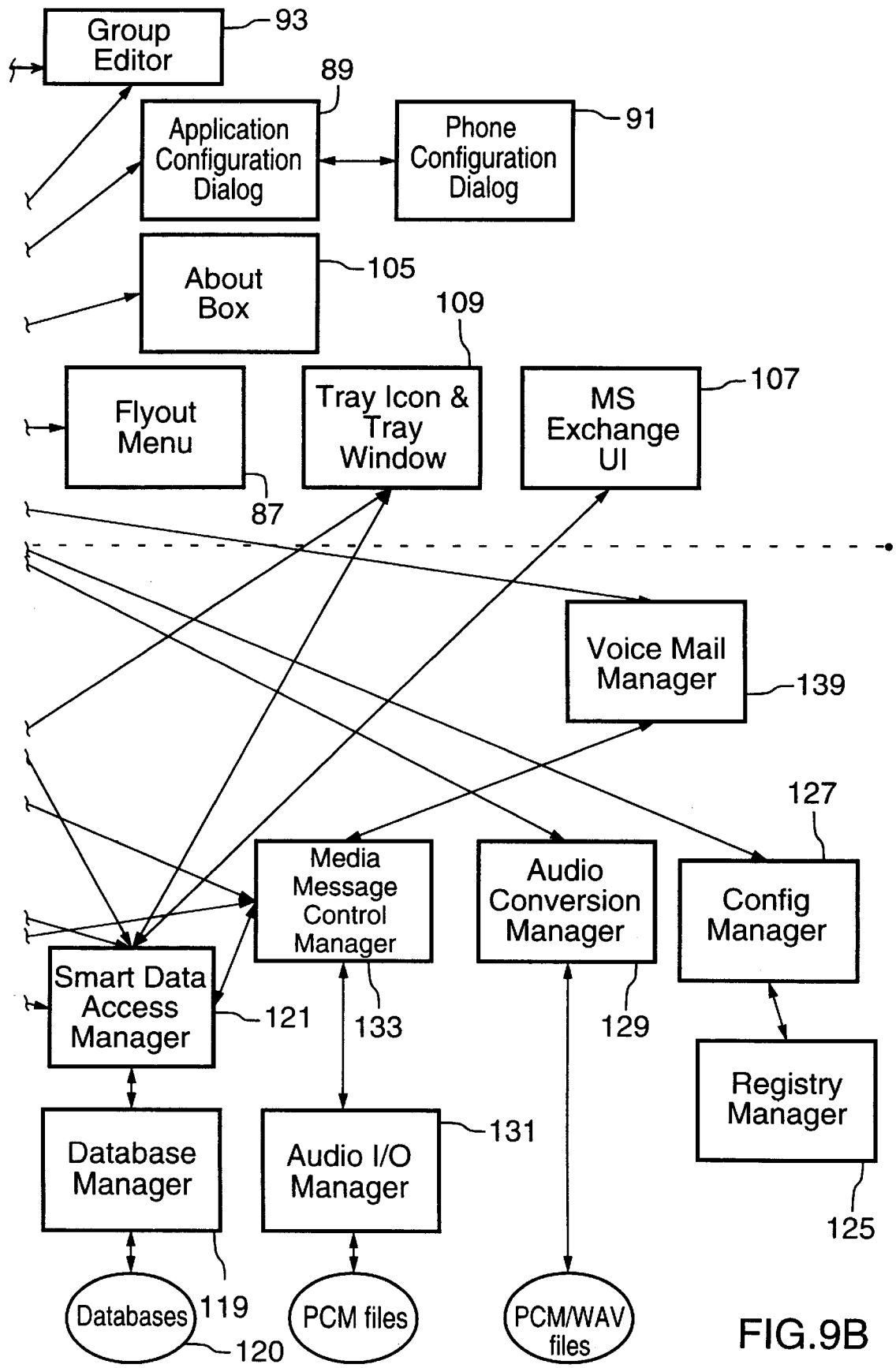

Turning now to FIG. 9, the user interface components of software application 17 and the engine components of core 27 are shown in greater detail. All communications between the engine components and the user interface components are provided through a main window component 83. The main window component 83 displays the main window display 57 including menu bar 67, toolbar 60, status line 71, display area 61 and default button 63, as discussed above. If the data being communicated by the core 27 is intended for a user interface component other than the main window component 83, the main window component routes it appropriately.

A display window component 85 functions in conjunction with the main window component 83 to generate display area 61 for showing line and call information.

Flyout menu component 87 displays the context-sensitive control bar 79 for providing push-button-style menu selections.

The application configuration dialog 89 and phone configuration dialog 91, in combination allow the user to configure the software application, as discussed in greater detail below with reference to FIG. 27.

The group editor 93 allows the user to manipulate entries in a Call Screening list, Call Blocking List or Speed Dial list, as discussed in greater detail below.

The directory component 95 displays information relating to the user's business and personal contacts. The Phonebook is analogous to a Personal Information Manager (PIM). The Phonebook display is discussed in greater detail below with reference to FIG. 23, and contains the following tabs:

Home—Name and home address

Work—Name, company name, type of contact and business address

Phone Numbers—Home, business, fax and cellular phone numbers

Personal—User selectable greeting and message preferences

Notes—Editor OCX that supports sound objects

Shortcuts—Window with preferred application icons (e.g. Microsoft Word®, Excel®, etc.) which are automatically opened when the contact is called or when the contact calls The user can configure programmable icons using the programmable icons dialog 97. These icons can be programmed to access CO voicemail and IVR systems.

The voice record dialog 99 allows the user to record greetings and other voice recordings.

The retrieve voicemail dialog 101 is used to access voicemail messages.

The call log 103 is used to display all telecommunications activity from the application 17.

The about box 105 displays application version information and current system statistics, in a conventional manner.

When the user wishes to play a voice mail message from Microsoft Exchange®, a Microsoft Exchange UI application 107 is invoked, (user interface). This application displays controls to play, stop, rewind and fast forward the message.

The tray icon 109 appears in the Windows 95® task bar. When this icon is selected, the tray window is displayed. The tray window provides access to basic functions of the application 17.

Turning now to the engine components of core 27, call manager 111 maintains call-specific data for all existing calls on all lines. The call manager 111 uses TAPI to obtain the call-specific information it requires. For each call, the following data is stored:

1. TAPI call handle
2. call state
3. whether the call is incoming or outgoing
4. whether the call should be blocked (for incoming calls)
5. whether the call should be screened (for incoming calls)
6. digits dialled, name of person called (for outgoing calls)
7. caller ID number and name (for incoming calls)
8. call start time, call duration
9. DTMF digits received (for incoming calls)

The line manager 113 maintains line-specific data for all available telephone lines. It interfaces to TAPI 31 to perform line-related requests. The line manager facilitates multi-line support in the application 17. For each line, it stores the following data:

1. TAPI line handle
2. line state
3. feature supported by the line
4. count of rings for an unanswered incoming call
5. existing calls on the line (actual data is maintained by call manager 111)
6. number of rings to wait before answering incoming calls
7. voice mail on/off state Line manager 133 also performs the following line-related requests:

1. dial number
2. hang up
3. answer incoming call

The line manager 113 contains a TAPI callback to receive line-specific notifications from TAPI layer 31.

The phone manager 115 maintains data that is specific to the telephone 1. It interfaces to TAPI layer 31 to perform phone-related requests. The data maintained by phone manager 115 includes:

1. status of lamp 16
2. hookswitch status
3. phone button data

The phone manager 115 also contains a TAPI callback to receive telephone-specific notifications from TAPI layer 31.

During operation, the telephone 1 needs to know when the application 17 is active. When the application is not active, the telephone 1 reverts to a regular POTS telephone and the programmable buttons 15 lose their functionality. In order to determine whether the application 17 is active, the telephone 1 attempts to send a so-called 'are you alive?' message to the phone manager 115. The phone manager then responds with the appropriate reply.

The call control manager 117 manages all incoming and outgoing telephone calls in conjunction with the line manager 113, call manager 111 and phone manager 115 to access telephony functionality. The line and phone managers forward required call progress events which they receive from TAPI 31 to the call control manager 117. The call control manager 117 also manages any audio playback which may be required for a call.

The database manager 119 provides an interface to the databases 120 stored on disk in computer 7. The databases 120 are preferably stored in Microsoft Jet format (.MDB). This manager's interface is independent of the database technology being used. The database manager 119 supports the following functionality:

1. open and close databases
2. read and write database table data
3. perform database queries The smart data access manager 121 provides intelligent access and modification capabilities to all data required by the engine components of core 27 (excluding user preference data). For simplicity, the user interface components of application 17 may implement the data access fictionally they require. For the best mode of this invention as of its filing date, the user interface components are written in VisualBasic®, so that the task of implementing data access functionality required is simplified and results in saving the overhead of passing large amounts of data between the database and the engine components and then between the engine components and the user interface components. The smart data access manager 121 uses the database manager 119 to read and write data that is stored in the databases 120.

The smart data access manager 121 supports the following functionality (or the subset of this functionality that only the engine components require):
1. read/write call log data a. get Last Number Redial list b. get Calls Answered list c. get Calls Missed list
2. read/write Phonebook data
3. read/write voice mail data
4. read/write greeting message data
5. read/write programmable icon data All required queries (known in advance), are understood by the smart data access manager 121. This manager is responsible for keeping track of data storage mechanisms in use by the application 17. All audio recordings (e.g. greeting messages and voice mail messages) are stored as separate disk files. References to these files are stored in the databases 120 where needed.

The call discrimination manager 123 is responsible for determining the call type (voice, fax or data modem) of incoming calls, by means of fax tone detection, distinctive ring, caller ID and DTMF detection. The call control manager 117 passes any required call-specific information to the call discrimination manager 123 as it becomes available. Once an incoming call has been discriminated, the call discrimination manager 123 informs the call control manager of the result. If the call is a fax or data modem call, the call control manager 117 attempts to pass it to an application that can handle it (using the phone manager 115).

The registry manager 125 provides an interface to the Windows 95® registry.

The configuration manager 127 is responsible for maintaining application configuration information and user preferences on the basis of user input via the application configuration dialog 89 and phone configuration dialog 91. The configuration manager 127 uses the registry manager 125 to read and write the actual data.

The audio conversion manager 129 supports conversion between the native audio format (ADPCM) and the WAVE audio format. The native audio format will be used for recording and playback performed by the application 17. Audio files given to or obtained from other applications will be in the WAVE audio format.

The audio I/O manager 131 is responsible for audio file input and output. It understands the native format used internally for play and record operations.

The media message control manager 133 is responsible for:
I. recording and playing greeting Messages
II. recording and playing voice mail messages
III. playing the phone ringing sound The call control manager 117 notifies the media message control manager 133 when any of the above functions need to be performed.

The dialling manager 135 is responsible for processing all dialling requests including making calls from the Phonebook, the Last Number Redial list and the Speed Dial list. It also keeps track of all required phone company dialling sequences (e.g. 3-way calling and call waiting).

The remote retrieval manager 137 is in charge of providing all functionality that can be accessed remotely. This functionality consists of:
I. playing, saving and deleting voice messages,
II. modifying a greeting message According to one embodiment of the invention, the date and time that a voice message was received may be made available remotely, utilizing a text to speech OCX.

The voice mail manager 139 is responsible for playing previously recorded voice mail messages locally, either to the handset 11 or to a speaker device. This manager uses the smart data access manager 121 to get voice mail message file names and the media message control manager 133 to play the messages to the appropriate device.

The Microsoft Exchange® manager 141 provides an interface to all Microsoft Exchange® functionality required by the application 17. In order for all voice mail messages to appear in the Microsoft Exchange® Inbox, this manager adds a message to the Inbox folder of the user's message store for each voice mail message received. As well, when the user wishes to play a voice mail message from Microsoft Exchange®, a form application is invoked (as discussed in greater detail herein having regard to the Microsoft Exchange UI application 107 which displays controls to play, stop, rewind and fast forward the message).

Since voice mail messages can be played both from the application 17 and from Microsoft Exchange®, these two applications are synchronized in terms of played and deleted messages. If the Phonebook entries of application 17 are to appear in the user's default Microsoft Exchange® address book, the Microsoft Exchange® manager 141 ensures that the Phonebook and address book are kept in sync.

In order to better understand how the application 17 and engine components of core 27 function, several call scenarios are described herein below with reference to the first embodiment of the invention, although an understanding of the second embodiment will also be obtained therefrom.

A. Incoming Call

Figure 10A:
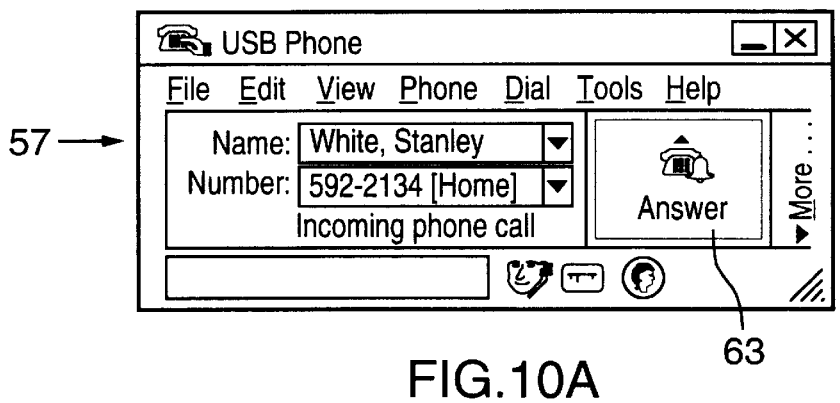
Figure 10B:
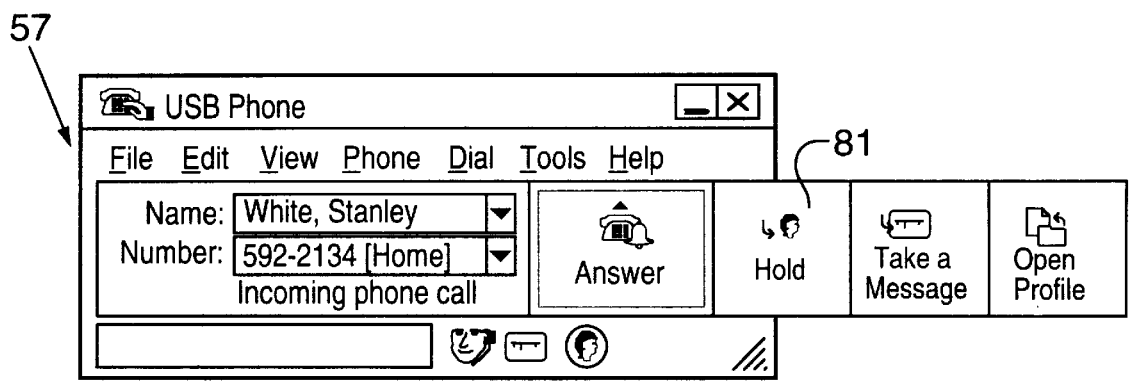
Figure 10C:
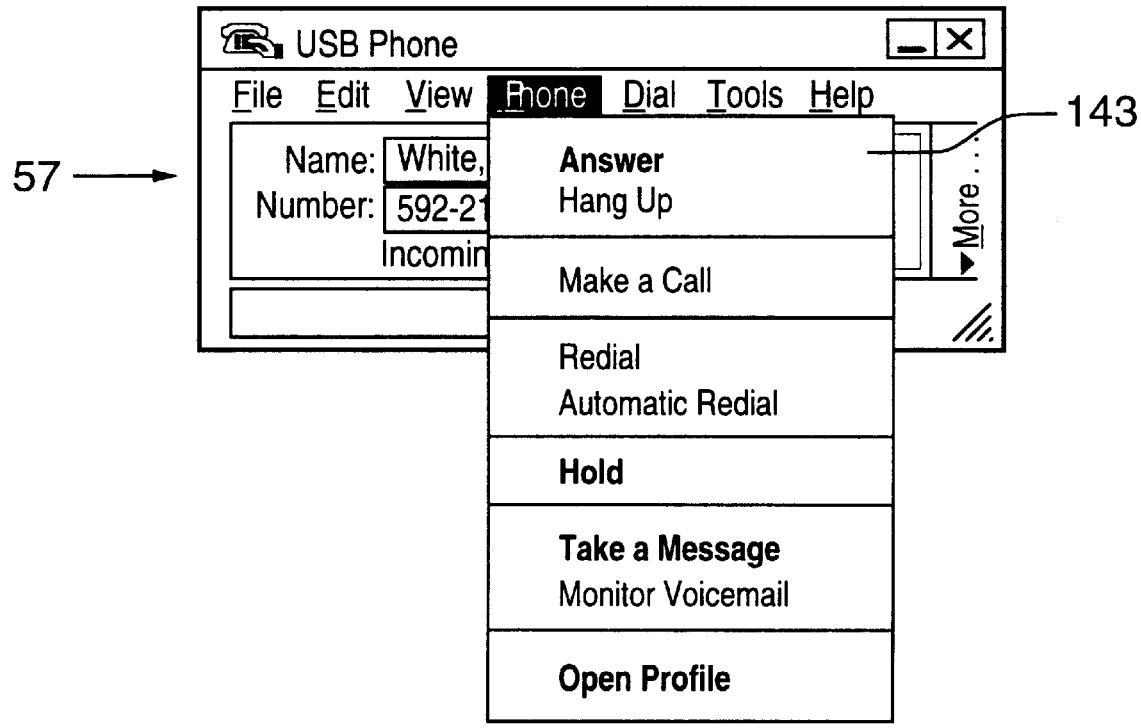

When an incoming call is received, TAPI.DLL 31 sends a message to the line manager 113 for each ring. This notification is forwarded to the call control manager 117. On the first ring, the line manager 113 creates a new call object using the call manager 111 and the call control manager 117 notifies the main window component 83 of the incoming call. In response, the main window 57 displays the incoming call status as shown in FIG. 10a wherein default button 63 displays a flashing bell icon. In FIG. 10b, the control bar 79 is shown in the open position for displaying various call answer options (other than the default option provided by button 63), while in FIG. 10c the same options are displayed via the phone menu item of menu bar 67.

Figure 10D:
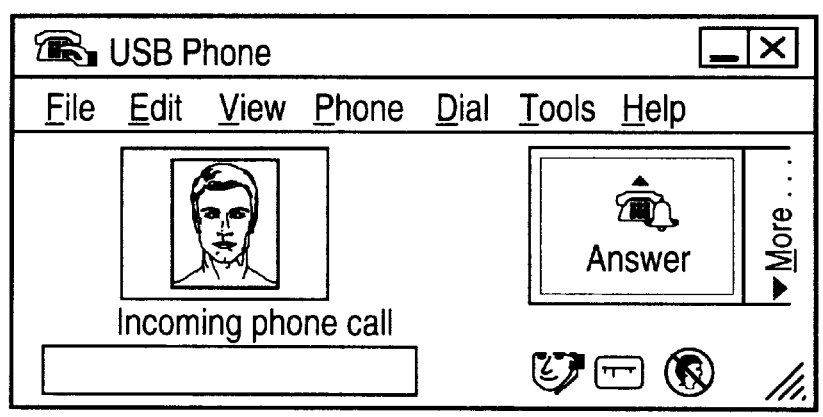
FIG. 10d shows the main display according to the alternative embodiment.

With each ring event, the call control manager 117 causes the media message control manager 133 to play a "phone ringing" sound to the appropriate local speaker device. If a "caller ID data received" notification is received by the line manager 113, the line manager asks the call manager 111 to store the caller ID data with the call's object. The call control manager 117 then forwards the information to the call discrimination manager 123 and the main window component 83. The main window component 83 and the directory component 95 search the Phonebook directory for a match in stored telephone number with the identified telephone number of the calling party. In the event of no match being found, the unaltered CLID data is displayed in display area 61 (i.e. caller name and telephone number). In the event of a match, the caller's name and telephone number are displayed in display area 61 of main window 57. According to the alternative embodiment, the user's image may also be displayed as shown in FIG. 10d.

The call control manager 117 uses the smart data access manager 121 to determine if the call should be blocked or screened. The resulting information is stored in the call's object. If the call is to be blocked, the call control manager 117 either hangs up on the caller or sends the call to voice mail.

If distinctive ring data is received by the line manager 113, it is stored in the call object and forwarded to the call discrimination manager 123.

Figure 11A:
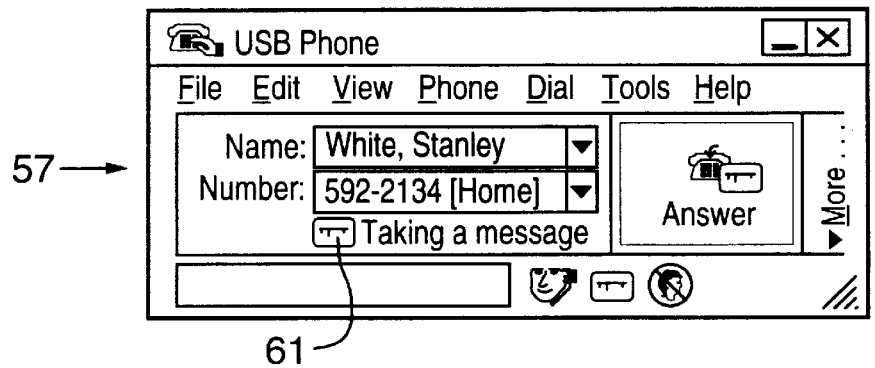
FIG. 11 shows the main window display according to the first embodiment when an incoming call is sent to voice mail (FIG. 11a), with the control bar in the open position (FIG. 11b), and with the Phone menu open (FIG. 11c)
Figure 11B:
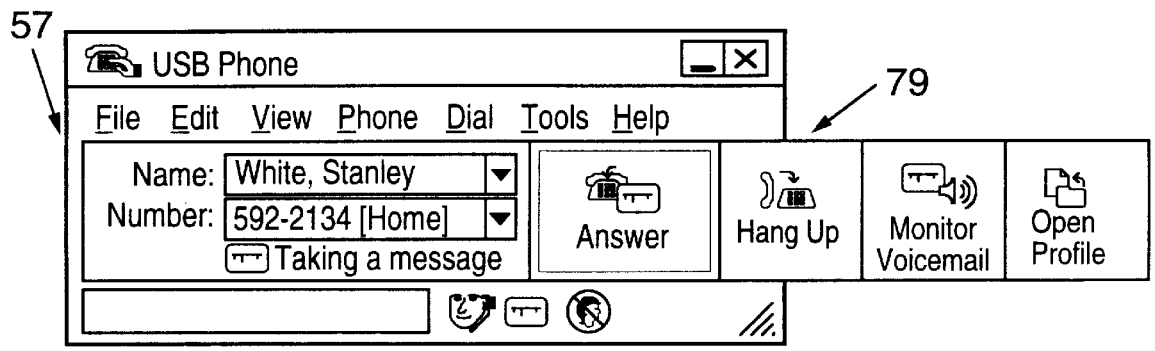
Figure 11C:
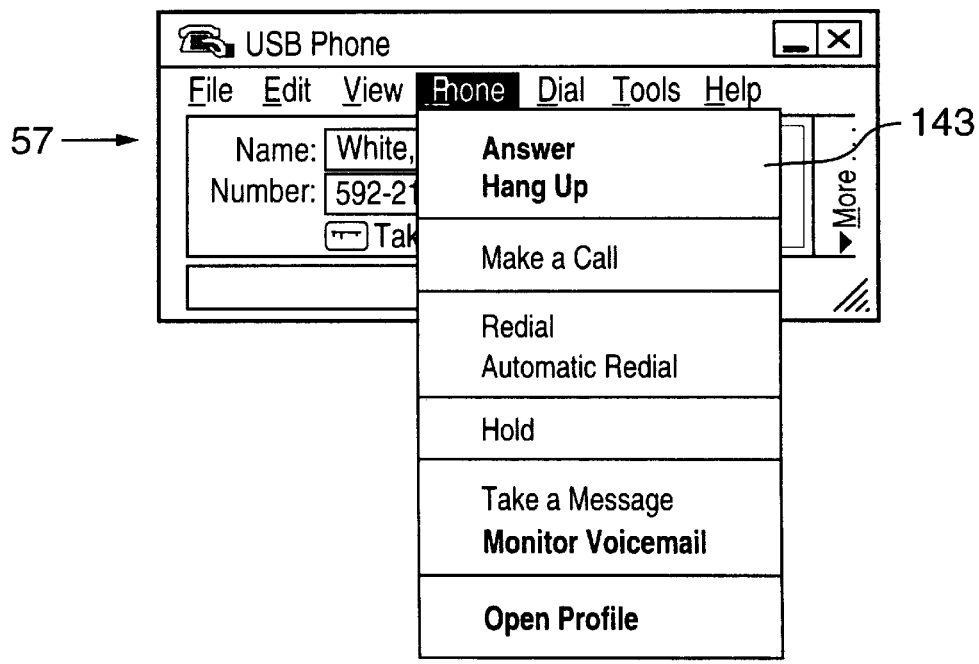

With each ring event, the line manager 113 asks TAPI 31 for the answer ring count for the given line. If voice mail is turned on (which is determined from the configuration manager 127), after the required number of rings have occurred, the line manager 113 answers the call. The call control manager 117 then sends the call to voice mail, and forwards the information to the main window component 83 for display via display area 61 of main window 57, as shown in FIGS. 11a, 11b and 11c (wherein reference number 143 represents the Phone menu choice display from menu bar 67).

If a call is sent to voice mail, the call control manager 117 gets the file name of the greeting to be played to the caller from the smart data access manager 121. This can be done using caller ID. The call control manager 117 also obtains the name of a file to which the voice mail message can be saved. The two file names are then passed to the media message control manager 133. This manager first plays the greeting to the appropriate line device. Once the greeting playback has finished, it plays a "beep tone" sound to the line device. Once this sound has finished playing, recording starts. When recording has finished, the call control manager 117 asks the media message control manager 133 to stop recording. At this point, the call control manager 117 sends the voice mail message data to the smart data access manager 121 which stores it, and the phone manager 115 causes the lamp 16 to flash at telephone set 1.

If the user has fax software running on computer 7, the phone manager 115 causes lamp 16 to flash upon receipt of an incoming fax. Similarly, it is contemplated that the lamp 16 may be caused to flash upon receipt of an incoming email message, or any multimedia message received via the computer 7.

Figure 12A:
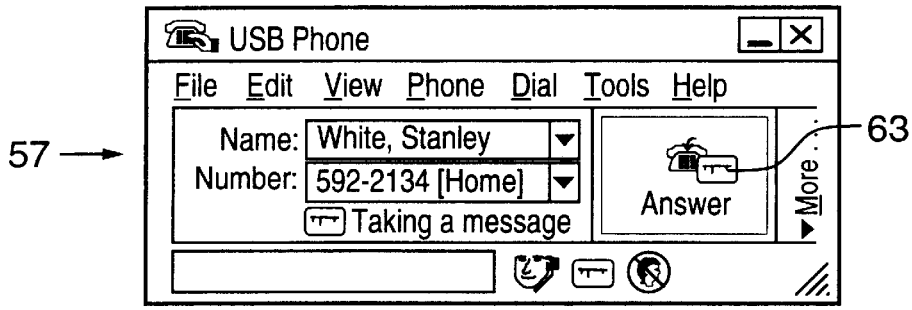
FIG. 12 shows the main window display according to the first embodiment when a voice mail message is being recorded (FIG. 12a) and the user picks-up the call (FIG. 12b)
Figure 12B:
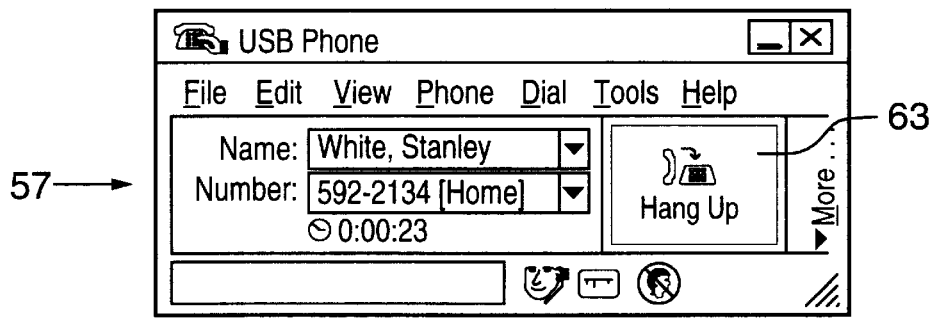

If the user picks up the telephone handset or depresses the default button 63 while the call is in voice mail (FIG. 12a), the call is taken out of voice mail and put in conversation mode (FIG. 12b). If a voice mail message was in the process of being recorded, the voice mail data is sent to the smart data access manager 121.

Figure 13:
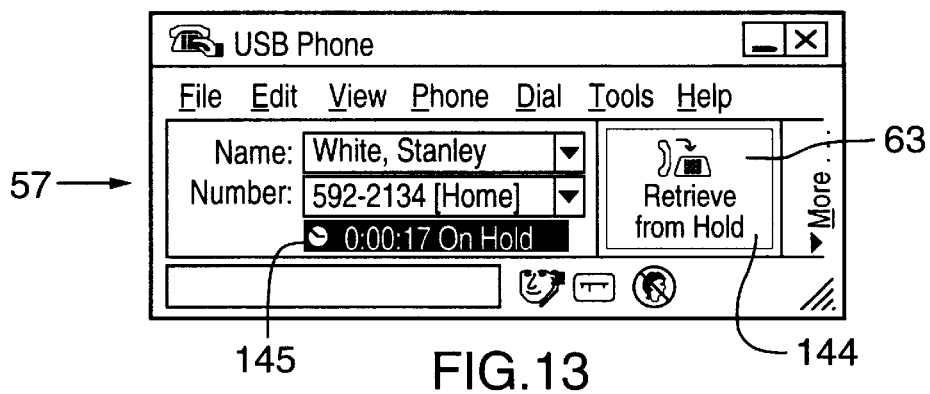
FIG. 13 shows the main window display according to the first embodiment when a call is diverted to hold.

If the user requests to divert the call to "Hold" and play the "Please Wait" message (e.g. by depressing the "Hold" function button 81 (FIG. 10b)), the call control manager 117 asks the line manager 113 to put the call on hold. Then the call control manager 117 sends a request to the media message control manager 133 to play the "Please Wait" message. The call control manager 117 also send this information to main window component 83 which causes the icon 144 for default button 61 to change to "Retrieve from Hold" (FIG. 13) and to display an "On Hold" message and hold timer 145.

Figure 14A:
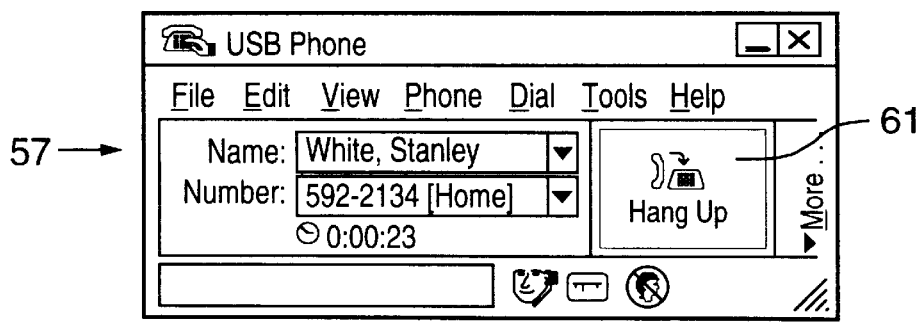
FIG. 14 shows the main window display according to the first embodiment during a hang-up sequence beginning with the user hanging up (FIG. 14a), the call state being indicated as "Hanging Up" (FIG. 14b), and finally the call state being indicated as "Your Line is Free" (FIG. 14c)
Figure 14B:
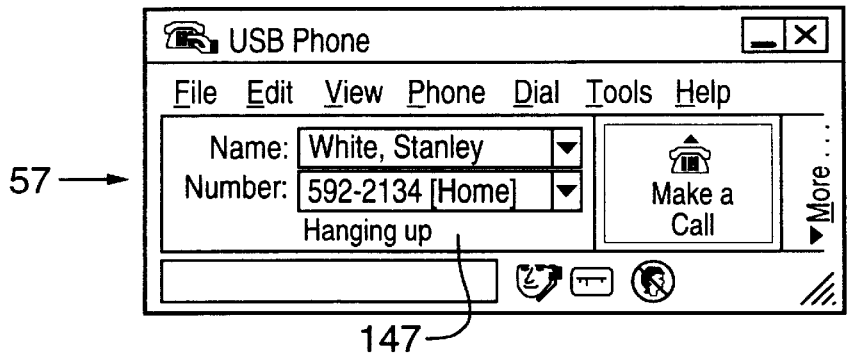
Figure 14C:
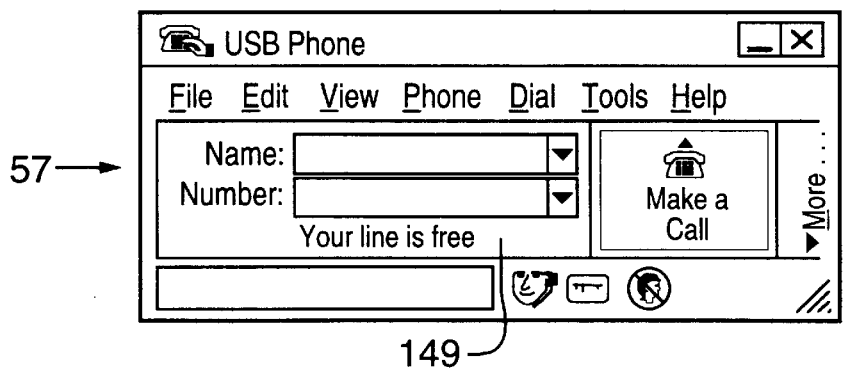

When the user hangs-up the handset 11 or presses the "Hang Up" icon in default button 61 to complete the call (FIG. 14a), call control call manager 117 advises main window component 83 which generates a "Hanging Up" message 147 in display area 61 (FIG. 14b), and also retrieves the call data from the line manager 113 and passes it to the smart data access manager 121 which creates a call log entry (described in greater detail below). Then the call object is deleted and call control manager 117 advises window component 83 which displays the idle state of window 57 with a "Your Line is Free" message 149 in display area 61 (FIG. 14c).

B. Outgoing Call

Outgoing calls can be initiated in a number of ways, such as direct dial, store and dial, look-up name, speed dial and drag & drop name into the name field of display area 61, as discussed in greater detail below.

Figure 15A:
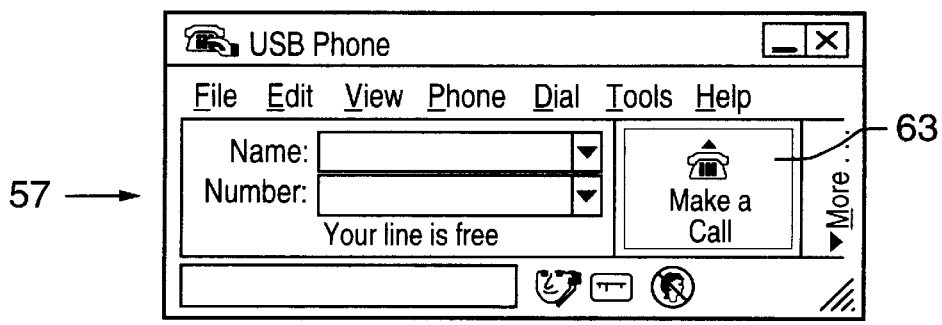
FIG. 15 shows the main window display according to the first embodiment during a direct dial sequence beginning in the idle state with the user clicking the "Make a call" default button (FIG. 15a), followed by positioning of the cursor over the Number field and the call state being indicated as "Enter a phone number" (FIG. 15b), entering of dial digits (FIG. 15c), and finally upon a match between the entered dial digits and a number stored in the Phonebook, the called party's name is displayed along with a call timer for the duration of the call (FIG. 15d)
Figure 15B:
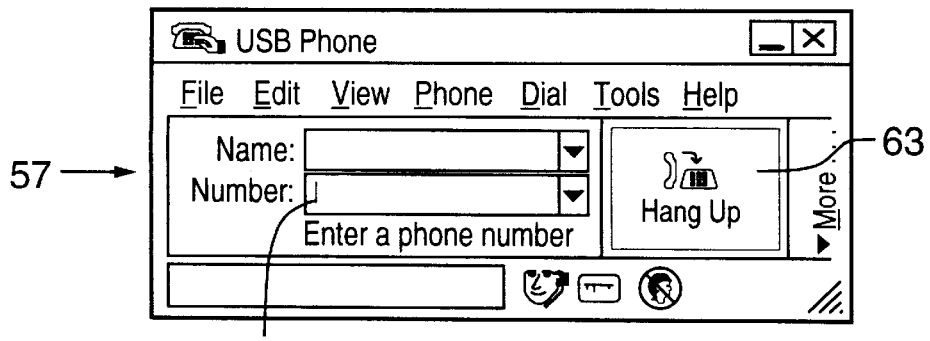
Figure 15C:
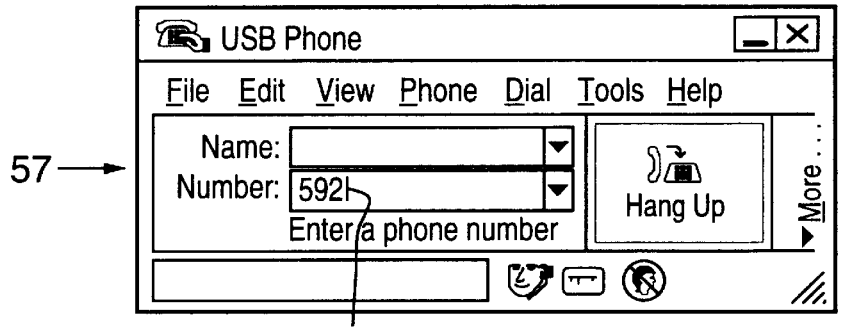

The user can dial directly from the telephone set 1 by either first picking up the handset 11 or pressing a speaker key to obtain dial tone and then dialling the phone number normally via the keypad 13. The user can also directly dial from application 17, as shown in FIGS. 15a to 15d. From the idle state (FIG. 15a), the user clicks the "Make a Call" icon displayed in default button 63. In response, the main window component 83 sends a request to the dialling manager 135 to select a line. Upon selecting the line, dial tone is generated for the user and the call control manager 117 sends a message to main window component 83 for causing a cursor to flash in the "Number" field 151 of display area 61 (FIG. 15b).

Figure 15D:
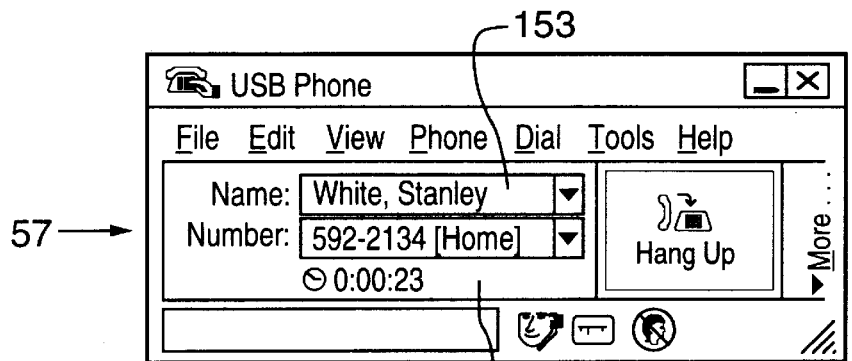

As digits are entered from the keypad 13 or keyboard 12 (FIG. 15c), DTMF tones are generated and the dialling manager 135 constructs the relevant dial string and then asks the line manager 113 for a dialling prefix. If the user wishes to make a private call, the appropriate dialling characters are inserted into the dial string. If the digits entered match a Phonebook entry, the name of the person being called is displayed in the "Name" field 153 of display area 61 and the call timer 155 is displayed (FIG. 15d). The dial string (and, if known, the name of the person being called) is then passed to the line manager 113 which creates a call object and initiates the call.

Figure 16A:
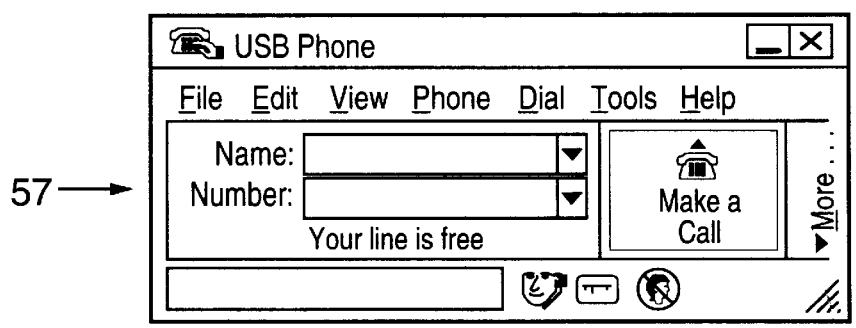
FIG. 16 shows the main window display according to the first embodiment during an on-hook dial sequence beginning in the idle state (FIG. 16a), followed by positioning of the cursor over the Number field and entering of dial digits (FIG. 16b), as digits are entered, if a match is found in the Phonebook, the name of the person being called is displayed in the Name field (FIG. 16c), clicking of the "Make a Call" icon appearing in the default button (FIG. 16d), and finally initiating the call and displaying the call timer (FIG. 16e)
Figure 16B:
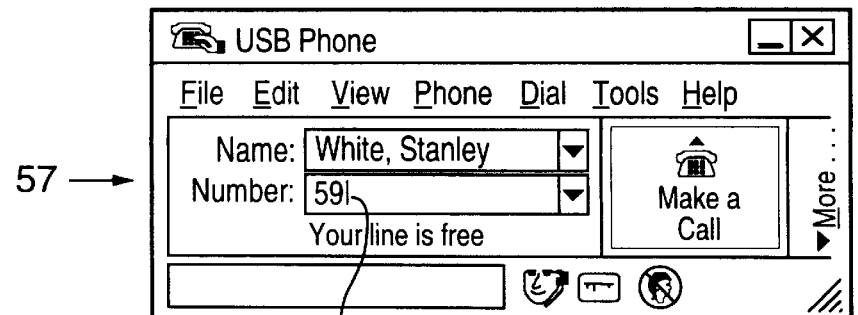
Figure 16C:
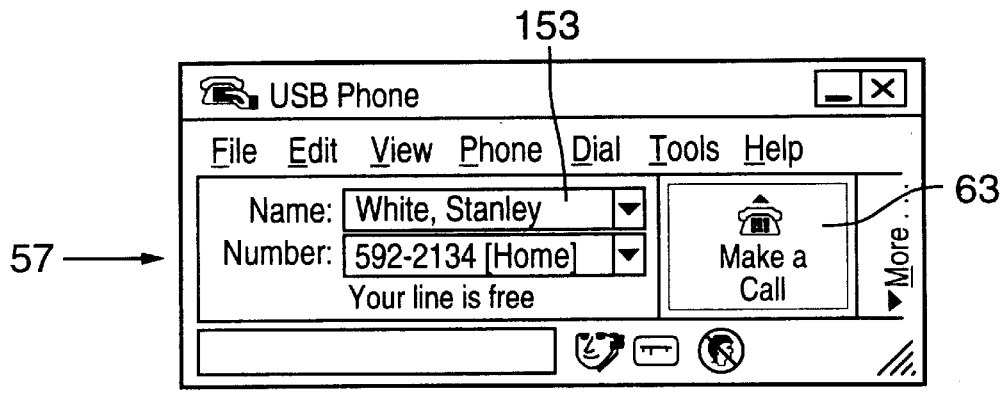
Figure 16D:
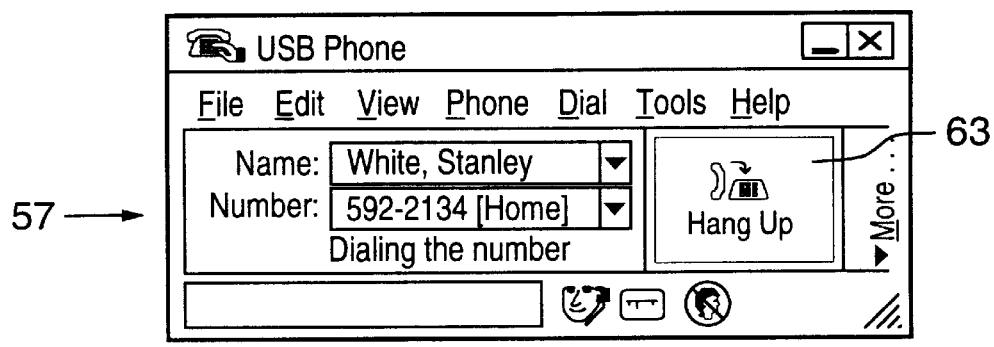
Figure 16E:
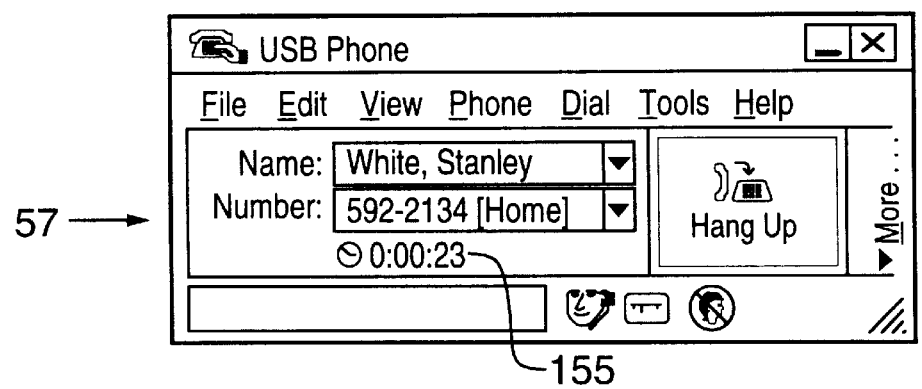

The user can also enter a phone number while on-hook, before out-pulsing the digits, as shown in FIGS. 16a to 16e. From the idle state (FIG. 16a), the user "clicks" the Number field 151. The cursor then flashes in the Number field 151 and the user begins entering digits (FIG. 16b). As digits are entered, if a match is found in the Phonebook, the name of the person being called is displayed in the Name field 153 (FIG. 16c) along with any label associated with the number (e.g. "Home", "Office"). Then the user clicks the "Make a Call" icon appearing in default button 63, or hits the "Enter" key since the default button 63 is in "focus", in response to which the line is selected and the digits are out-pulsed (FIG. 16d), via appropriate interaction between line manager 113 and dialling manager 135, as discussed above. After dialling has been completed, the call timer 155 is displayed (FIG. 16e).

Figure 17A:
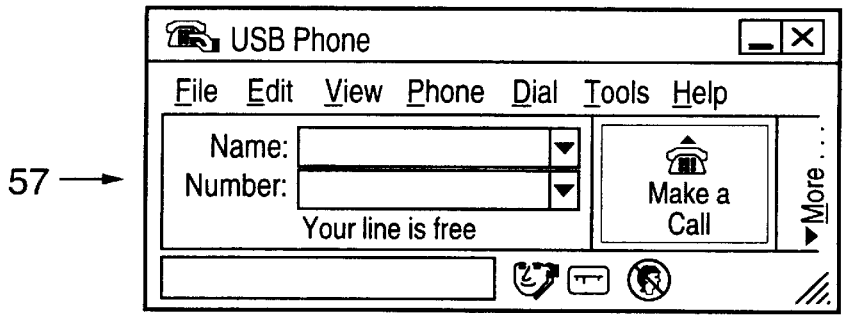
FIG. 17 shows the main window display according to the first embodiment during a dial by name sequence beginning in the idle state (FIG. 17a), followed by positioning of the cursor over the Name field and entering of letters of the name of the person to be called (FIG. 17b), as letters are entered, if a match is found in the Phonebook, the name and default telephone number of the person being called are displayed (FIG. 17c), selecting a different phone number for the person being called, from a drop-down list (FIG. 17d), clicking of the "Make a Call" icon appearing in the default button (FIG. 17e), and finally initiating the call and displaying the call timer (FIG. 17f)
Figure 17B:
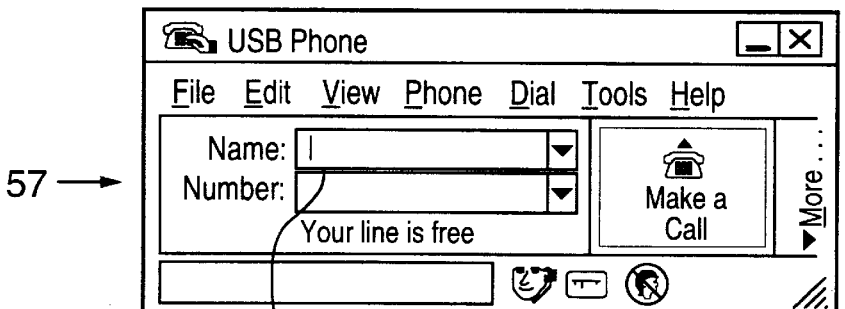
Figure 17C:
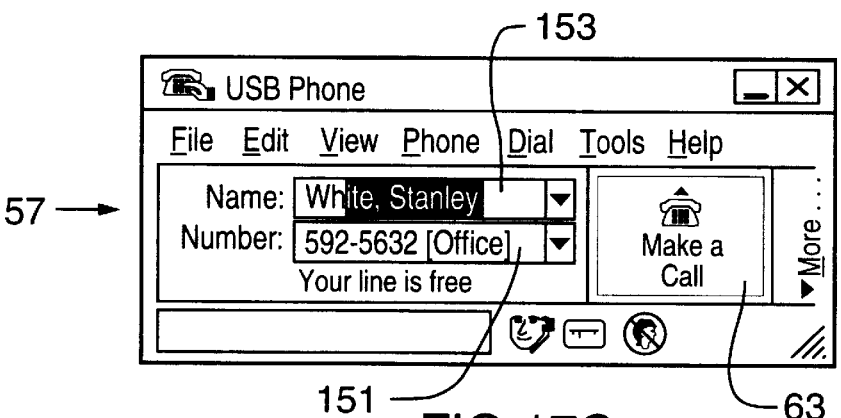
Figure 17D:
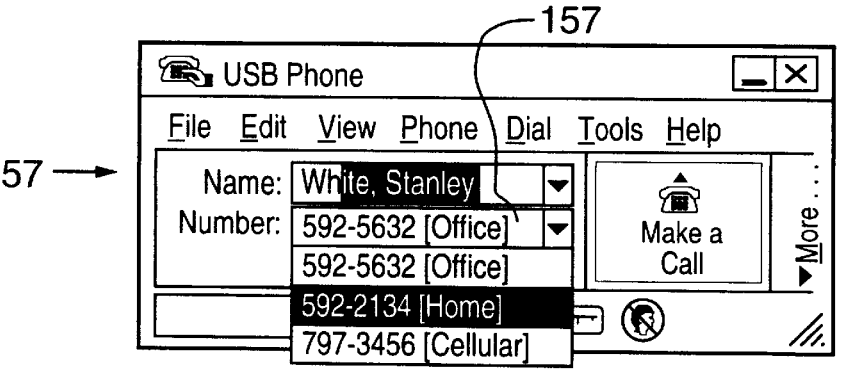
Figure 17E:
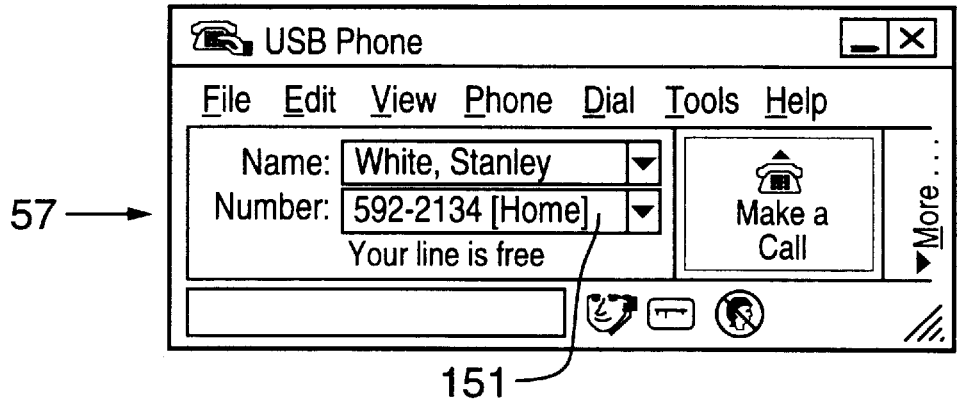
Figure 17F:
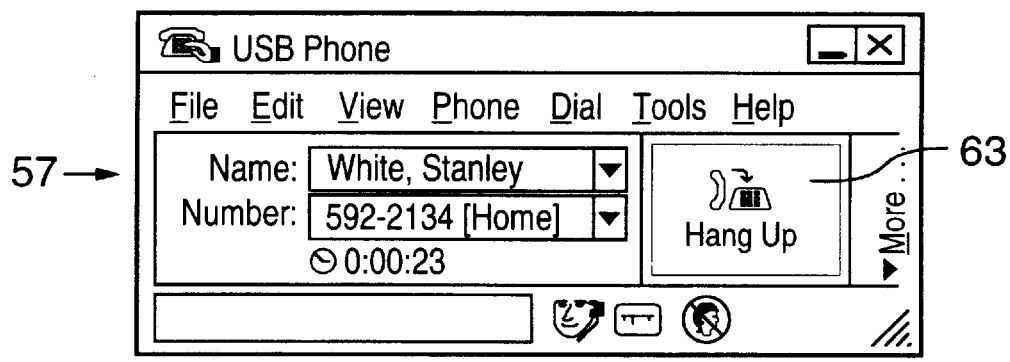

The user can look-up a person by name without having to open the Phonebook. This calling sequence is shown in FIGS. 17a to 17f. From the idle state (FIG. 17a), the user "clicks" the Name field 153. The cursor then flashes in the Name field 153 and the user begins entering letters of the name of the person to be called (FIG. 17b). As letters are entered, the Phonebook is searched for matching names, the "found" portion of a matched name is then highlighted in the Name field 153, and a default phone number for the entry is displayed in the Number field 151 (FIG. 17c). The user can select a different phone number for the person being called, from a drop-down list 157 activated by clicking on the down arrow at the right of the Number field 151 (FIG. 17e). Once the desired number is selected and displayed in the Number field 151 (FIG. 17e), the user clicks the "Make a Call" icon in default button 63 or hits the "Enter" key to select the line and begin digit out-pulsing, as described above. After dialling has been completed, the call timer 155 is displayed (FIG. 17f).

Figure 18A:
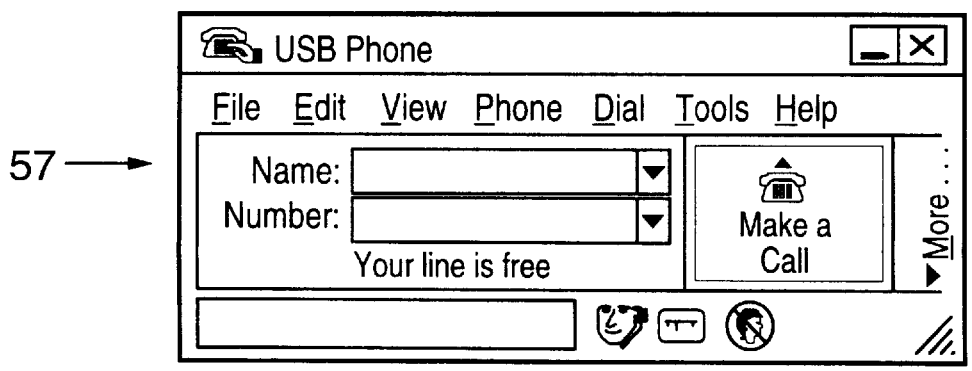
FIG. 18 shows the main window display according to the first embodiment during a speed dial sequence beginning in the idle state with the user selecting a "Dial "menu item from the menu bar (FIG. 18a), selecting a name and number from the "Speed Dial" list FIG. 18 b), displaying the selected name and number are displayed (FIG. 18c), initiating the call and displaying the call timer (FIG. 18d)

Using speed dial, a user can quickly access a list of important or frequently called persons, without having to search the Phonebook, as shown in FIGS. 18a to 18d. From the idle state (FIG. 18a), the user selects the "Dial "menu item from menu bar 67. From the "Speed Dial" list (FIG. 18b), a name and preferred number are selected. The selected name and number are displayed (FIG. 18c), a line is selected and out-pulsing begins as described above, and the default button 63 changes its icon to "Hang Up". Once the dialling is complete, the call timer 155 starts (FIG. 18d).

Figure 19A:
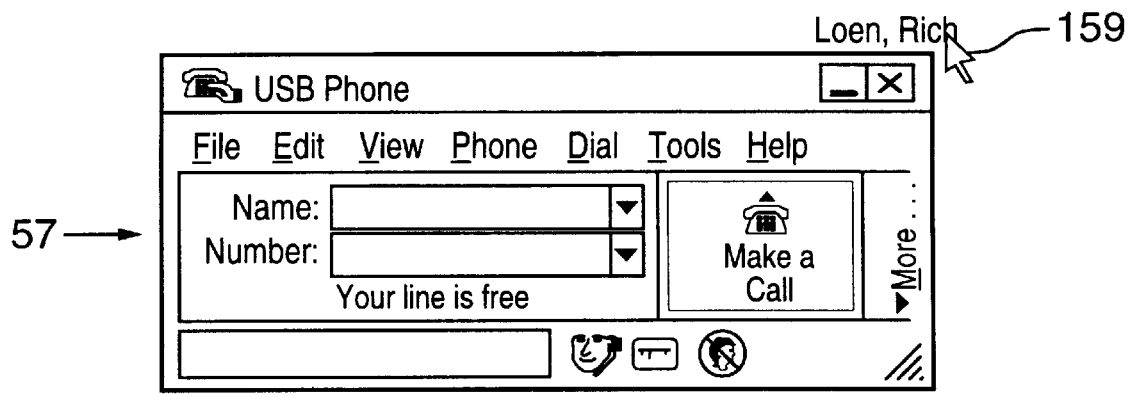
FIG. 19 shows the main window display according to the first embodiment during a drag-and-drop name search and dial sequence, beginning in the idle state (FIG. 19a), highlighting and dropping a portion of text from another application into the Name field such that the Phonebook is automatically searched and in response to a match the default number associated with the matched name is displayed in the Number field (FIG. 19c), clicking on the default button resulting in a line being selected and digit out-pulsing (FIG. 19d), and once the dialling is complete, display of the call timer (FIG. 19e)
Figure 19B:
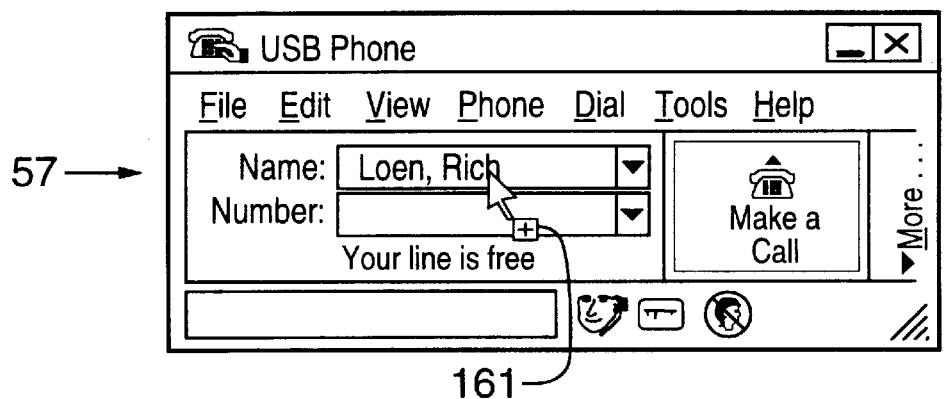
Figure 19C:
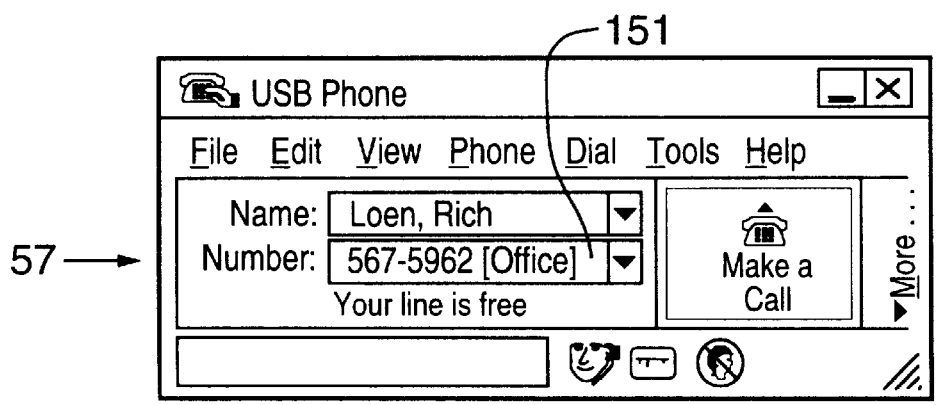
Figure 19D:
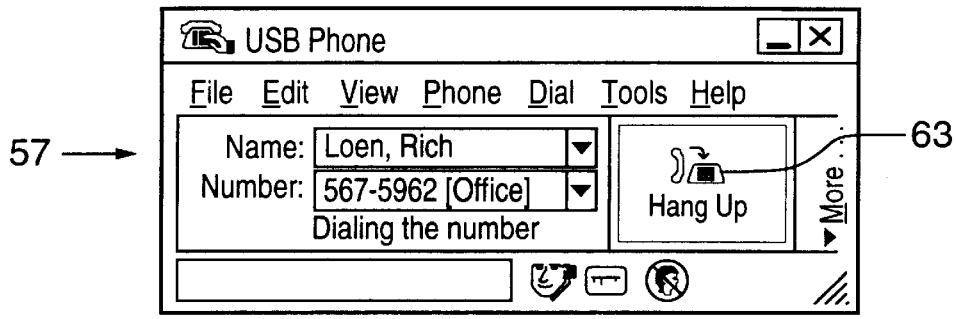
Figure 19E:
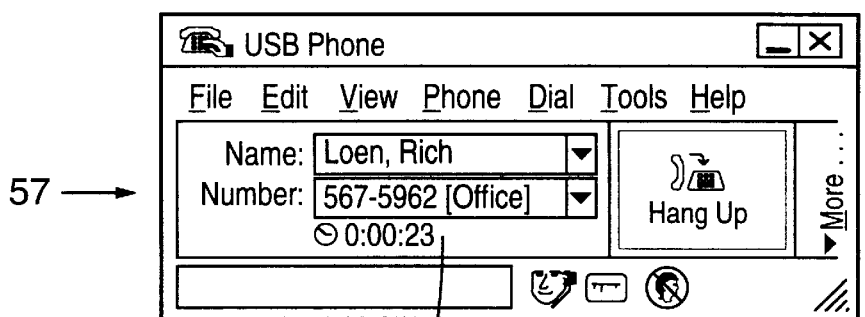

According to another feature of the present invention, the user can drag and drop (i.e. cut and paste) text from another application in order to make a call or perform a search. Thus, from the idle state (FIG. 19a), the user can highlight a portion of text 159 (usually a person's name) from another application which supports drag and drop functionality (e.g. word processor, spreadsheet, Microsoft Exchange®, etc.), and drag the text out of the application and into window 57. As the user drags the text over the Name field 153, a drop symbol 161 appears under the mouse pointer (FIG. 19b). Upon dropping the text in the Name field 153, the Phonebook is automatically searched and in response to a match the default number associated with the matched name is displayed in the Number field 151 (FIG. 19c). By clicking on the default button 63 or hitting the "Enter" key, a line is selected and digit out-pulsing begins as described above (FIG. 19d). Once the dialling is complete, the call timer 155 starts (FIG. 19e).

Figure 20A:
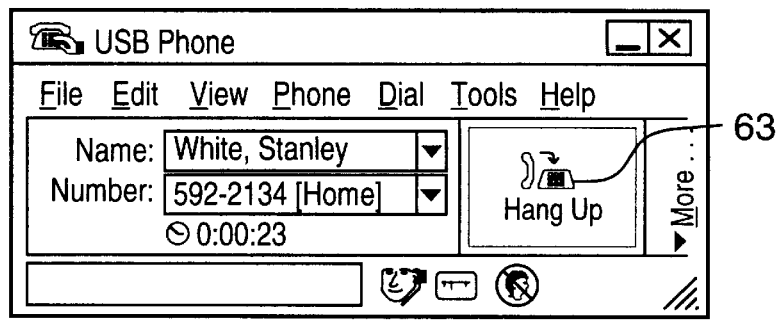
FIG. 20 shows the main window display according to the first embodiment during a hang up, beginning with clicking on the "Hang Up" icon of the default button (FIG. 20a), displaying a "Hanging Up' message (FIG. 20b), and finally returning to the idle state (FIG. 20c)
Figure 20B:
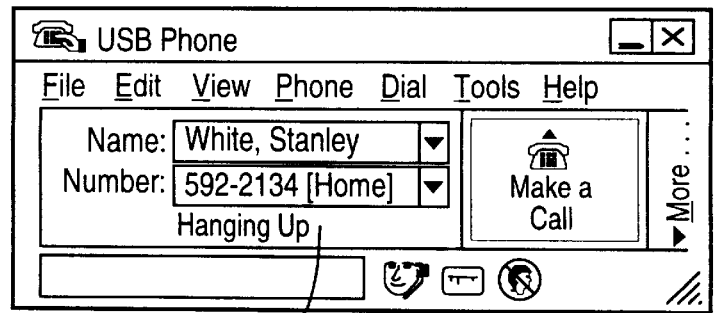
Figure 20C:
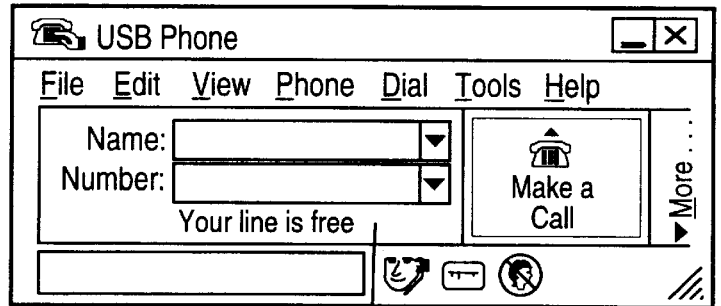

Once the user has completed the call, the handset 11 can be returned to its cradle or the user can press the speaker key on telephone set 1. The user can also hang-up from main window 57 by clicking on the "Hang Up" icon of default button 63 or hitting the "Enter" key (FIG. 20a). While disconnecting, the line status displays the "Hanging Up' message 147 (FIG. 20b), and finally the display returns to te idle state (FIG. 20c). Meanwhile, the call control manager 117 gets the call data from the line manager 113 and passes it to the smart data access manager 121 which creates a call log entry. Then the call object is deleted.

C. Conversation Modes

When the user is in a conversation with another party, the call can be in the following states:
I. handset conversation
II. speaker phone conversation
III. on hold When the user wishes to switch between conversation modes, the main window component 83 sends a request to the call control manager 117. The call control manager forwards the request to the line manager 113 which updates the call object's call state to the appropriate conversation mode.

D. Central Office 3-Way Call When the user wishes to initiate a 3-way call, the main window manager 83 sends a request to the dialling manager 135. The connection with the first party is established as described in the "Outgoing call" section appearing above. When the required call progress event(s) are received by the call control manager 117, the call control manager obtains the dial string required to call the third party from the dialling manager 135 and requests the line manager 113 to dial. When the next required call progress event(s) are received, the call control manager 117 obtains the dial string required to connect the three parties and sends it to the line manager 113 for dialling.

E. Call Waiting

The main window manager 83 sends requests to switch between calls to the dialling manager 135. The dialling manager then sends the appropriate dial strings to the call control manager 117 which forwards them to the line manager 113 for dialling.

Figure 21:
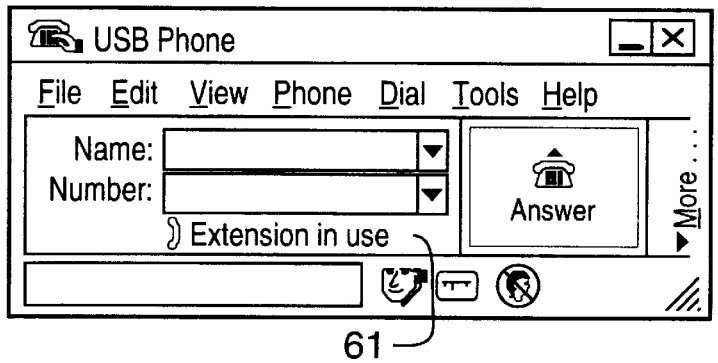
FIG. 21 shows an extension in use indicator of the main window display according to the first embodiment.

F. Extension In Use Detection According to another aspect of the present invention, if another extension on the line with which the application 17 is associated is taken off-hook, the phone manager 115 is informed. In response, the phone manager notifies the call control manager 117 which modifies the line's state using the line manager 113 and forward the notification to the main window manager 83. The main window manager then causes the main window to display an in use state indicator in display area 61, as shown in FIG. 21.

G. Adding a Person to Phonebook and Opening Profile

Figure 22A:
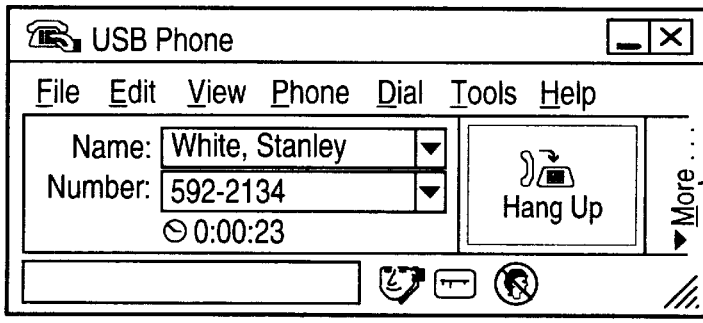
FIG. 22 shows the main window display according to the first embodiment during a sequence of adding a party to the Phonebook from the connected state (FIG. 22a) where the user activates the control bar (FIG. 22b), and therefrom activates a Phonebook window (FIG. 22c) from which a Profile window can be activated (FIG. 22d)
Figure 22B:
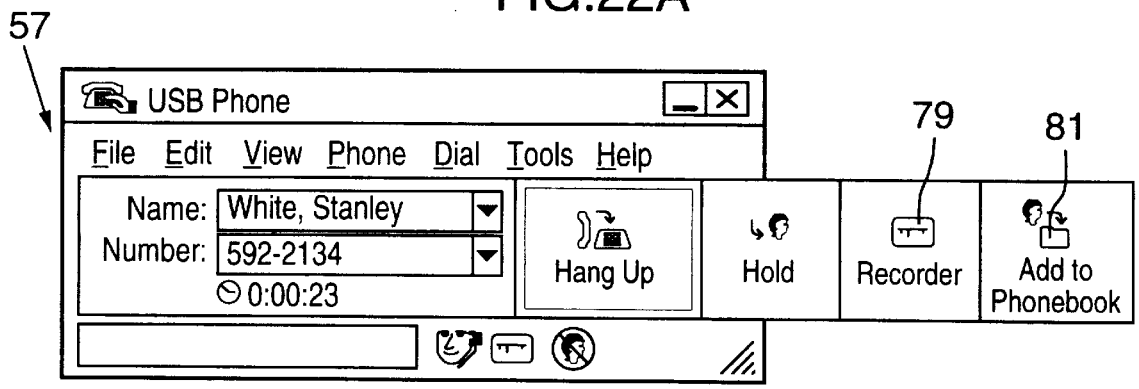
Figure 22C:
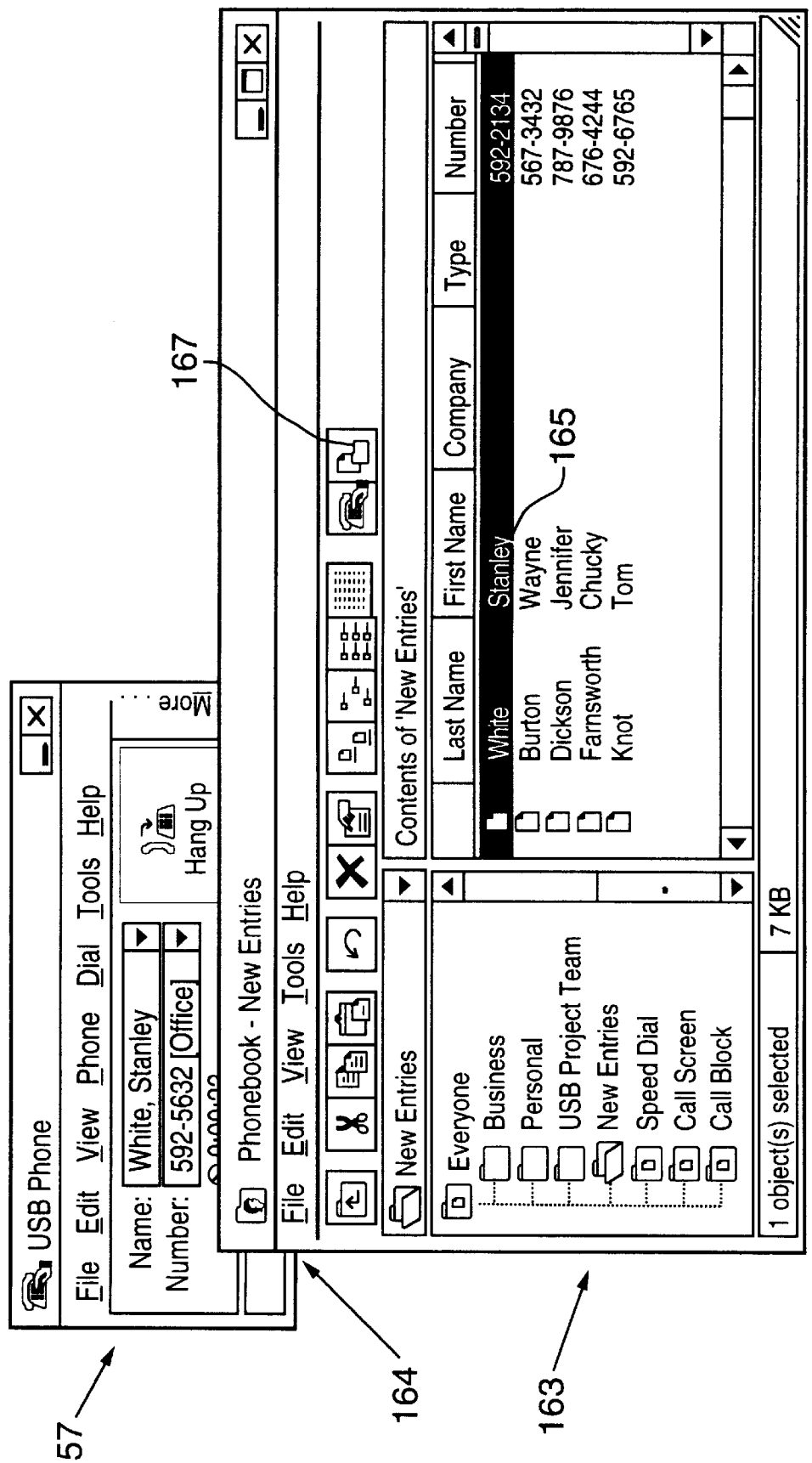

The user can add a caller or called party to the Phonebook, including CLID information. From the connected state (FIG. 22a), the user rolls the mouse pointer 10 over the control bar actuator 65 (or, alternatively enters Alt+M on the keyboard 12), which causes the control bar 79 to appear (FIG. 22b). The user then clicks on the "Add to Phonebook" icon in function button 81, which causes the Phonebook window 163 to open to a "New Entries" display (FIG. 22c), thereby presenting the user with a list of new entries including the entry for the connected party 165 which is highlighted. The "New Entries" display is indicated as being open at the directories display appearing on the left side of window 163. The main window 57 remains in the background.

Within the Phonebook window 163, the user can move or make copies of entries by dragging entries from one list to another using the mouse pointer 10, or can search for entries using a "Find" command in the Tools menu of menu bar 164.

Figure 22D:
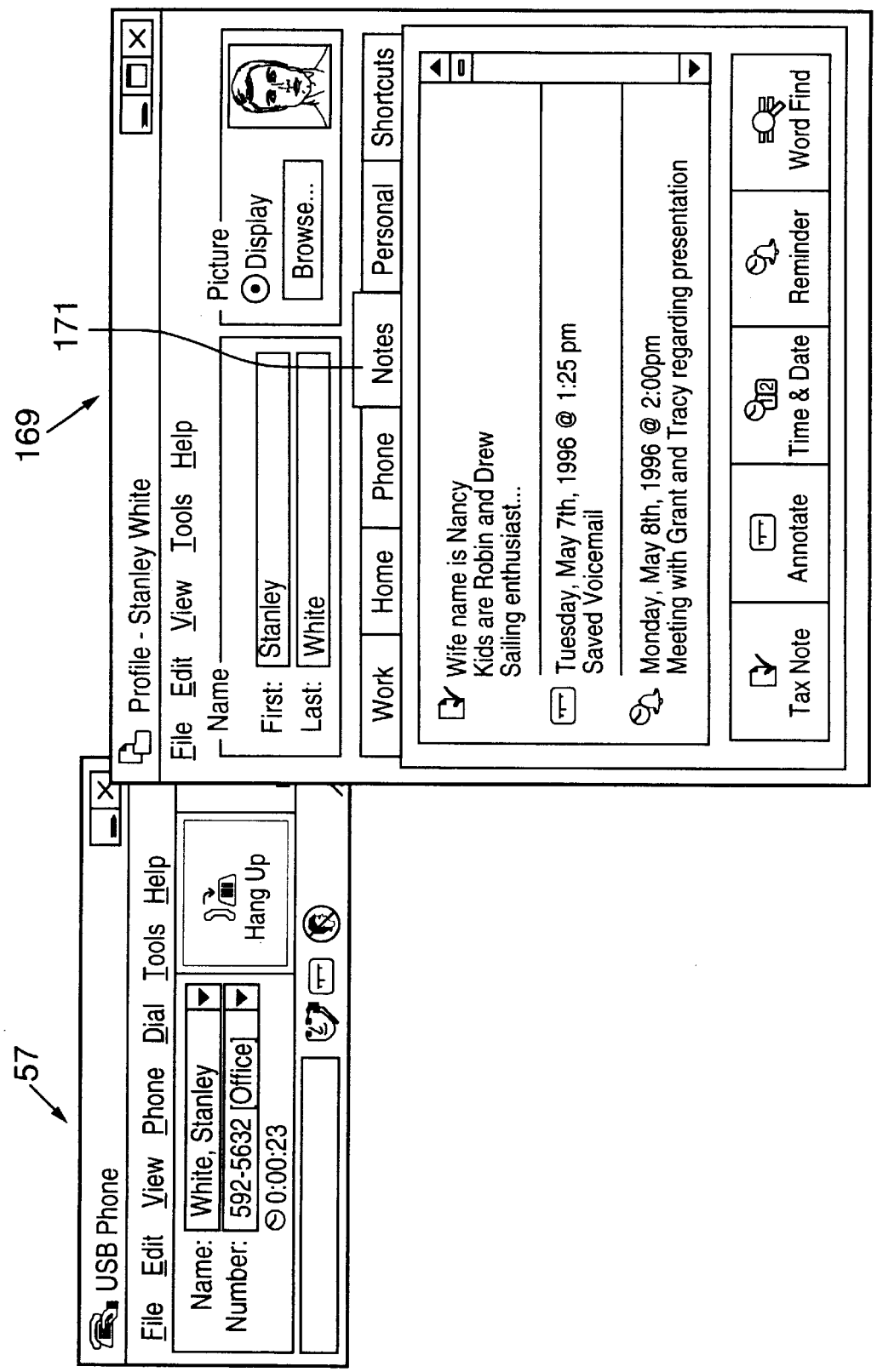
Figure 23A:
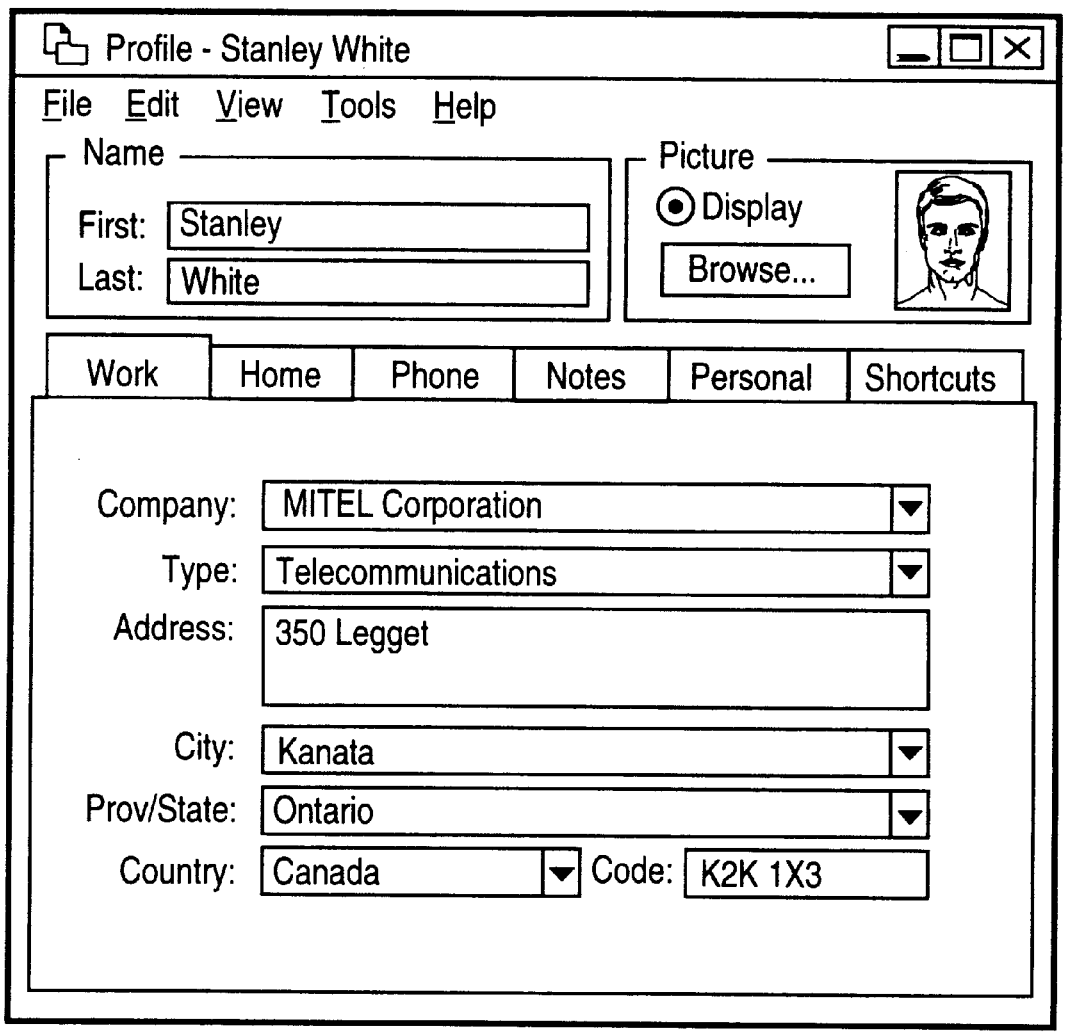
FIG. 23a shows a Work tab of the Profile window, a Home tab is shown in FIG. 23b, a Phone tab is shown in FIG. 23c, a Personal tab is shown in FIG. 23d and a Shortcuts tab is shown in FIG. 23e.
Figure 23B:
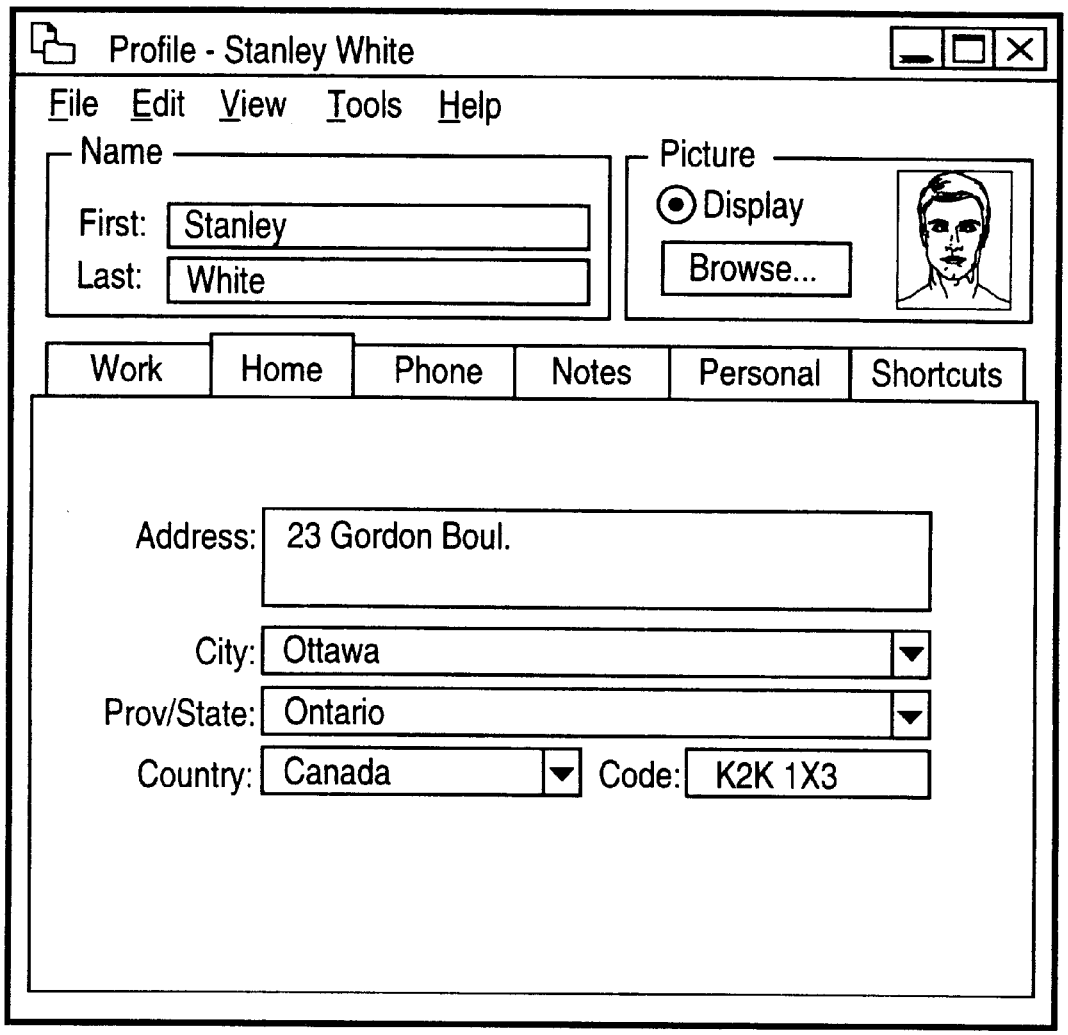
Figure 23C:
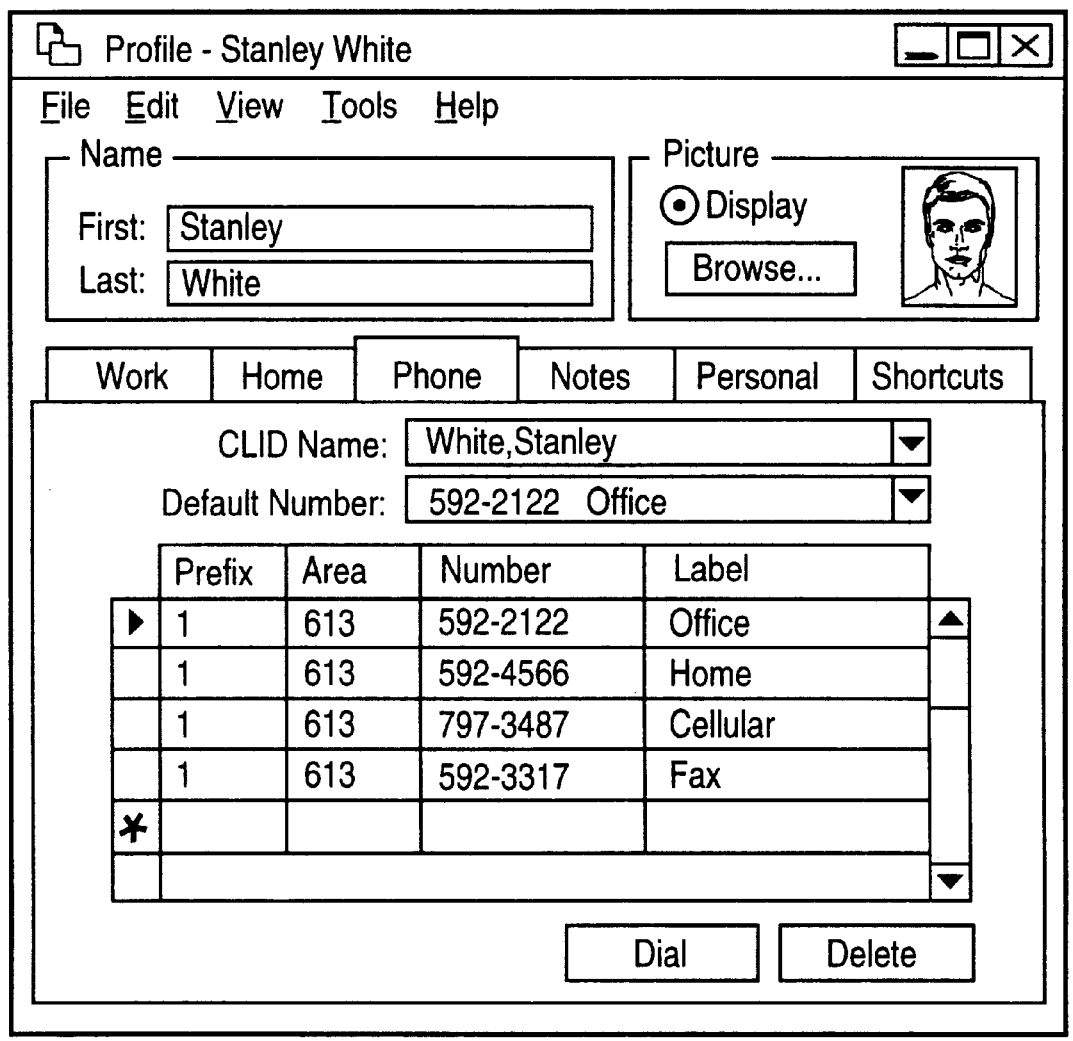
Figure 23D:
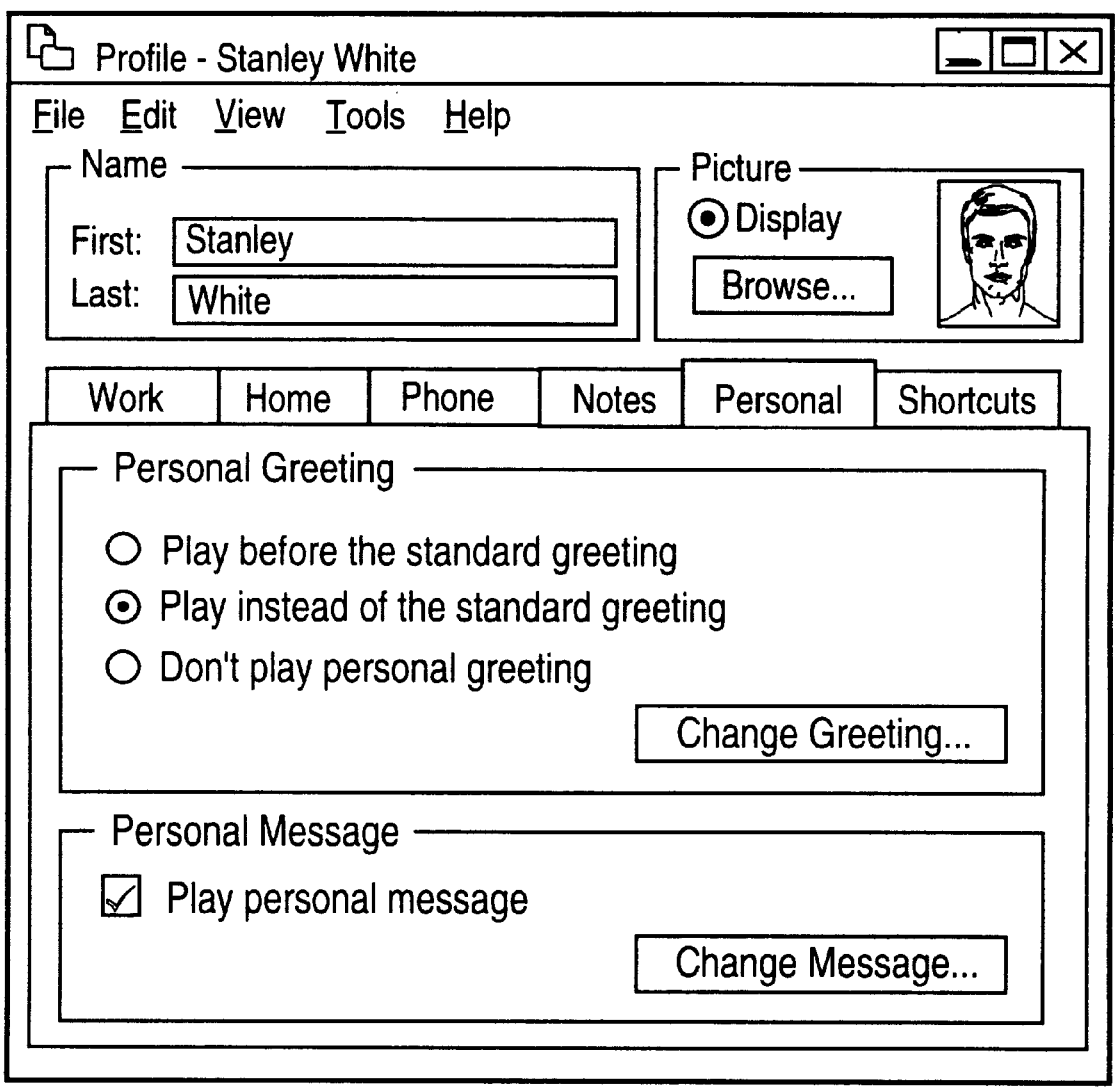
Figure 23E:
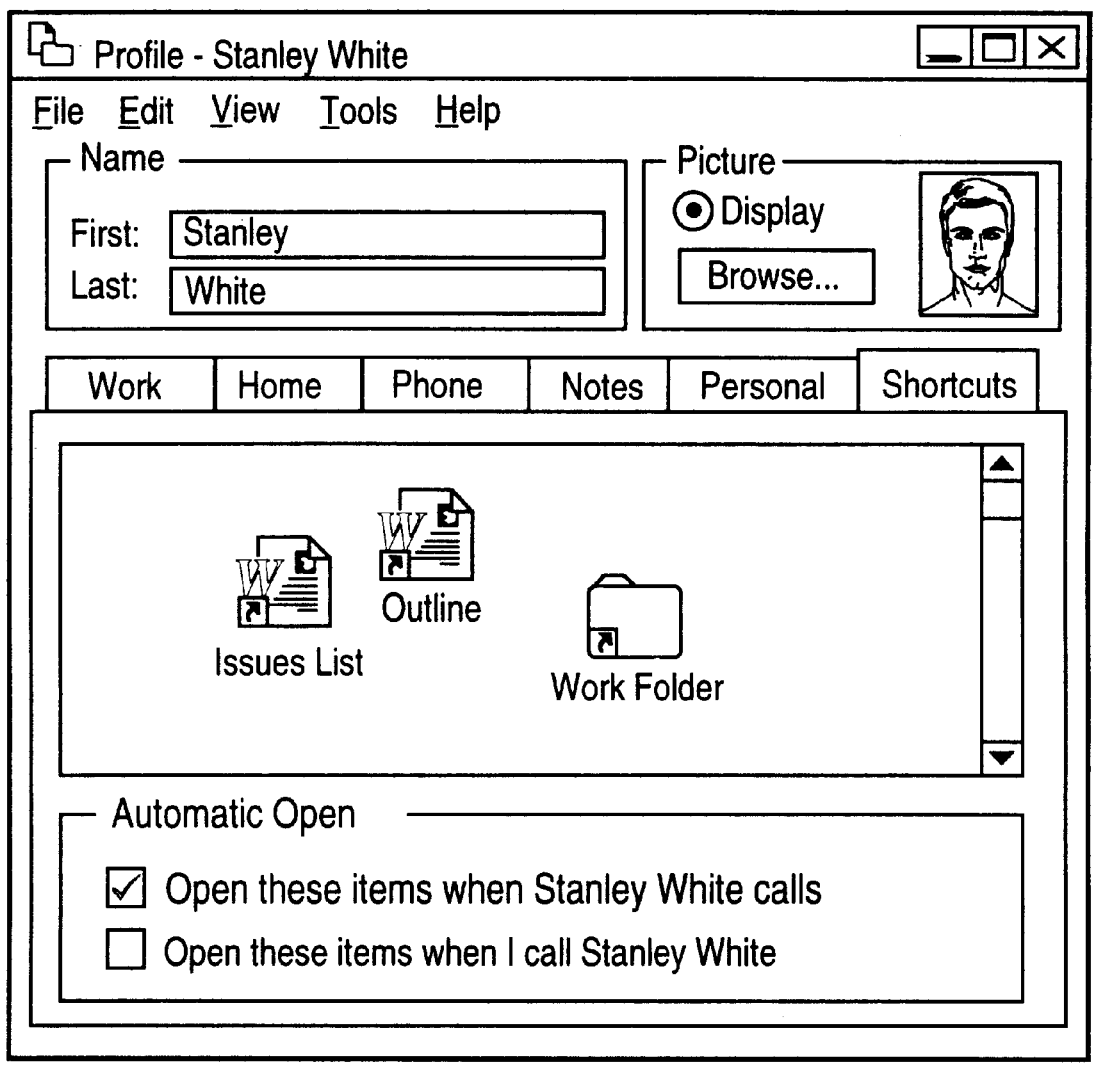

From within the Phonebook window 163, the user can access a profile for any entry by clicking the "open profile" button 167. Initially, the profile window 169 opens with the "Notes" tab 171 open (FIG. 22d), thereby presenting the user with a list of notes (including sound files) relating to that person. However, by clicking on the appropriate tab the user can also open the Work tab (FIG. 23a), Home tab (FIG. 23b), Phone tab (FIG. 23c), Personal tab (FIG. 23d) or Shortcuts tab (FIG. 23e).

The directory component 95 uses the smart data access manager 121 to add, delete, read and modify data accessible from the Phonebook (including the profile).

H. Retrieving a Message

Figure 24A:
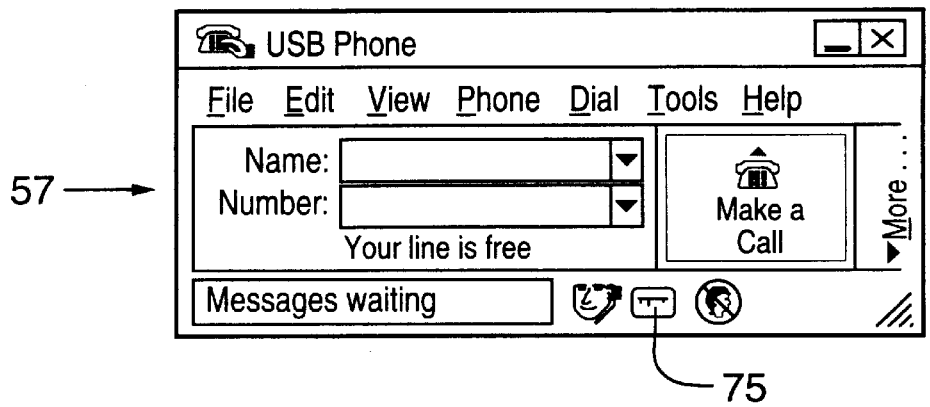
FIG. 24 shows the main window sequence according to the first embodiment for playing a voicemail message from the idle state with a message waiting icon flashing (FIG. 24a), with a tooltip indicating the number of messages waiting (FIG. 24b), with a shortcut mouse click to open voicemail (FIG. 24c) and displaying the voicemail subdirectory of a Call Log and superimposed recorder window.
Figure 24B:
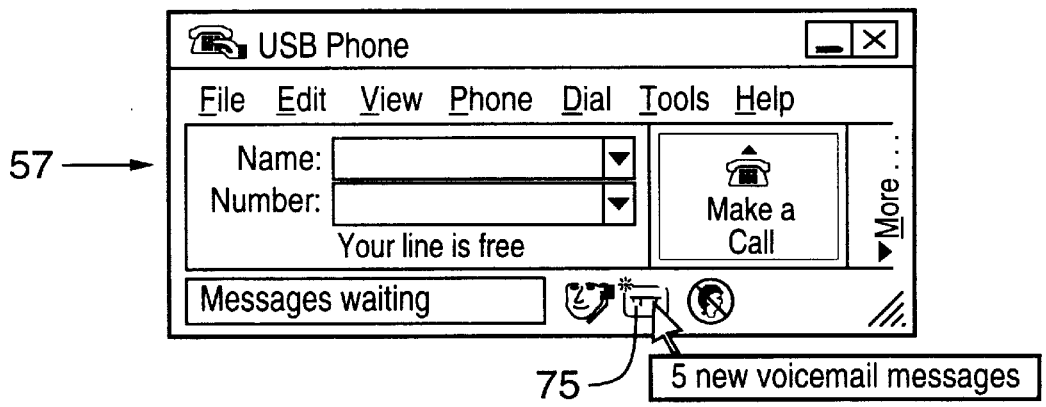
Figure 24C:
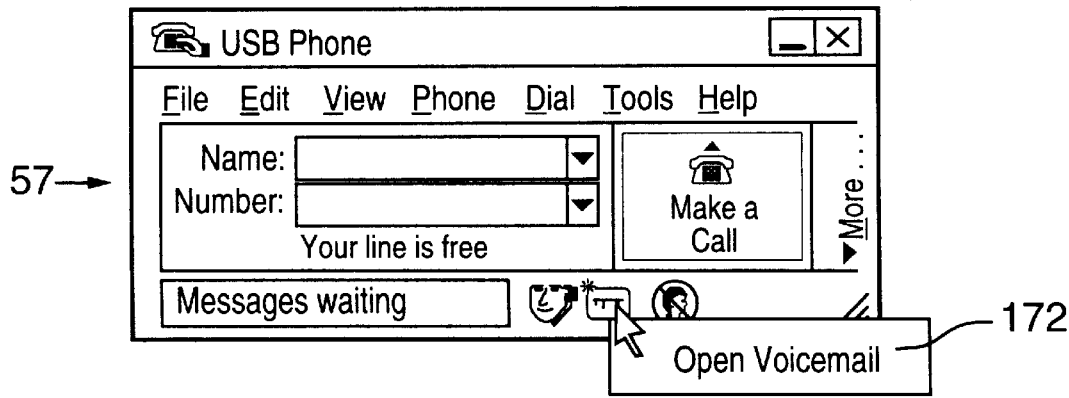
Figure 24D:
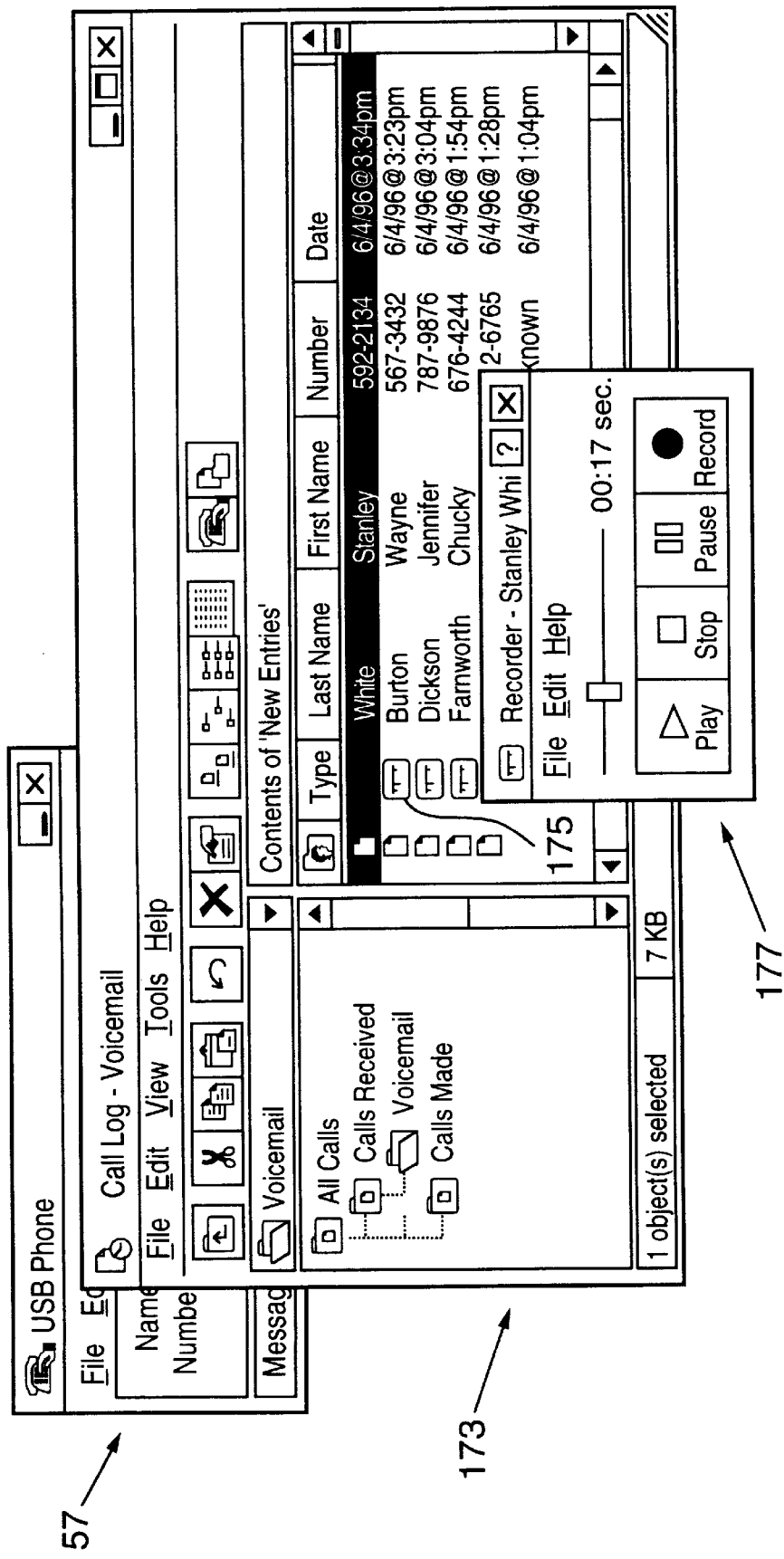

The user can retrieve any new voicemail message from the main window 57, which provides an indication of the presence of waiting voicemail by the flashing icon 75 (FIG. 24a) and a tool tip indicating the number of messages when the mouse pointer 10 passes over the icon 75 (FIG. 24b). A right click on the mouse pointer 10 when positioned over the icon 75 opens a shortcut menu 172 for opening the Call Log (FIG. 24c) to play the messages. To display the Call Log (as well as the Redial list, the Calls Missed list or the Calls Answered list), the main window component 83 requests the required information from the smart data access manager 121. Call log window 173 opens over the main window 57 and within a Voicemail subdirectory of the Calls Received directory displays the stored voicemail messages (FIG. 24d).

Double clicking on the message icon 175 opens a recorder window 177 for automatically playing the voicemail message. Audio recording and playback requests from the user interface are sent to the smart data access manager 121 which returns an audio file ID. Requests to pause, stop, play, rewind, fast forward, etc. the media stream are sent to the media message control manager 133 using the audiofile ID.

I. Customized Diallers

According to another aspect of the invention, customizable diallers are provided via the software application 17 for allowing the user to create multiple unique dialling sequences which can be implemented during a single telephone call. This is particularly useful for navigating automated answering and information systems such as voice mail, telephone help lines, etc.

Figure 25A:
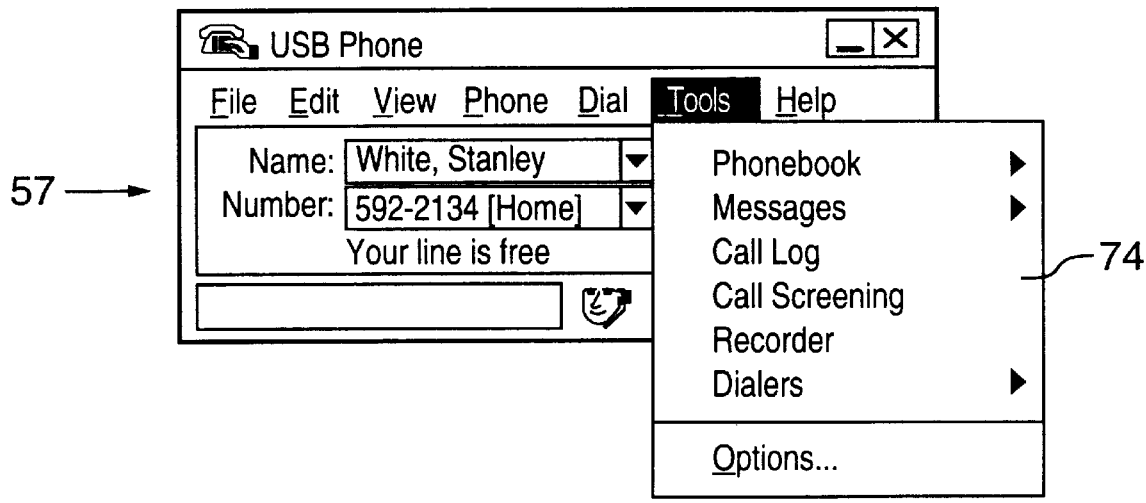
FIG. 25a shows access to the dialler feature via the Tools menu of the main window.
Figure 25B:
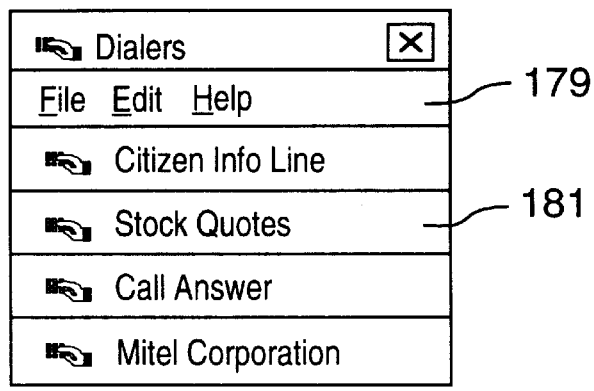
FIG. 25b shows a series of user defined categories or sections of the dialler.
Figure 25C:
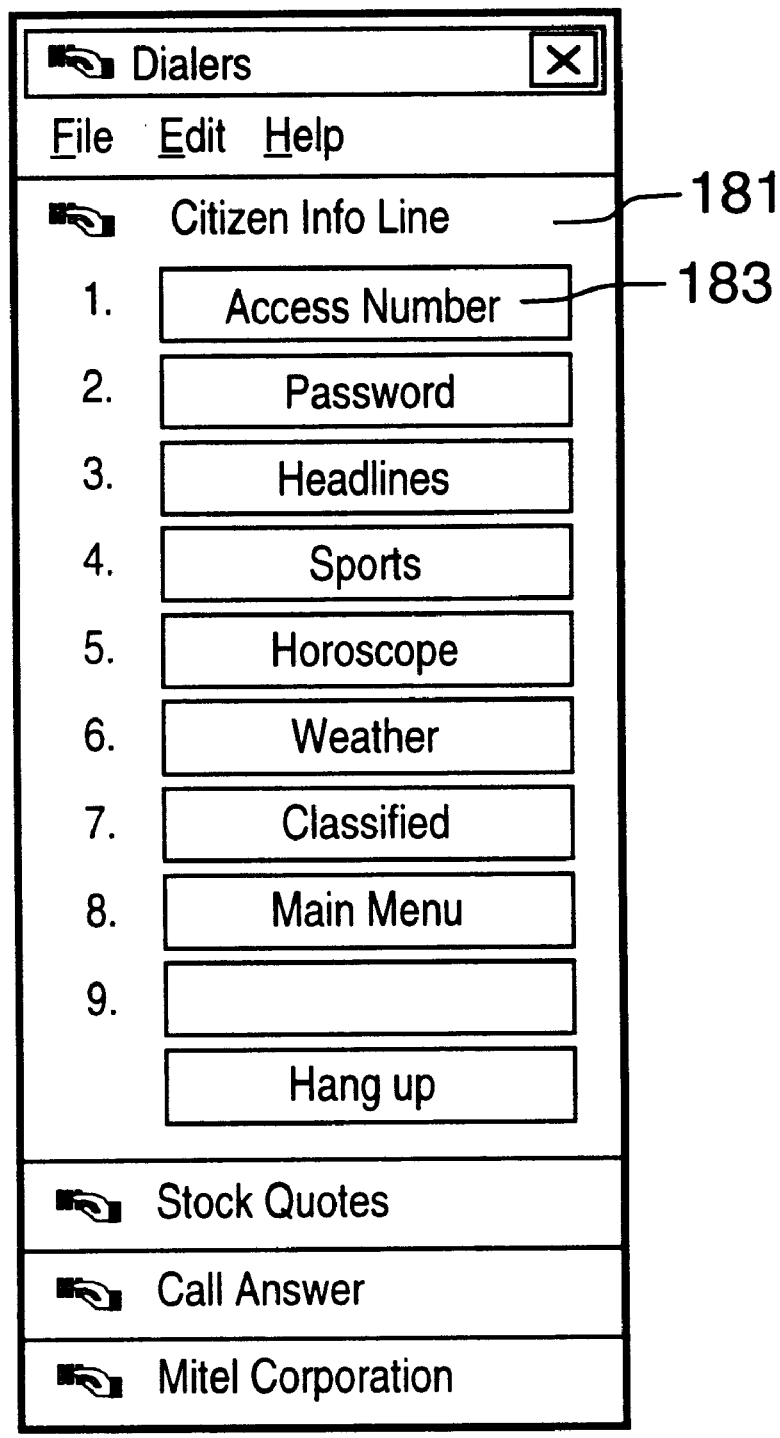
FIG. 25c shows a particular section in an open state.
Figure 25D:
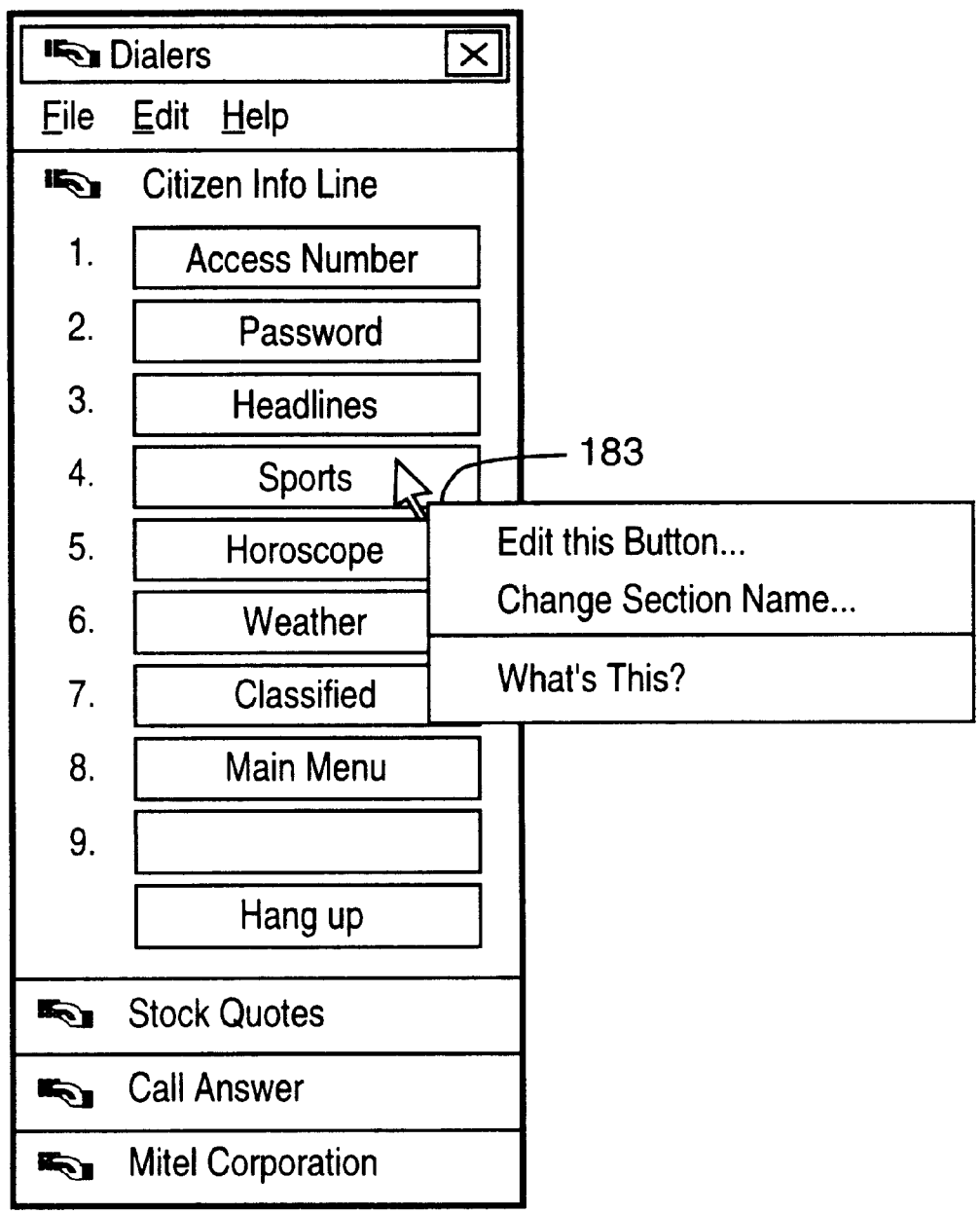
FIG. 25d shows an editing feature for a selected button.

With reference to FIGS. 25a through 25d, various window displays are provided showing operation of the diallers feature according to the first embodiment. In FIG. 25a, the dialler feature is shown being accessed via the Tools menu 74 of main window 57. As shown in FIG. 25b, the dialler window 179 comprises a series of user defined categories or sections 181 of telephone numbers, office extensions or access codes, etc. By clicking on any section 181, the section may be opened or closed, while a right click on the mouse opens a menu for editing, opening/closing, etc. FIG. 25c shows a particular section 181 (i.e. "Citizen Info Line") in the open state. As indicated above, a double click on the name of the section closes it again. In the open state focus is initially on the first of a plurality of user buttons 183. By clicking on the focussed button or pressing the Enter key on keyboard 12, the number associated with the button is dialled and focus shifts to the next button. Each dialler button 183 can start a new call, continue a call in progress, or hang up. Standard modem dialler modifiers of the modem 23 are used to insert pauses, wait for dial tone, hookflash, etc., in a well known manner. In this way, a user is able to navigate through a complex series of dialling sequences without being required to memorize the sequence or wait for on-line instructions. As shown in FIG. 25d, any button can be edited by effecting a right mouse click when the cursor is over the desired button 183. Likewise, a category or section 181 can also be renamed, deleted or added.

Figure 5A:
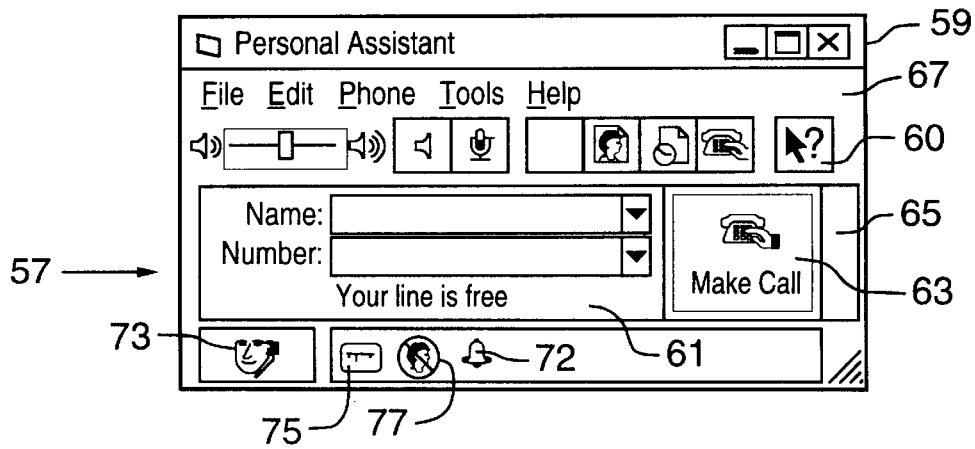
Figure 5B:
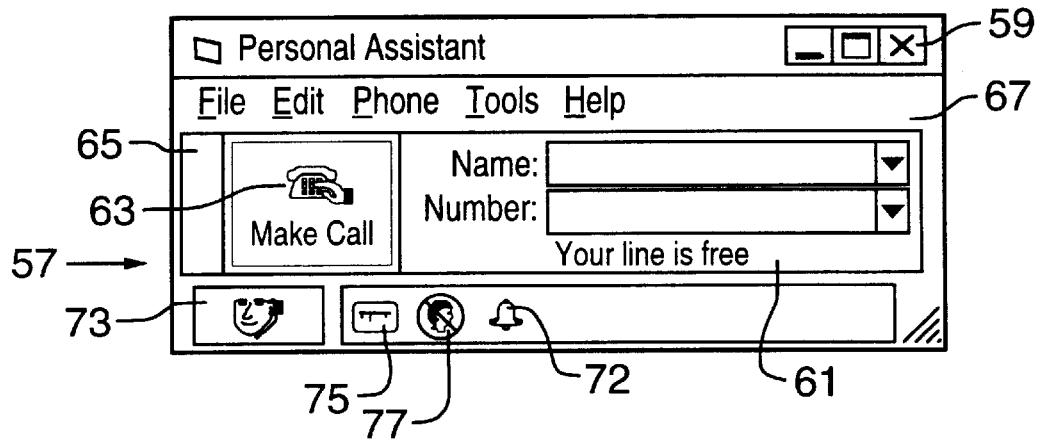
FIGS. 5b and 5c show the main window display with control bar actuator positioned n the right and left, respectively.
Figure 5C:
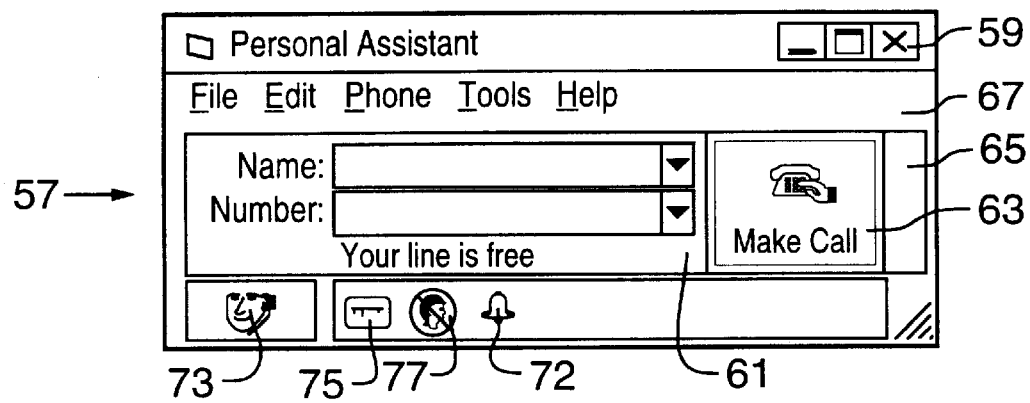
Figure 26A:
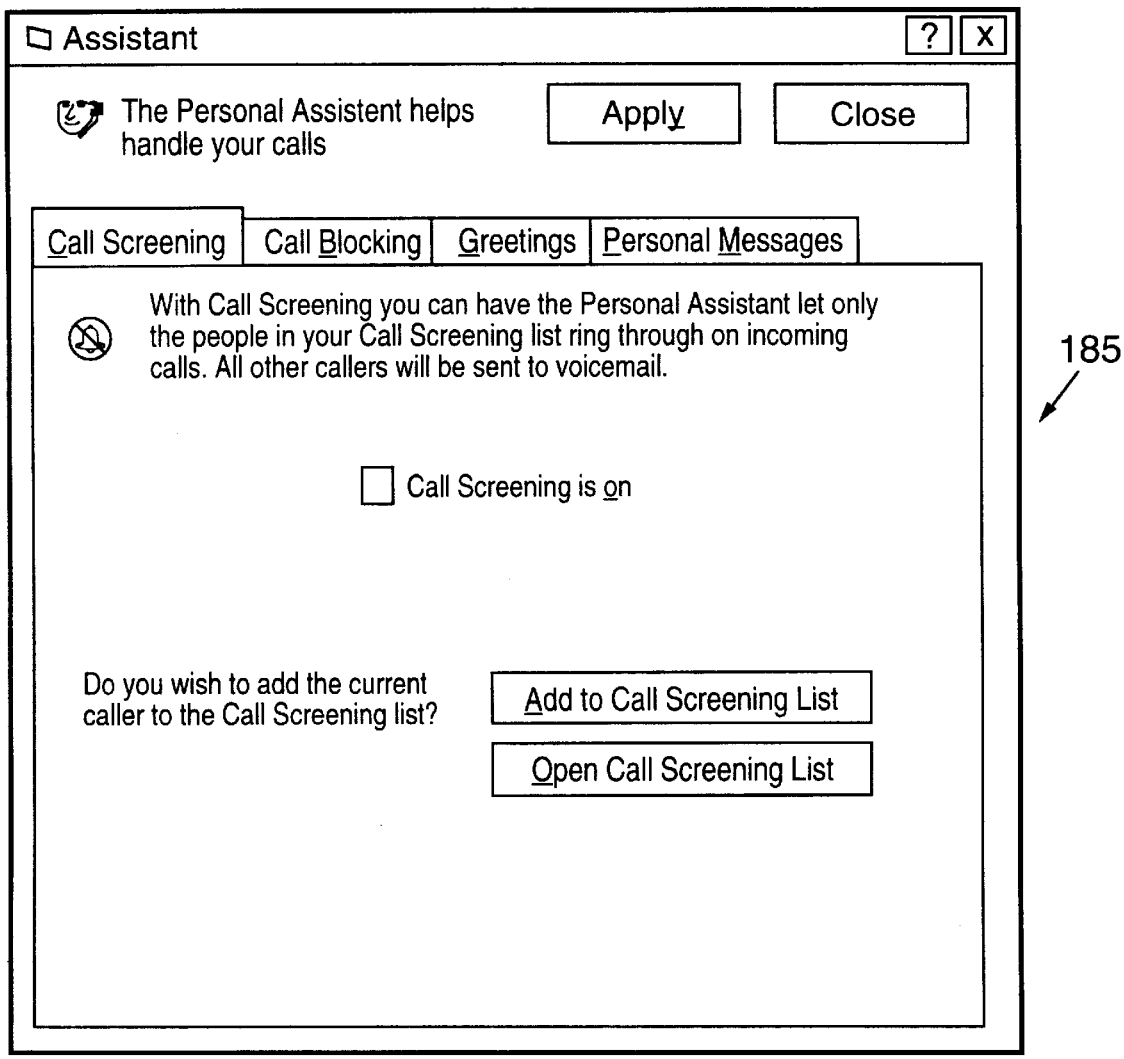
FIG. 26 shows a Personal Assistant window according to the alternative embodiment including a plurality of tabs identified as Call Screening (FIG. 26a), Call Blocking (FIG. 26b), Greetings (FIG. 26c) and Personal Messages (FIG. 26d)
Figure 26B:
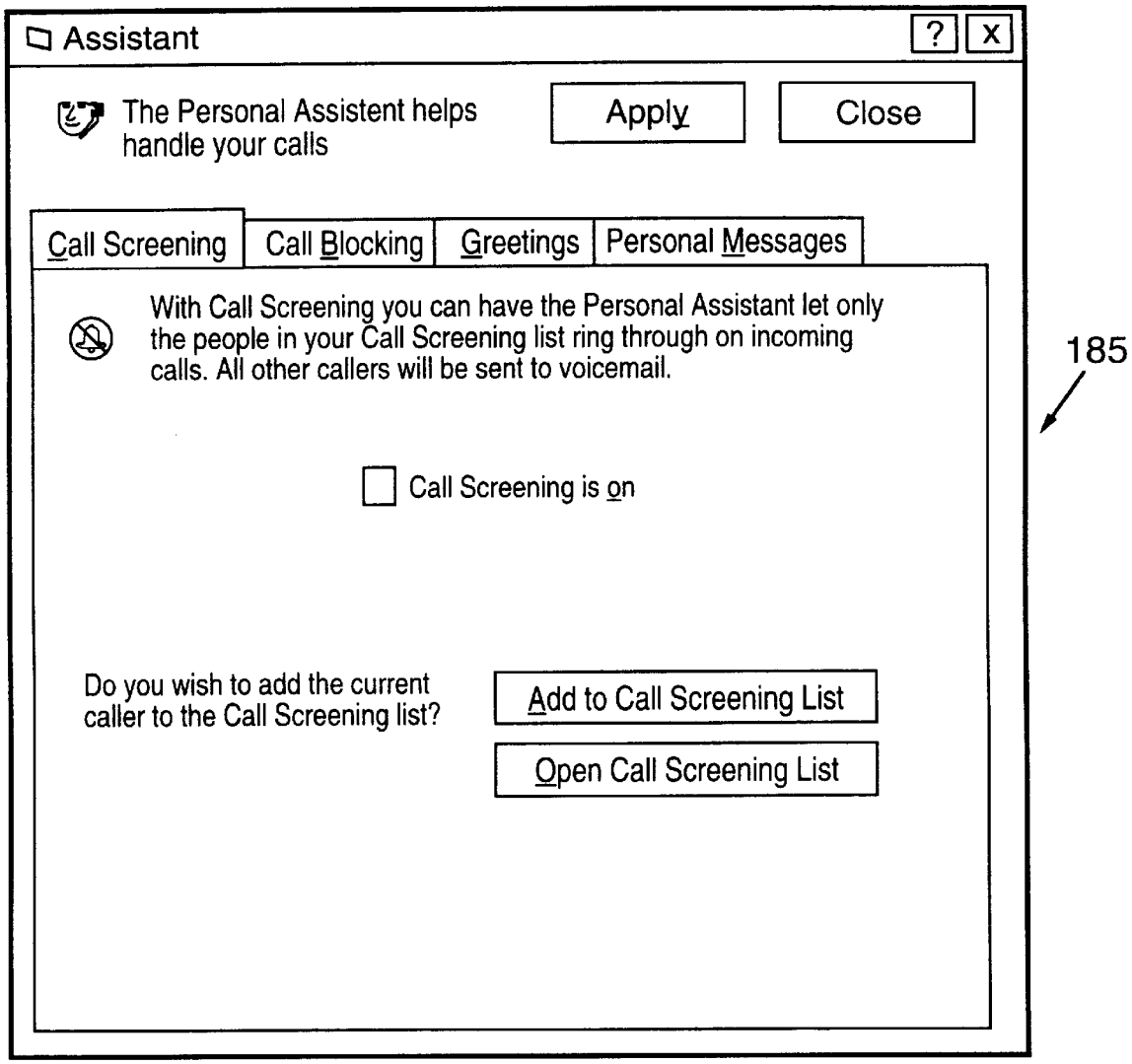
Figure 26C:
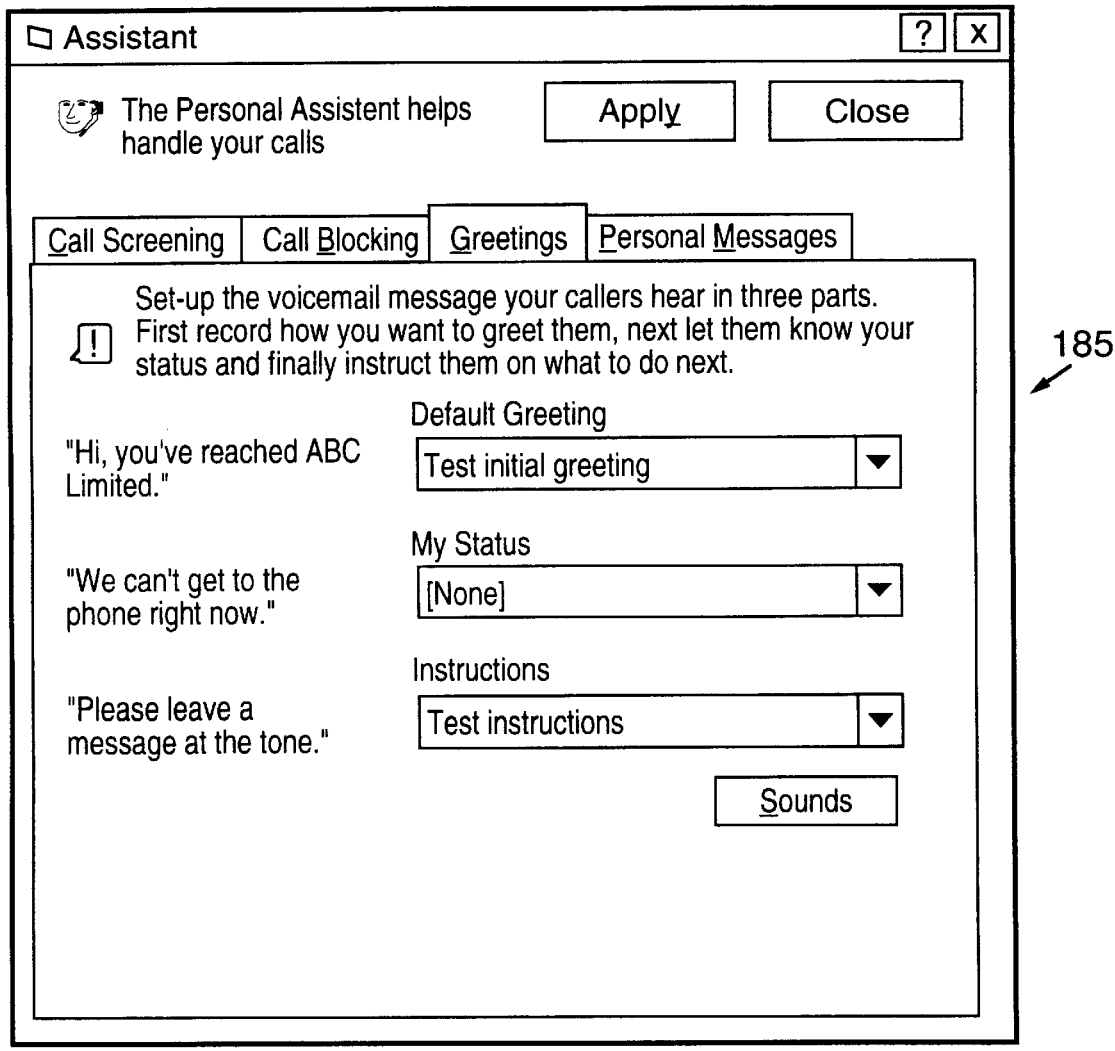
Figure 26D:
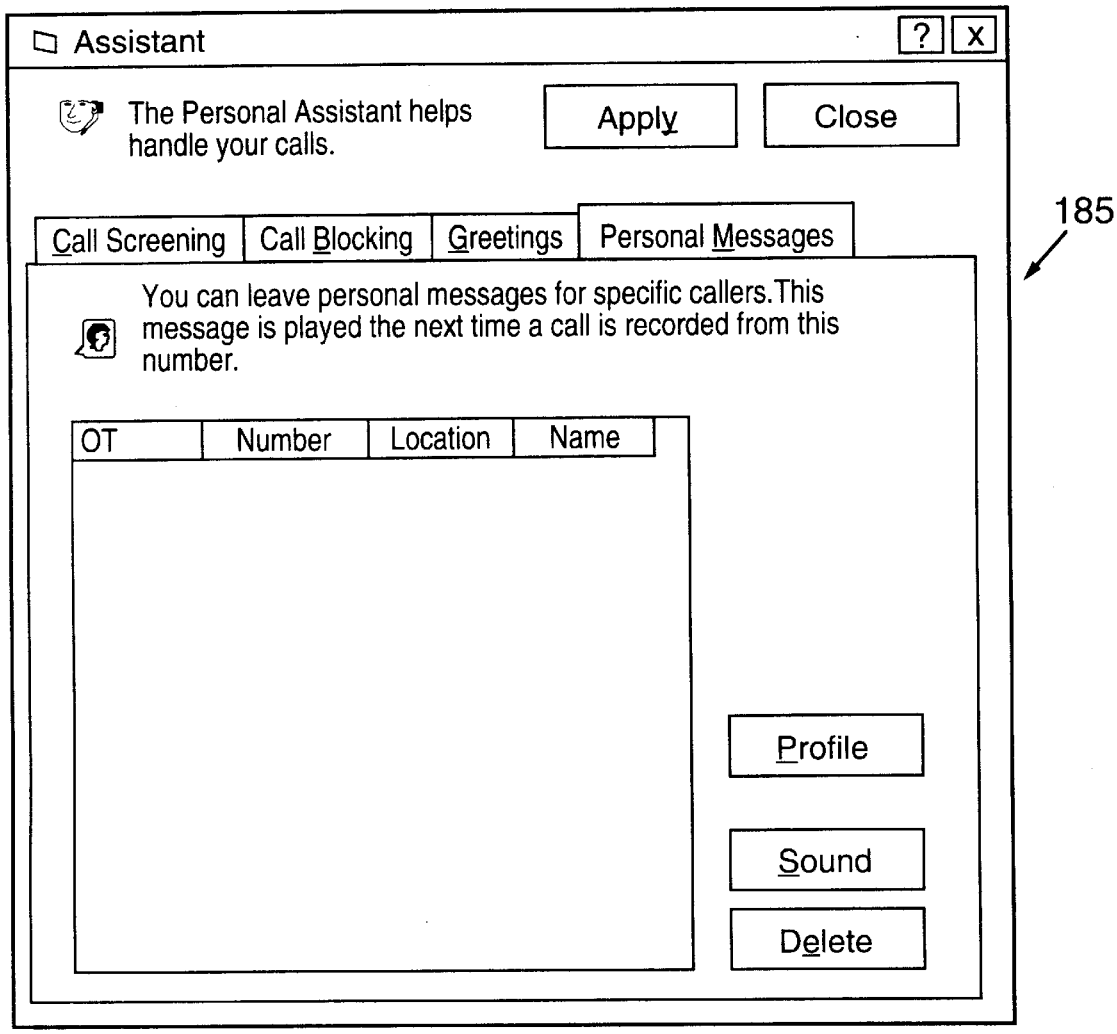

With reference to the alternative embodiment of FIGS. 5a though 5c above, the receptionist icon 73 was disclosed as providing access to a plurality of call features such as call screening, call blocking, greetings and personal messages. Upon clicking the receptionist icon 73, a "Personal Assistant" window 185 is displayed as shown in FIGS. 26a though 26d. The Personal Assistant window 185 includes a plurality of tabs identified as Call Screening (FIG. 26a), Call Blocking (FIG. 26b), Greetings (FIG. 26c) and Personal Messages (FIG. 26d). The functionality of each of these features is described within the window tabs of FIGS. 26a though 26d.

In FIGS. 27a through 27f, a configuration window 187 is shown having multiple user selectable tabs for configuring the phone 1 and application 17. This window is generated by the application configuration dialog 89 and phone configuration dialog 91 discussed above, and is launched from the Option menu selection from Tools menu 57 (FIG. 25a).

Figure 27A:
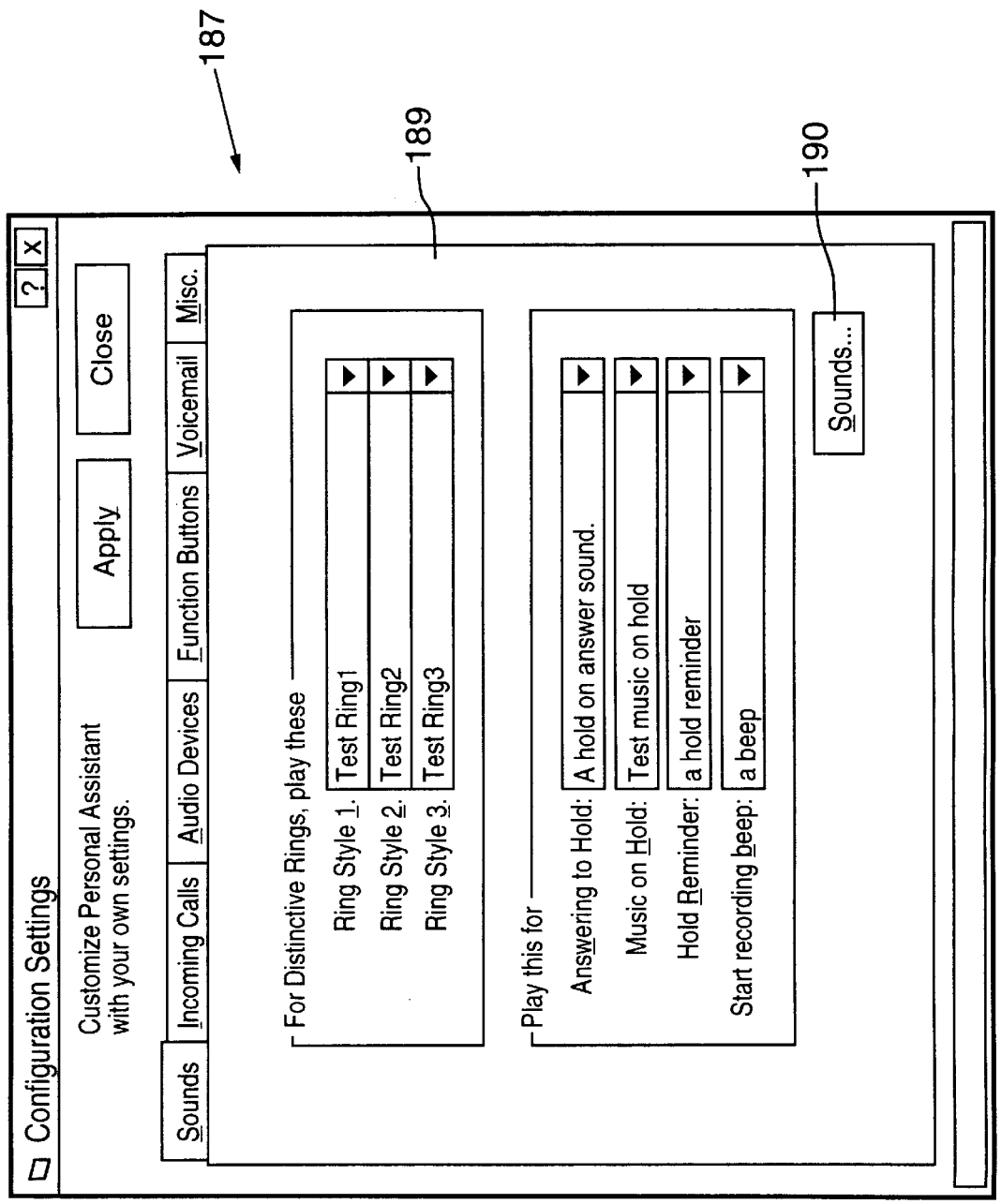
Figure 28:
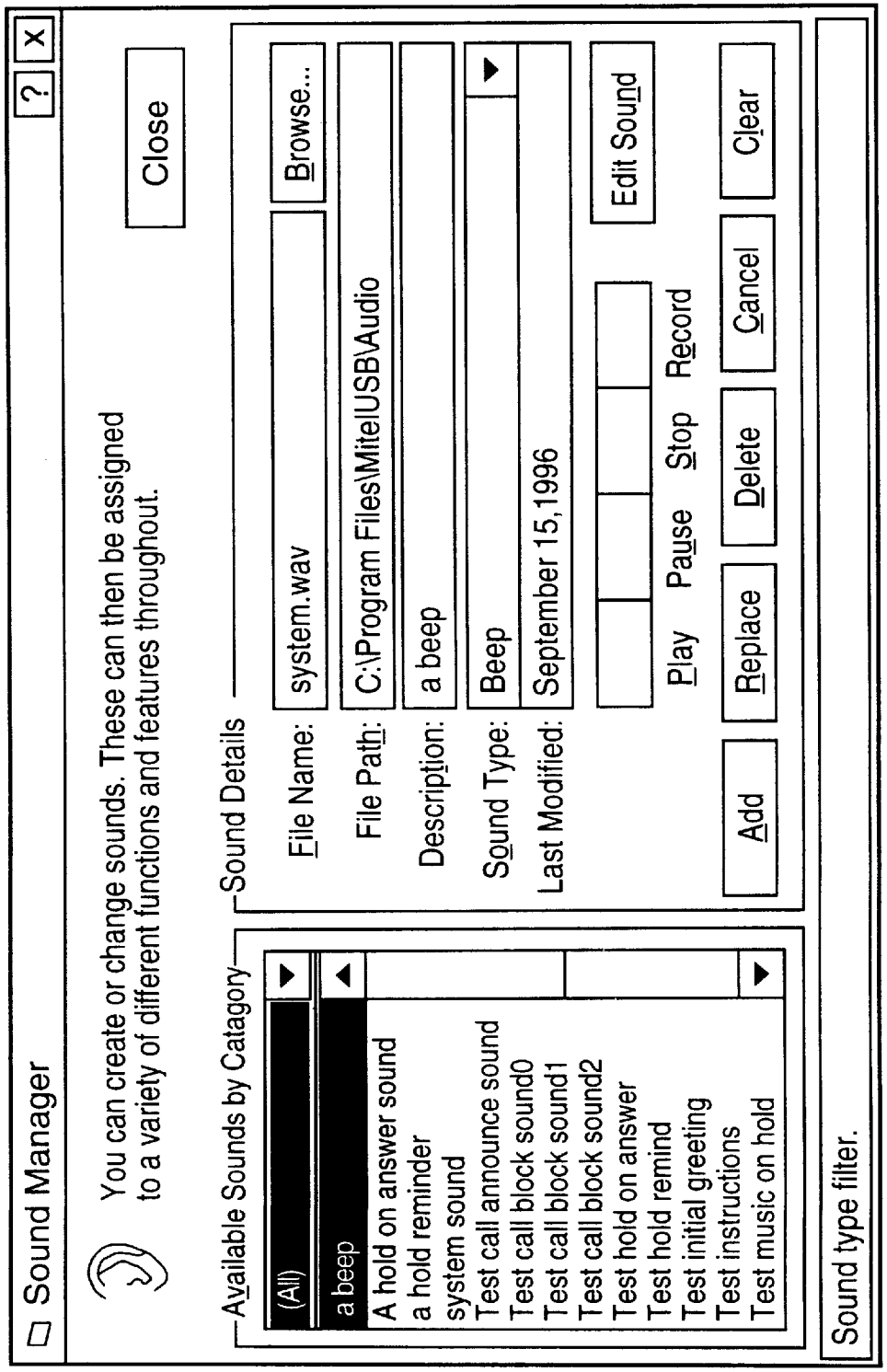
FIG. 28 shows a Sound Manager window for effecting sound recording and editing.

With reference to FIG. 27a, a Sounds tab 189 is provided to enable the user to customize up to three different ring styles for the telephone set 1 and to assign predetermined sounds to call states such as "Answering to Hold", "Music on Hold", "Hold Reminder" and "Start recording beep". A Sounds button 190 causes a Sound Manager window to open, as shown in FIG. 28.

Figure 27B:
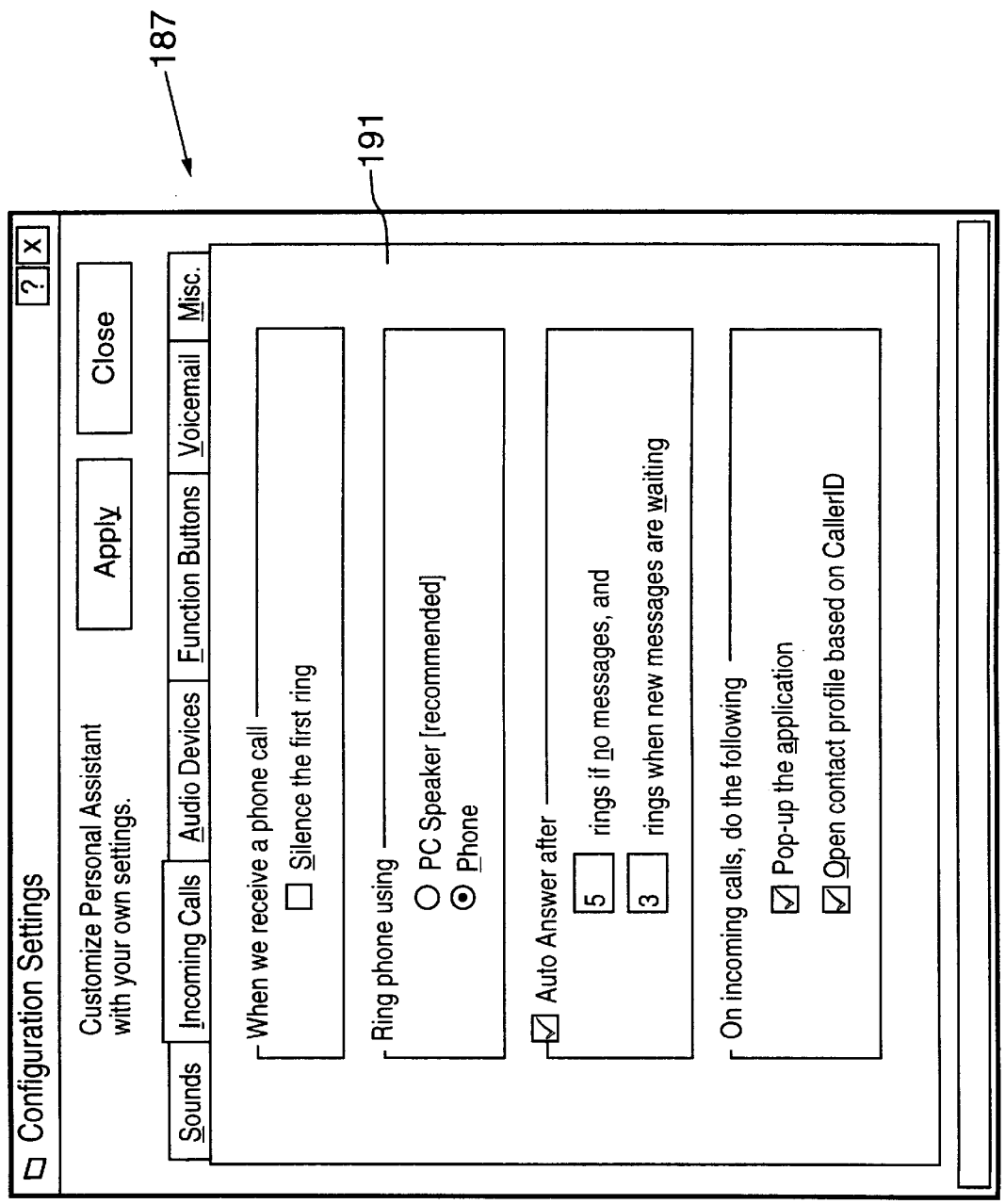

With reference to FIG. 27b, an Incoming Calls tab 191 is shown for specifying whether the first ring should be silenced, how the ring should be generated, auto-answering options and automatic launching of application 17 and opening of contact profile based on CLID.

Figure 27C:
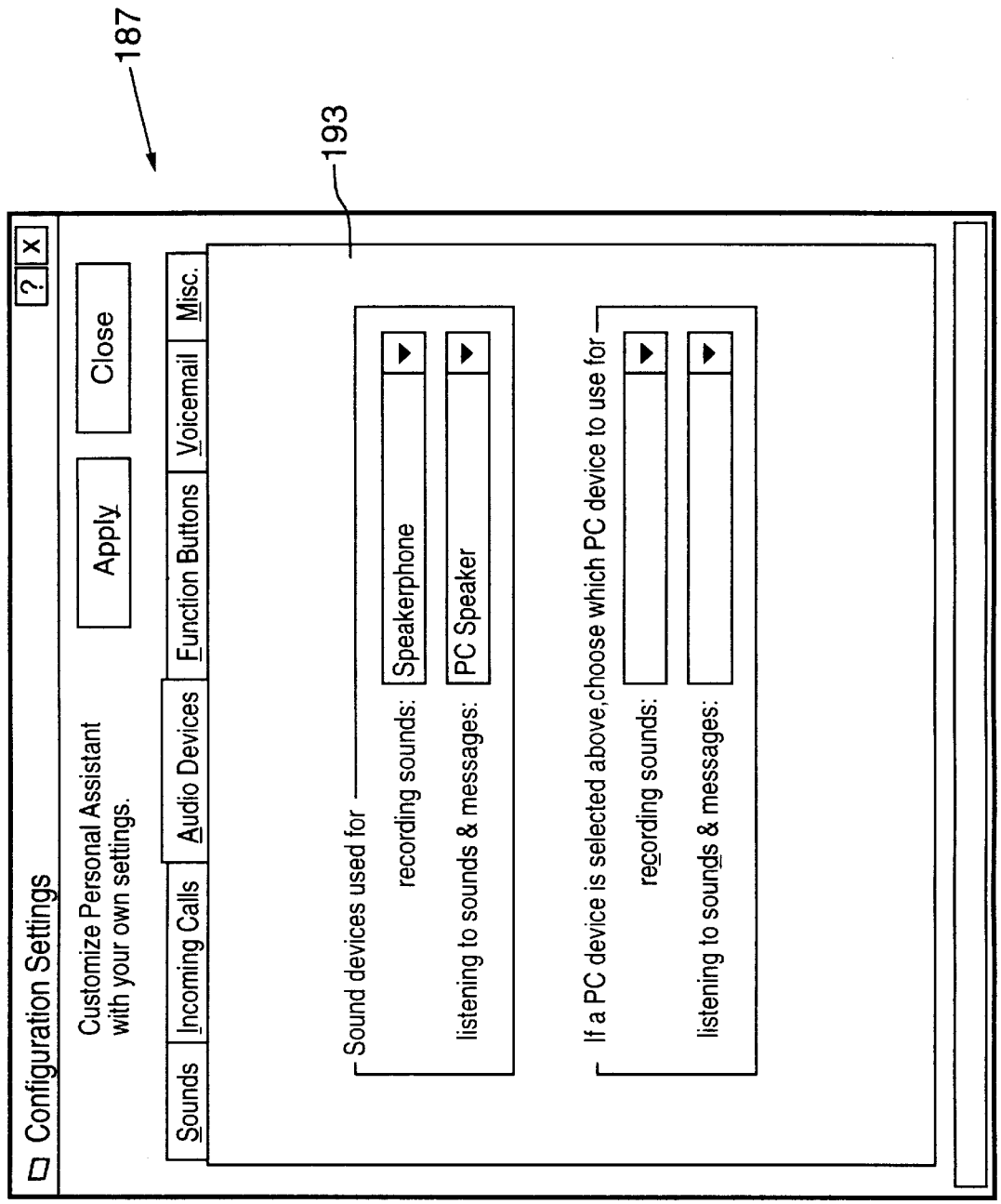

FIG. 27c shows the Audio Devices tab 193 for specifying whether the telephone set 1 or computer 7 are used for recording and listening to sounds and messages.

Figure 27D:
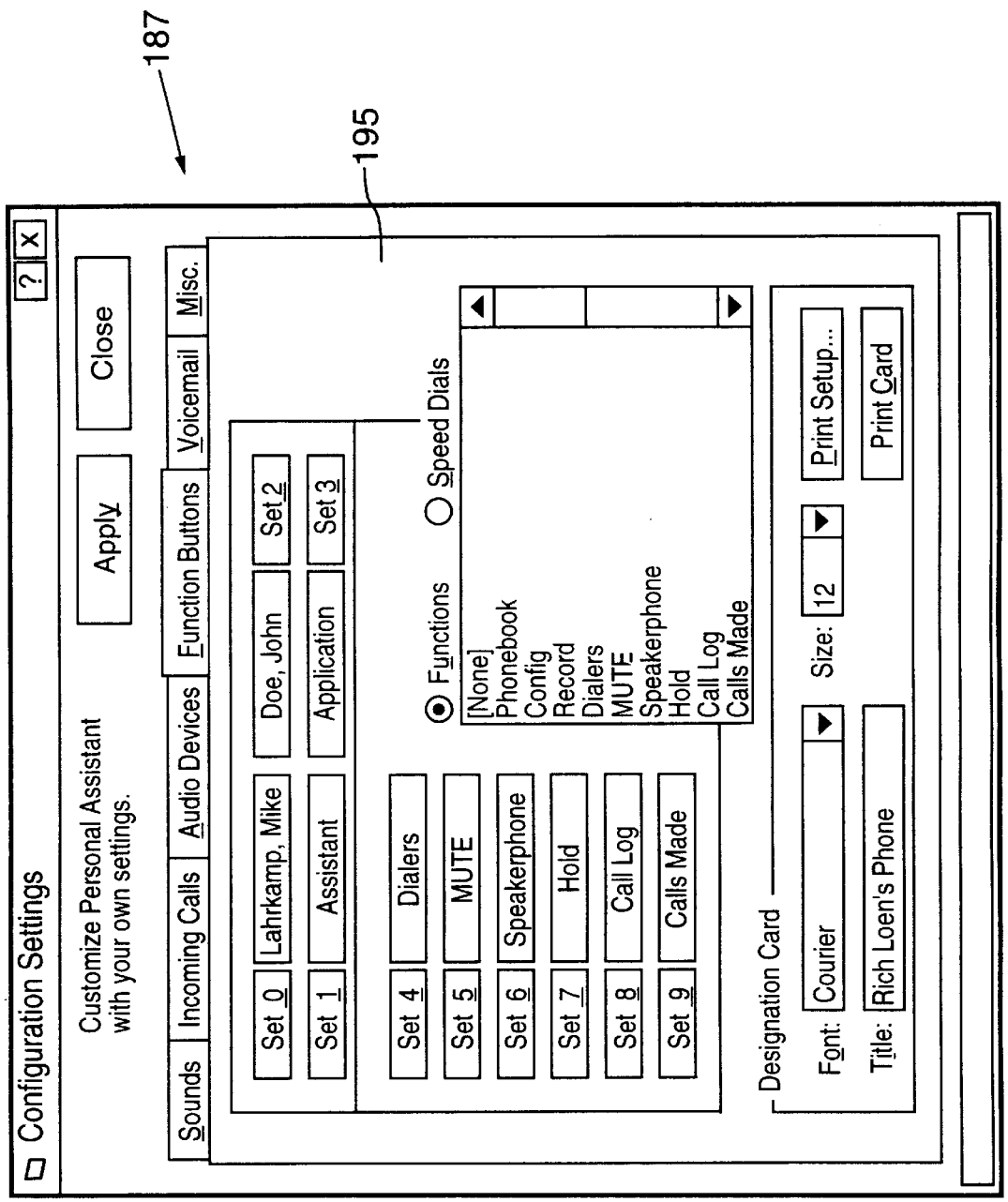

In FIG. 27d, a Function Buttons tab 195 is shown which allows the user to assign functions to the programmable function keys 15. The user can assign either a special function, a speed dial, or a combination of both, to the keys 15. A designation Card portion 196 of the window is used to print an overlay card for identifying the functions/speed dials assigned to the various keys 15. As shown, the user can select the font, font size, printer and can then depress a Print Card button 198 which causes the card to be printed with the selected functions/speed dials appearing thereon.

Figure 27E:
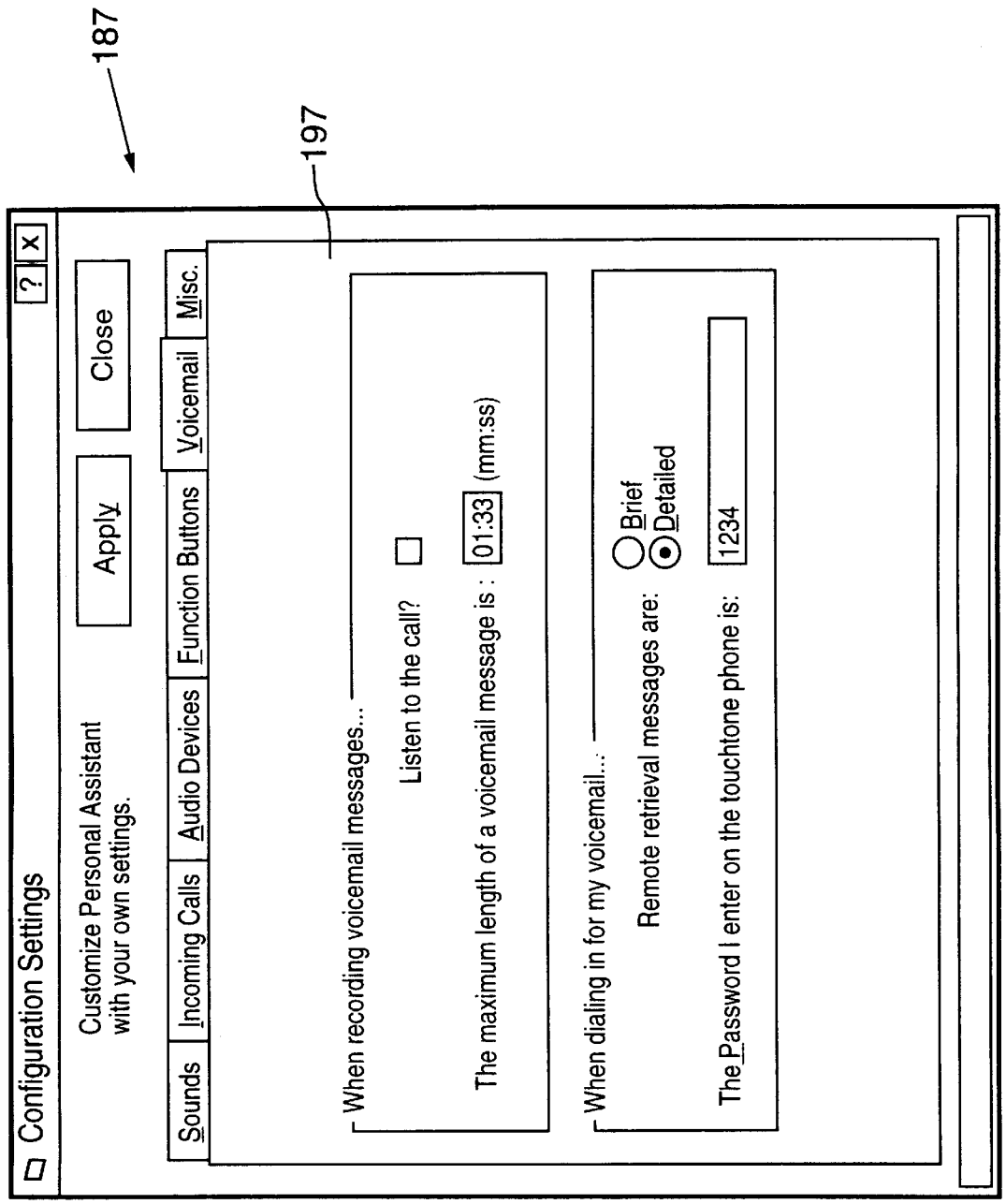

FIG. 27e shows the Voicemail tab 197 for configuring voicemail recording and retrieval features.

Figure 27F:
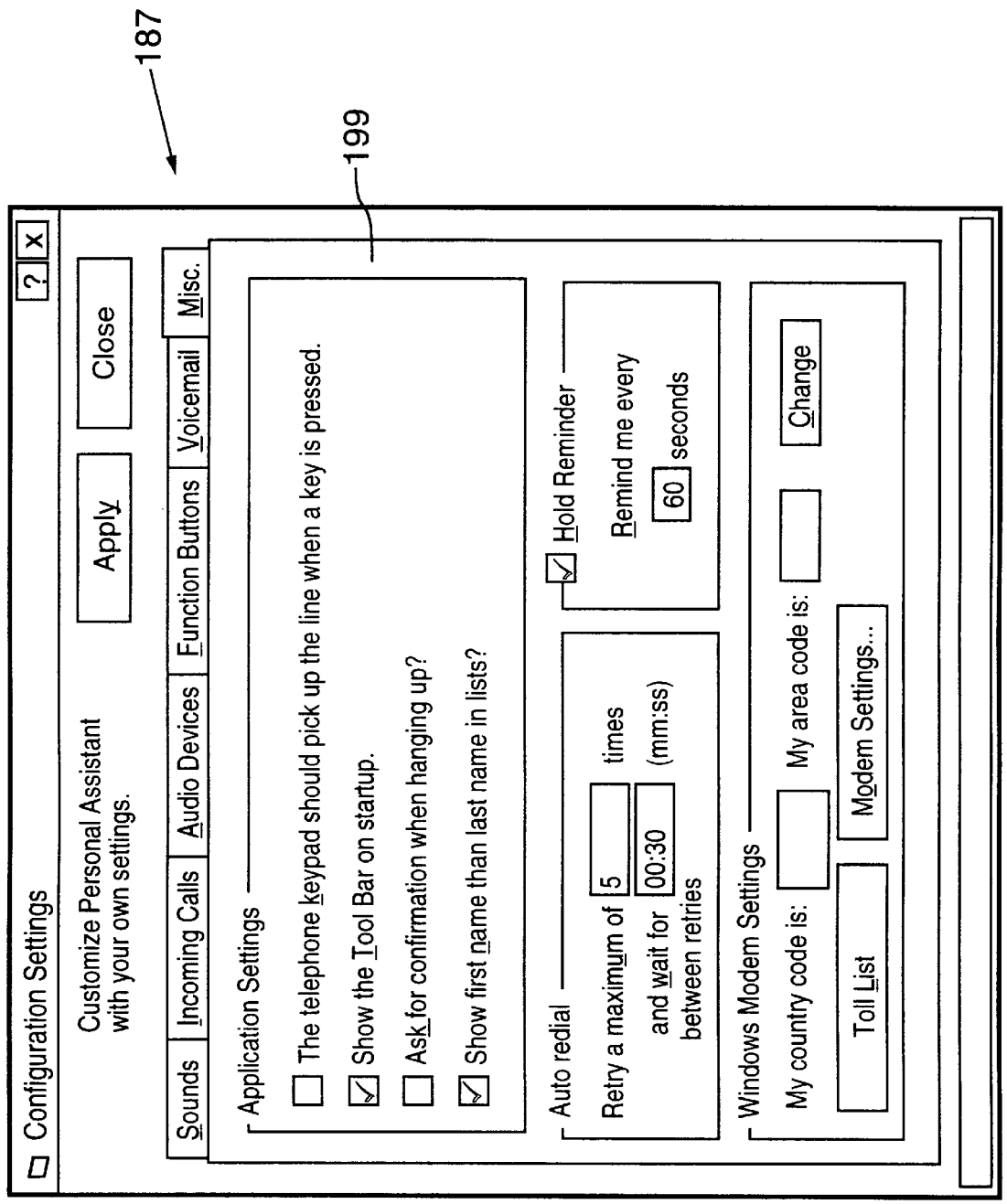

FIG. 27f shows the Miscellaneous tab 199 for configuring various telephone and application preferences.

As discussed briefly above, various sounds may be recorded and assigned to accompany predetermined functions. FIG. 28 shows a Sound Manager window 201 for effecting such sound recording and editing, with available sounds being selected from a drop-down list. A sounds button 190 appears in each window in which the user is permitted to select a sound (e.g. the Sounds tab of FIG. 27a), the depression of which causes the Sound Manager window 201 to appear.

The above call scenarios are of an exemplary nature for describing how the application 17 and engine components of core 27 function, and are not intended to be exhaustive. Numerous other call scenarios are supported by the functionality set forth herein.

We claim:

1. A computer-based telephony system, comprising:
   a telephone set which implements telephony functions on a telephone line, said telephone set including a serial interface for bi-directional communication of data signals including data signals generated in response to user input to said telephone set; and
   a computer executable software application running on a computer connected to said telephone set via said interface for receiving first ones of said data signals from said telephone set generated in response to user input to said telephone set and in response implementing predetermined software functions on said computer, for transmitting further data signals from said computer to said telephone set in response to a user input to said computer whereupon said telephone set implements predetermined ones of said telephony functions, and for generating and displaying on said computer a window including an area for indicating telephone call status responsive to one of either said user input or receipt of said first ones of said data signals, wherein said window includes a status line having icons for indicating said predetermined ones of said telephony functions which have been implemented by said telephone set.

2. The computer-based telephony system of claim 1, further comprising context sensitive buttons for initiating one or more of said telephony functions which are appropriate to said telephone call status.

3. The computer-based telephony system of claim 2, wherein at least one of said buttons is a default button adjacent said area for indicating telephone call status, said default button being provided for user initiation of a preferred one of said telephony functions which is appropriate to said telephone call status.

4. The computer-based telephony system of claim 3, wherein said window includes a control bar of further ones of said buttons which are sequentially arranged adjacent said default button for user initiation of respective further ones of said telephony functions which are appropriate to said telephone line status.

5. The computer-based telephony system of claim 3, wherein said default button has focus in said window such that said preferred one of said telephony functions may be initiated by pressing an Enter key on the computer executing said application.

6. The computer-based telephony system of claim 4, wherein said control bar is generated and displayed only in response to a predetermined user input.

7. The computer-based telephony system of claim 2, wherein said context sensitive buttons are identified by labels including at least one of an icon or text for describing said telephony functions which are appropriate to said telephone call status.

8. The computer-based telephony system of claim 1, wherein said telephone set includes a plurality of user programmable functions keys, and wherein said computer executable software application (I) generates and displays a window including an area depicting said user programmable function keys and a menu associated with each of said depicted programmable function keys, said menu containing a plurality of user-selectable ones of said predetermined software functions and said telephony functions to be assigned to respective ones of said programmable function keys, (ii) transmits predetermined data signals from said computer to said telephone set in response to user selection of said predetermined software functions and said telephony functions whereby said telephone set assigns said predetermined software functions and telephony functions to respective ones of said user programmable function keys on said telephone set, and (iii) prints an overlay card listing each one of said predetermined software functions and telephony functions assigned to respective ones of said user programmable function keys for placement on said telephone set.

9. The computer-based telephony system of claim 2, wherein said computer executable software application maintains a phonebook database and generates and displays a phonebook window including an area for indicating names and default telephone numbers of frequently called persons and a button for initiating a call to a selected one of said persons.

10. The computer-based telephony system of claim 9, wherein said computer executable software application generates a profile window associated with each of said frequently called persons, for each of said persons said profile window including a graphic image of that person, the person's first and last name, and a plurality of selectable tabs for selectively displaying additional information concerning the person and options for automatic implementation of selected ones of said predetermined telephony functions and predetermined software functions.

11. The computer-based telephony system of claim 10, wherein one of said plurality of selectable tabs is a notes tab for displaying textual notes and icons for initiating playback of sound files associated with said person.

12. The computer-based telephony system of claim 10, wherein one of said plurality of selectable tabs is a work tab for displaying full work address for said person.

13. The computer-based telephony system of claim 10, wherein one of said plurality of selectable tabs is a home tab for displaying a full home address for said person.

14. The computer-based telephony system of claim 10, wherein one of said plurality of selectable tabs is a phone tab for displaying a plurality of telephone numbers associated with said person in addition to the default telephone number for said person.

15. The computer-based telephony system of claim 10, wherein one of said plurality of selectable tabs is a tab for customizing greetings to be played when said person calls.

16. The computer-based telephony system of claim 10, wherein one of said plurality of selectable tabs is a shortcuts tab containing a field for displaying icons representing additional software applications which can either be automatically executed in response to one or both of calls being placed to said person or received from said person or manually executed by mouse clicking on said icons.

17. The computer-based telephony system of claim 2, wherein said window further includes an information display area for displaying name, telephone number and graphic image of a called or calling party.

18. The computer-based telephony system of claim 17, wherein said computer executable software application maintains a phonebook database including said name, telephone number and graphic image, and automatically searches said database in the event of an incoming call containing caller line identification data for a match between said caller line identification data and said telephone number and in the event of a match automatically displays said name, telephone number and graphic image in said display area of said window.

19. The computer-based telephony system of claim 1, wherein said computer executable software application includes a user customizable dialler for dialling a plurality of numbers associated with a user defined category in accordance with a user selected dialling sequence.

20. The computer-based telephony system of claim 19, wherein said computer executable software application displays a window showing a user selected name for each said category and a plurality of buttons each with a user selected label.

21. A computer-based telephony system for use with a telephone set capable of implementing telephony functions on a telephone line, the telephone set having a serial interface for bi-directional communication of data signals, the computer-based telephony system comprising:

a computer executable software application configured to run on a computer and to implement the steps connected to the telephone set via said interface generated in response to user input to the telephone set of receiving first ones of the data signals from the telephone set and in response implementing predetermined software functions on the computer;

transmitting further data signals from said computer to the telephone set in response to a user input to the computer whereupon the telephone set implements predetermined ones of the telephony functions; and generating a display on the computer of a window including an area for indicating telephone call status responsive to one of either the user input or receipt of the first ones of the data signals, and wherein said window includes a status line having icons for indicating predetermined ones of the telephony functions which have been implemented by the telephone set.

* * * * *